United States Patent
Hasha et al.

(10) Patent No.: US 9,647,917 B2
(45) Date of Patent: *May 9, 2017

(54) MAINTAINING CONSISTENCY WITHIN A FEDERATION INFRASTRUCTURE

(71) Applicant: Microsoft Technology Licensing, LLC, Redmond, WA (US)

(72) Inventors: Richard L. Hasha, Seattle, WA (US); Lu Xun, Kirkland, WA (US); Gopala Krishna R. Kakivaya, Sammamish, WA (US); Dahlia Malkhi, Palo Alto, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 93 days.

This patent is subject to a terminal disclaimer.

(21) Appl. No.: 14/681,620

(22) Filed: Apr. 8, 2015

(65) Prior Publication Data

US 2015/0244602 A1    Aug. 27, 2015

Related U.S. Application Data

(63) Continuation of application No. 12/907,799, filed on Oct. 19, 2010, now abandoned, which is a
(Continued)

(51) Int. Cl.
*G06F 15/177* (2006.01)
*H04L 12/26* (2006.01)
(Continued)

(52) U.S. Cl.
CPC .... *H04L 43/0876* (2013.01); *H04L 29/08306* (2013.01); *H04L 29/08333* (2013.01);
(Continued)

(58) Field of Classification Search
CPC ............... H04L 43/00; H04L 29/08306; H04L 29/08333; H04L 45/02
(Continued)

(56) References Cited

U.S. PATENT DOCUMENTS 4,747,100 A     5/1988   Roach et al.
5,689,701 A    11/1997   Ault et al.
(Continued)

FOREIGN PATENT DOCUMENTS

EP    1139602    10/2001
EP    1398924     3/2004
(Continued)

OTHER PUBLICATIONS

Chord: A scalable Peer-to-peer Lookup Protocol for Internet Applications Ion Stoica, Robert Morris, David Liben-Nowell, David R. Karger, M. Frans Kaashoek, Frank Dabek, Harris Balakrishnan, Member, IEEE/ACM Transactions on Networking, vol. 11, No. 1, Feb. 2003.
(Continued)

*Primary Examiner* — James Conaway
(74) *Attorney, Agent, or Firm* — Workman Nydegger

(57) ABSTRACT

The present invention extends to methods, systems, and computer program products for a joining node to join a ring of nodes within a rendezvous federation. Embodiments of the invention include establishing a neighborhood of multiple nodes on the ring of nodes. The joining node indicates its intent to take id-space ownership for a portion of the id-space between the joining node and a selected immediately adjacent node. The joining node initiates a one-way monitoring relationship with the selected immediately adjacent node. The joining node receiving an indication from the selected immediately adjacent node that indicates acceptance of the joining node's intent to take id-space ownership
(Continued)

for a portion of the id-space between the joining node and the selected node and indicates establishment of a one-way monitoring relationship between the selected node and the joining node. The joining node agrees to participate in a one-way monitoring relationship with the selected node.

20 Claims, 38 Drawing Sheets

Related U.S. Application Data continuation-in-part of application No. 11/936,589, filed on Nov. 7, 2007, now abandoned, said application No. 12/907,799 is a continuation-in-part of application No. 10/971,451, filed on Oct. 22, 2004, now abandoned.

(60) Provisional application No. 60/865,136, filed on Nov. 9, 2006.

(51) Int. Cl.
   H04L 29/08 (2006.01)
   H04L 12/751 (2013.01)

(52) U.S. Cl.
   CPC .............. H04L 43/00 (2013.01); H04L 45/02 (2013.01); H04L 67/1095 (2013.01); H04L 67/141 (2013.01)

(58) Field of Classification Search
   USPC .................................. 709/201, 220–222, 251
   See application file for complete search history.

(56) References Cited

U.S. PATENT DOCUMENTS

| | | |
|---|---|---|
| 5,745,683 A | 4/1998 | Lee et al. |
| 5,831,975 A | 11/1998 | Chen |
| 5,978,813 A | 11/1999 | Foltz et al. |
| 6,115,804 A | 9/2000 | Carpenter |
| 6,243,814 B1 | 6/2001 | Matena |
| 6,253,292 B1 | 6/2001 | Jhang |
| 6,269,085 B1 | 7/2001 | Provino |
| 6,279,034 B1 | 8/2001 | Jarriel et al. |
| 6,304,556 B1 | 10/2001 | Haas |
| 6,411,967 B1 | 6/2002 | Van Renesse |
| 6,449,641 B1 | 9/2002 | Moiin |
| 6,456,597 B1 | 9/2002 | Bare |
| 6,480,473 B1 | 11/2002 | Chambers |
| 6,542,513 B1 | 4/2003 | Franke |
| 6,546,415 B1 | 4/2003 | Park |
| 6,553,377 B1 | 4/2003 | Eschelbeck |
| 6,615,362 B1 | 9/2003 | Daruwalla |
| 6,708,198 B1 | 3/2004 | Simmons |
| 6,775,703 B1 | 8/2004 | Burns |
| 6,836,756 B1 | 12/2004 | Gruber |
| 6,850,987 B1 | 2/2005 | McCanne |
| 6,909,721 B2 | 6/2005 | Ekberg |
| 6,917,985 B2 | 7/2005 | Madruga |
| 6,928,578 B2 | 8/2005 | Archibald |
| 6,947,963 B1 | 9/2005 | Agarwal |
| 6,980,555 B2 | 12/2005 | Mar |
| 6,983,397 B2 | 1/2006 | Fairhurst |
| 6,988,173 B2 | 1/2006 | Blake |
| 7,043,550 B2 | 5/2006 | Knop |
| 7,062,563 B1 | 6/2006 | Lewis |
| 7,076,507 B1 | 7/2006 | Tarin |
| 7,085,825 B1 | 8/2006 | Pishevar |
| 7,103,884 B2 | 9/2006 | Fellin |
| 7,117,273 B1 | 10/2006 | O'Toole et al. |
| 7,120,824 B2 | 10/2006 | Burton |
| 7,137,018 B2 | 11/2006 | Gutman et al. |
| 7,139,270 B1 | 11/2006 | Fatehi et al. |
| 7,139,930 B2 | 11/2006 | Mashayekhi |
| 7,177,646 B2 | 2/2007 | O'Neill et al. |
| 7,181,547 B1 | 2/2007 | Millet |
| 7,231,463 B2 | 6/2007 | Nagendra |
| 7,324,440 B2 | 1/2008 | Takagi |
| 7,334,062 B1 | 2/2008 | Agarwal et al. |
| 7,353,335 B2 | 4/2008 | Kawamura |
| 7,373,468 B1 | 5/2008 | Gupta |
| 7,379,994 B2 | 5/2008 | Collazo |
| 7,404,006 B1 | 7/2008 | Slaughter |
| 7,453,884 B2 | 11/2008 | Ma |
| 7,463,648 B1 | 12/2008 | Eppstein |
| 7,467,265 B1 | 12/2008 | Tawri et al. |
| 7,478,263 B1 | 1/2009 | Kownacki |
| 7,496,602 B2 | 2/2009 | Kaler et al. |
| 7,512,649 B2 | 3/2009 | Faybishenko |
| 7,571,290 B1 | 8/2009 | Ranade et al. |
| 7,613,703 B2 | 11/2009 | Kakivaya |
| 7,617,289 B2 | 11/2009 | Srinivasan et al. |
| 7,640,299 B2 | 12/2009 | Kaler et al. |
| 7,694,167 B2 * | 4/2010 | Kakivaya .............. H04L 67/104 714/4.2 |
| 7,778,972 B1 | 8/2010 | Cormie |
| 7,805,407 B1 | 9/2010 | Verbeke et al. |
| 7,934,118 B2 | 4/2011 | Kakivaya et al. |
| 7,984,137 B2 | 7/2011 | O'Toole et al. |
| 8,176,200 B2 * | 5/2012 | Chkodrov ........... G06F 11/2028 709/236 |
| 8,250,230 B2 | 8/2012 | Kaler et al. |
| 8,275,826 B2 | 9/2012 | Kakivaya et al. |
| 8,307,028 B2 | 11/2012 | Kakivaya et al. |
| 8,307,085 B2 | 11/2012 | Sinha et al. |
| 8,392,515 B2 | 3/2013 | Kakivaya et al. |
| 8,417,813 B2 | 4/2013 | Kakivaya et al. |
| 8,549,180 B2 | 10/2013 | Critchley et al. |
| 8,892,626 B2 | 11/2014 | Kakivaya et al. |
| 2002/0059425 A1 | 5/2002 | Belfiore |
| 2002/0085506 A1 | 7/2002 | Hundscheidt |
| 2002/0128995 A1 | 9/2002 | Muntz et al. |
| 2002/0129086 A1 | 9/2002 | Garcia-Luna-Aceves |
| 2002/0150094 A1 | 10/2002 | Cheng |
| 2002/0150145 A1 | 10/2002 | Alriksson |
| 2002/0184357 A1 | 12/2002 | Traversat |
| 2003/0009754 A1 | 1/2003 | Rowley et al. |
| 2003/0055892 A1 | 3/2003 | Huitema |
| 2003/0067871 A1 | 4/2003 | Busi |
| 2003/0108050 A1 | 6/2003 | Black et al. |
| 2003/0110408 A1 | 6/2003 | Wells |
| 2003/0131246 A1 | 7/2003 | Reeves et al. |
| 2003/0145086 A1 | 7/2003 | O'Reilly |
| 2003/0152098 A1 | 8/2003 | Zhu |
| 2003/0165140 A1 | 9/2003 | Tang |
| 2003/0182444 A1 | 9/2003 | Pedone |
| 2003/0220993 A1 | 11/2003 | Blizniak et al. |
| 2004/0054807 A1 | 3/2004 | Harvey |
| 2004/0064511 A1 | 4/2004 | Abdel-Aziz et al. |
| 2004/0064548 A1 | 4/2004 | Adams et al. |
| 2004/0066741 A1 | 4/2004 | Dinker |
| 2004/0098502 A1 | 5/2004 | Xu et al. |
| 2004/0103342 A1 | 5/2004 | Moser et al. |
| 2004/0111651 A1 | 6/2004 | Mukherjee |
| 2004/0122927 A1 | 6/2004 | Muehl |
| 2004/0139150 A1 | 7/2004 | McCanne |
| 2004/0215795 A1 | 10/2004 | Poyhonen |
| 2004/0218536 A1 | 11/2004 | Yasukawa |
| 2004/0236945 A1 | 11/2004 | Risan et al. |
| 2005/0021725 A1 | 1/2005 | Lobbert |
| 2005/0031119 A1 | 2/2005 | Ding |
| 2005/0050320 A1 | 3/2005 | Wassmann et al. |
| 2005/0091399 A1 | 4/2005 | Candan |
| 2005/0100036 A1 | 5/2005 | Davis |
| 2005/0108481 A1 | 5/2005 | Iyengar |
| 2005/0111352 A1 | 5/2005 | Ho |
| 2005/0114291 A1 | 5/2005 | Becker-Szendy |
| 2005/0138173 A1 | 6/2005 | Ha |
| 2005/0152318 A1 | 7/2005 | Elbatt |
| 2005/0187946 A1 | 8/2005 | Zhang |
| 2005/0220106 A1 | 10/2005 | Raverdy |
| 2005/0222969 A1 | 10/2005 | Yip et al. |

(56) References Cited

U.S. PATENT DOCUMENTS

| | | |
|---|---|---|
| 2005/0276216 A1 | 12/2005 | Vasseur |
| 2006/0015507 A1 | 1/2006 | Butterworth |
| 2006/0026386 A1 | 2/2006 | Freedman et al. |
| 2006/0039371 A1 | 2/2006 | Castro |
| 2006/0074876 A1 | 4/2006 | Kakivaya et al. |
| 2006/0087990 A1 | 4/2006 | Kakivaya et al. |
| 2006/0088039 A1 | 4/2006 | Kakivaya et al. |
| 2006/0090003 A1 | 4/2006 | Kakivaya |
| 2006/0106940 A1 | 5/2006 | Jagannathan |
| 2006/0155781 A1 | 7/2006 | MacCormick |
| 2006/0159028 A1 | 7/2006 | Curran-Gray et al. |
| 2006/0182034 A1 | 8/2006 | Klinker et al. |
| 2006/0182050 A1 | 8/2006 | Dohm |
| 2007/0002774 A1 | 1/2007 | Hasha |
| 2007/0016663 A1 | 1/2007 | Weis |
| 2007/0053285 A1 | 3/2007 | Beer |
| 2007/0183460 A1 | 8/2007 | Enders |
| 2007/0204061 A1 | 8/2007 | Chen |
| 2007/0214194 A1 | 9/2007 | Reuter |
| 2007/0230482 A1 | 10/2007 | Shim et al. |
| 2007/0271385 A1 | 11/2007 | Davis |
| 2008/0005624 A1 | 1/2008 | Kakivaya et al. |
| 2008/0069124 A1 | 3/2008 | Patrick |
| 2008/0159289 A1 | 7/2008 | Narayanan |
| 2008/0288646 A1 | 11/2008 | Hasha |
| 2008/0288659 A1 | 11/2008 | Hasha |
| 2009/0006596 A1 | 1/2009 | Dinakaran et al. |
| 2009/0213757 A1 | 8/2009 | Kakivaya et al. |
| 2009/0268677 A1 | 10/2009 | Chou |
| 2009/0319684 A1 | 12/2009 | Kakivaya |
| 2010/0046399 A1 | 2/2010 | Kakivaya |
| 2010/0107002 A1 | 4/2010 | Kakivaya et al. |
| 2010/0161817 A1 | 6/2010 | Xiao et al. |
| 2010/0262717 A1 | 10/2010 | Critchley |
| 2011/0082928 A1 | 4/2011 | Hasha |
| 2011/0235551 A1 | 9/2011 | Kakivaya |
| 2011/0238841 A1 | 9/2011 | Kakivaya |
| 2012/0036237 A1 | 2/2012 | Hasha |

FOREIGN PATENT DOCUMENTS

| | | |
|---|---|---|
| EP | 1643730 | 4/2006 |
| EP | 1650911 | 4/2006 |
| JP | 2004221756 | 8/2004 |
| JP | 2004-266796 | 9/2004 |
| JP | 2005044274 | 2/2005 |
| JP | 2005-323346 | 11/2005 |

OTHER PUBLICATIONS

Pastry: Scalable, decentralized object location and routing for large-scale peer-to-peer systems Anthony Rowstron and Peter Druschel, 2001.

Kademlia: A Peer-to-peer information System Based on the XOR Metric Peter Maymounkov and David Mazieres, p. 1-15, 2002.

Exploiting network proximity in peer-to-peer overlay networks Miguel Castro, Peter Druschel, Y. Charlie Hu, Anthony Rowstron, Technical Report MSR-TR-2002-82 pp. 1-15, 2002.

A Scalable Content-Addressable Network Sylvia Ratnasamy, Paul Francis, Mark Handley, Richard Karp, Scott Shenker p. 1-17 Written by Vladimir Eske. Saarland University, Department of Computer Science, 2001.

A Scalable Content-Addressable Network, Sylvia Ramasamy, et al, Copyright 2001. Aug. 27-31, 2001, San Diego, CA p. 161-172.

Tapestry: An Infrastructure for Fault-tolerant Wide-area Location and Routing, Ben Y. Zhao, et al., Computer Science Division, p. 1-27.

Conti, Marco, et al. "Towards Scalable P2P Computing for Mobile Ad Hoc Networks" Pervasive Computing and Communications Workshops, 2004. Proceedings of the Second IEEE Annual Conference on, Piscataway, NJ, Mar. 14, 2002, pp. 109-113.

Ganesan, Prasanna, et al. Canon in Go Major: Designing DHT's with Hierarchical Structure, Distributed Computing Systems, 2004 Proceedings, 24th International Conference on Hachioji, Tokyo, Japan, Mar. 24, 2004, pp. 263-272.

Cai, Min, et al. "MAAN: A Multi-Attributed Addressable Network for Grid Information Services" Grid Computing, 2003, Proceedings, Fourth International Workshop on Nov. 17, 2003, Piscataway, NJ, pp. 184-191.

Liu, Huaiyu, et al. "Neighbor Table Construction and Update in a Dynamic Peer-to-Peer Network" Proceedings of the 23rd International Conference on Distributed Computing Systems, ICDCS 2003. Providence, RI, May 19-22, Vol. Conf. 23, May 19, 2003, pp. 509-518.

Seshardri, Mukund, "A Scalable Architecture for Broadcast Federation", http://www.cs.berkeley.edu/~mukunds/ms/citris/ms-report.pdf, Dec. 2002.

Krumm, John, et al., "The NearMe Wireless Proximity Server", Ubi Comp 2004. The Sixth International Conference on Ubiquitous Computing, Sep. 7-10, 2004, Nottingham, England, http://research.microsoft.com/users/jckrumm/Publications%202004/nearme %20distribute.pdf.

Waldo, Jim, Sun Microsystems, Inc. "Constructing Ad Hoc Networks", pp. 9-20 2001 IEEE.

U.S. Appl. No. 11/220,756, filed Apr. 2, 2009, Office Action.
U.S. Appl. No. 11/015,460, filed Feb. 5, 2009, Office Action.
U.S. Appl. No. 11/015,460, filed Jun. 15, 2009, Office Action.
U.S. Appl. No. 11/015,460, filed Sep. 14, 2009, Notice of Allowance.
U.S. Appl. No. 11/016,422, filed Oct. 1, 2008, Notice of Allowance.
U.S. Appl. No. 11/549,332, filed May 7, 2009, Office Action.
U.S. Appl. No. 11/752,198, filed Aug. 21, 2009, Office Action.
U.S. Appl. No. 11/428,146, filed Mar. 16, 2009, Office Action.
U.S. Appl. No. 11/428,146, filed Aug. 17, 2009, Office Action.
U.S. Appl. No. 11/465,316, filed Jun. 24, 2009, Office Action.
U.S. Appl. No. 11/428,133, filed Feb. 6, 2009, Office Action.
U.S. Appl. No. 11/428,133, filed Jul. 13, 2009, Office Action.
U.S. Appl. No. 11/549,332, filed Dec. 4, 2009, Notice of Allowance.
U.S. Appl. No. 11/465,316, filed Dec. 23, 2009, Notice of Allowance.
U.S. Appl. No. 11/220,756, filed Jan. 14, 2010, Office Action.
U.S. Appl. No. 11/752,198, filed Feb. 17, 2010, Office Action.
U.S. Appl. No. 10/971,451, filed Feb. 22, 2010, Office Action.
U.S. Appl. No. 11/220,756, filed Jul. 20, 2010, Office Action.
U.S. Appl. No. 10/971,451, filed Jul. 20, 2010, Office Action.
U.S. Appl. No. 11/428,146, filed Aug. 16, 2010, Office Action.
U.S. Appl. No. 11/428,133, filed Aug. 19, 2010, Office Action.
U.S. Appl. No. 12/611,825, filed Oct. 8, 2010, Office Action.
U.S. Appl. No. 11/936,556, filed Jul. 23, 2010, Office Action.
U.S. Appl. No. 11/220,756, filed Nov. 23, 2010, Office Action.
U.S. Appl. No. 11/752,198, filed Dec. 27, 2010, Notice of Allowance.
U.S. Appl. No. 10/971,451, filed Dec. 30, 2010, Office Action.
U.S. Appl. No. 11/428,133, filed Jan. 7, 2011, Office Action.
U.S. Appl. No. 11/220,756, filed Mar. 17, 2011, Notice of Allowance.
U.S. Appl. No. 10/971,451, filed Mar. 22, 2011, Office Action.
U.S. Appl. No. 12/611,825, filed Mar. 23, 2011, Office Action.
U.S. Appl. No. 11/428,146, filed May 9, 2011, Office Action.
U.S. Appl. No. 11/428,133, filed May 9, 2011, Office Action.
U.S. Appl. No. 11/220,756, filed May 10, 2011, Notice of Allowance.
U.S. Appl. No. 11/936,556, filed Jun. 27, 2011, Notice of Allowance.
U.S. Appl. No. 11/428,146, filed Sep. 14, 2011, Notice of Allowance.
U.S. Appl. No. 11/428,133, filed Sep. 14, 2011, Notice of Allowance.
U.S. Appl. No. 13/221,635, filed Dec. 22, 2011, Office Action.
U.S. Appl. No. 13/155,098, filed Mar. 7, 2012, Office Action.
U.S. Appl. No. 12/491,841, filed May 11, 2012, Office Action.
U.S. Appl. No. 13/155,098, filed Jul. 10, 2012, Notice of Allowance.
U.S. Appl. No. 13/221,635, filed Jul. 23, 2012, Notice of Allowance.
U.S. Appl. No. 12/821,002, filed Aug. 10, 2012, Office Action.

(56) References Cited

OTHER PUBLICATIONS

U.S. Appl. No. 12/491,841, filed Nov. 7, 7012, Notice of Allowance.
U.S. Appl. No. 13/155,113, filed Dec. 5, 2012, Notice of Allowance.
U.S. Appl. No. 12/821,002, filed Jan. 23, 2013, Office Action.
U.S. Appl. No. 12/821,002, filed May 16, 2013, Notice of Allowance.
U.S. Appl. No. 13/221,635, filed Jun. 19, 2013, Office Action.
U.S. Appl. No. 12/907,799, filed Jul. 15, 2013, Office Action.
U.S. Appl. No. 13/221,635, filed Jan. 6, 2014, Office Action.
U.S. Appl. No. 12/907,799, filed Jan. 15, 2014, Office Action.
U.S. Appl. No. 13/221,635, filed Nov. 17, 2014, Notice of Allowance.
U.S. Appl. No. 12/907,799, filed Jan. 9, 2015, Notice of Allowance.
Berger Stefan, et al., "Towards Pluggable Discovery Frameworks for Mobile and Pervasive Applications", 12 pages 2004 IEEE.
Pertselakis, M., et al., "An intelligent Agent based approach for Service Discovery in Wireless AD hoc Networks", 2002.
Gandhi, Rajiv, et al., "Minimizing Broadcast Latency and Redundancy in Ad Hoc Networks", 2003, pp. 222-232.
Li, Ning, et al., "BLMST: A Scalable, Power-Efficient Broadcast Algorithm for Wireless Networks", IEEE Computer Society, 2004.
Gupta, Manish, "TPC-W E-Commerce Benchmark Using Javlin/ObjectStore", 6 pages, 2001.
Mendonga et al., "The Hierarchical Ring Protocol: An Efficient Scheme for Reading Replicated Data", Date: 1993, 33 pages.
Naef et al., "The blue-c Distributed Scene Graph", dated: 2003.
Consistancy-based Routing in Overlay Networks (1 page) http://www.actpress.com/Paperinfo.aspx?PaperID=16686.
Chen et al., Enforcing Routing Consistancy in Structured Peer to Peer Overlays: Should We and Could We? (6 pages) http://research.microsoft.com/asia/dload_files/group/system/2006/Chen-Cons06.pdf.
On the Consistancy of DHT-Based Routing (17 pages) http://www.eecs.berkeley.edu/-kjk/consistancy-rep.pdf.
Skonnard, Aaron, "Learn the ABCs of Programming Windows Communication Foundation" MSDN Magazine The Microsoft Journal for Developers, Feb. 2006, pp. 1-14.
Sun Microsystems, "Federeated Naming Service Programming Guide", Sep. 2002, 110 pages.
Triantafillou, "PLANES: The Next Step in Peer-to-Peer Network Architectures", Oct. 2, 2003, retrieved from http://www.celd.upatras.gr/faculty/peter/papers/ on Jan. 3, 2011.
Harvey et al., "SkipNet: A Scalable Overlay Network with Practical Locality Properties", Mar. 2003, Retrieved from http://research.microsoft.com/en-us/um/people/ssaroiu/publications/usits/2003/abstract.html on Jul. 2009.
Pietzuch et al., "Hermes: A Distributed Event-Based Middleware Architecture", Jul. 11, 2002, Retrieved from http://ieee.org.xpls/abs_all.jsp?arnumber=1030837 on Jul. 6, 2009.
"NoN-Greedy Routing Algorithms Are Optimal or Know thy Neighbor's Neighbor", Dec. 8, 2003, retrieved from http://citeseerx.ist.psu.edu/viewdoc/summary?doi=10.1.1.4.4688 on Aug. 12, 2010.
Tang; "GoCast Gossip-Enhanced Overlay Multicast for Fast and Dependable Group Communication"—2005—pp. 1-10—http://www.cogsci.rochester.edu/~sarmor/publications/GoCast-DSN05.pdf (Copy Attached).
Choi, "D2HT: Directory Federation Using DHT to Support Open Scalability in Ubiquitous Network"—2005—pp. 1-5—http://ieeexplore.ieee.org/ie15/9593/30313/01392843.pdf?isNumber=(Copy Attached).
Baldi; "A comparison of ring and tree embedding for real-time group multicast"—Jun. 2003—pp. 451-464—http://delivery.acm.org/10.1145/880000/874106/p451-baldi.pdf?key1=874106&key2=4662566811&coll=GUIDE&dl=GUIDE&CFID=31221611&CFTOKEN=81646820 (Copy Attached).
Garcia-Luna-Aceves: "A Multicast Routing Protocol for Ad-Hoc Networks"—1999—pp. 1-9—http://citeseer.ist.psu.edu/cache/papers/cs/11652/http:zSzzSzwww.cse.ucsc.eduzSzresearchzSzc-crgzSzpublicationszSzmadruga.infocom99.pdf/garcia-luna-aceves99multicast.pdf.
Castro; "Proximity neighbor selection in tree-based structured peer-to-peer overlays"—2003—pp. 1-11—http://project-iris.com/irisbib/papers/proximity:mstr03/paper.pdf (Copy Attached).
Garces-Erice; "MULTI+: Building Topology-Aware Overlay Multicast Trees"—2007—pp. 1-3—http://www.springerlink.com/content/dtbujud595f4ae6f/ (Copy Attached).
Wepiwe, Giscard, et al., A concentric Multi-ring Overlay for High Reliable P2P Networks, Proceedings of the 2005 Fourth IEEE International Symposium on Network Computing and Applications (NCA'05), 8 pages.
Cohen, Reuven, et al., "A New Protocol for Route Discovery in Multiple-Ring Networks: Part II—Multicast, Recovery and High-Speed Processing", IEEE Transactions on Communications, vol. 42, No. 2/3/4, Feb./Mar./Apr. 1994, pp. 1112-1119.
Wang, Guojun, et al., "A Proxy-based Mobile Group Membership Protocol for Large Scale and Highly Dynamic Groups", Jun. 2006, IEEE, pp. 1897-1902.
Pierson, Nick, Microsoft Windows Server 2003 R2, "Overview of Active Directory Federation Services in Windows Server 2003 R2", Oct. 2005, 20 pages.
Ahlgren, Bengt, et al., "A Node Identity Internetworking Architecture", Mar. 29, 2006.
Cluster Resources, "Moab Adaptive Computing Suite", 2010, 4 pages.
Narendula, Rammohan, et al., "Towards Access Control Aware P2P Data Management Systems", ACM Internation Conference Proceedings Series; vol. 360, Proceedings of the 2009 EDBT/ICDT Workshops, 2009, 8 pages.
U.S. Appl. No. 10/971,451, filed Jun. 8, 2009, Office Action.
U.S. Appl. No. 11/016,446, filed Sep. 25, 2007, Notice of Allowance.
U.S. Appl. No. 11/016,446, filed Nov. 14, 2007, Notice of Allowance.

\* cited by examiner

MAINTAINING CONSISTENCY WITHIN A FEDERATION INFRASTRUCTURE

CROSS-REFERENCE TO RELATED APPLICATIONS

The present application is a continuation of U.S. patent application Ser. No. 12/907,799, filed Oct. 19, 2010, entitled "MAINTAINING CONSISTENCY WITHIN A FEDERATION INFRASTRUCTURE", which is a continuation-in-part of U.S. patent application Ser. No. 11/936,589, filed Nov. 7, 2007, entitled "MAINTAINING CONSISTENCY WITHIN A FEDERATION INFRASTRUCTURE", which claims the benefit of and priority to U.S. provisional patent application Ser. No. 60/865,136, filed Nov. 9, 2006, entitled "P2P RING OF STORAGE" and is also a continuation-in-part of U.S. patent application Ser. No. 10/971,451, filed Oct. 22, 2004, entitled "RENDEZVOUSING RESOURCE REQUESTS WITH CORRESPONDING RESOURCES". All of the above applications are incorporated herein by reference in their entireties.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices can transfer electronic data. As a result, many tasks performed at a computer system (e.g., voice communication, accessing electronic mail, controlling home electronics, Web browsing, and printing documents) include the exchange of electronic messages between a number of computer systems and and/or other electronic devices via wired and/or wireless computer networks.

However, to utilize a network resource to perform a computerized task, a computer system must have some way to identify and access the network resource. Accordingly, resources are typically assigned unique identifiers, for example, network addresses, that uniquely identify resources and can be used to distinguish one resource from other resources. Thus, a computer system that desires to utilize a resource can connect to the resource using the network address that corresponds to the resource. However, accessing a network resource can be difficult if a computer system has no prior knowledge of a network address for a network resource. For example, a computer system can not print a document at a network printer unless the computer system (or another networked computer system) knows the network address of the network printer.

Accordingly, various mechanisms (e.g., Domain Name System ("DNS"), Active Directory ("AD"), Distributed File Systems ("DFS")) have been developed for computer systems to identify (and access) previous unknown resources. However, due to the quantity and diversity of resources (e.g., devices and services) that are accessible via different computer networks, developers are often required to develop applications that implement a variety of different resource identification and access mechanisms. Each different mechanism may have different coding requirements and may not provide a developer with all the functionality that is needed in an application.

For example, although DNS has a distributed administration architecture (i.e., centralized management is not required), DNS is not sufficiently dynamic, not self-organizing, supports a weak data and query model, and has a fixed set of roots. On the other hand, AD is sufficiently dynamic but requires centralized administration. Further, aspects of different mechanisms may not be compatible with one another. For example, a resource identified using DNS may not be compatible with DFS routing protocols. Thus, a developer may be forced to choose the most suitable mechanism and forgo the advantages of other mechanisms.

Mechanisms for identifying resources can be particularly problematic in peer-to-peer networks. DNS provides a lookup service, with host names as keys and IP addresses as values, that relies on a set of special root servers to implement lookup requests. Further, DNS requires management of information (NS records) for allowing clients to navigate the name server hierarchy. Thus, a resource must be entered into DNS before the resource can be identified on a network. On larger scale networks where nodes frequently connect and disconnect form the network relying on entry of information is not always practical. Additionally, DNS is specialized to the task of find hosts or services and is not generally applicable to other types of resources.

Accordingly, other mechanisms for resource identification and access have been developed to attempt to address these shortcomings. A number of mechanisms include distributed lookup protocols that are more scalable than DNS. These mechanisms use various node arrangements and routing algorithms to route requests to corresponding resources and to store information for lookup.

At least one of these mechanisms utilizes local multi-level neighbor maps at each node in a network to route messages to a destination node. This essentially results in an architecture where each node is a "root node" of a corresponding tree of nodes (the nodes in its neighbor map). Messages are incrementally routed to a destination ID digit by digit (e.g., *6=>46=>, *346=>2346, where *s represent wildcards). The routing efficiency of these types of mechanisms is $O(\log N)$ routing hops and require nodes to maintain a routing table of $O(\log N)$ size.

At least one other of these mechanisms assigns nodes a unique ID that is taken from a linear ring of numbers. Nodes maintain routing tables that contain pointers to their immediate successor node (according to ID value) and to those nodes whose ID values are the closest successor of the value $ID+2^L$. The routing efficiency of these types of mechanisms is also $O(\log N)$ routing hops and require nodes to maintain a routing table of $O(\log N)$ size.

At least one further mechanisms requires $O(\log N^{1/d})$ routing hops and requires nodes to maintain a routing table of $O(D)$ size. Thus, the routing efficiency of all of these mechanisms depends, at least in part, on the number of nodes in the system.

Further, since IDs (for at least some of the mechanisms) can be uniformly distributed around a ring, there is always some possibility that routing between nodes on the ring will result in some inefficiency. For example, routing hops can cross vast geographic distances, cross more expensive links, or pass through insecure domains, etc. Additionally, when message routing involves multiple hops, there is some chance that such events will occur multiple times. Unfortunately, these mechanisms do not take into account the proximity of nodes (physical or otherwise) with respect one another. For example, depending on node distribution on a ring, routing a message from New York to Boston could involve routing the message from New York, to London, to Atlanta, to Tokyo, and then to Boston.

Accordingly, at least one other more recent mechanism takes proximity into account by defining proximity as a single scalar proximity metric (e.g., IP routing hops or geographic distance). These mechanisms use the notion of proximity-based choice of routing table entries. Since there are many "correct" node candidates for each routing table entry, these mechanisms attempt to select a proximally close node from among the candidate nodes. For these mechanisms can provide a function that allows each node to determine the "distance" of a node with a given IP address to itself. Messages are routed between nodes in closer proximity to make progress towards a destination before routing to a node that is further away. Thus, some resources can be conserved and routing is more efficient.

Unfortunately, these existing mechanisms typically do not provide for, among other things, symmetric relationships between nodes (i.e., if a first node considers a second node to be its partner, the second node considers the first node as a partner as well), routing messages in both directions (clockwise and counterclockwise) on a ring, partitioning linked lists of nodes based on a plurality of proximity metrics, and routing messages based on a plurality of proximity metrics. These deficiencies can limit dynamic, distributed, and efficient transfer of data between nodes of a network, such as, for example, when broadcasting data to all nodes of the network.

In some environments, safety mechanisms are used to insure that node responsibilities do not inappropriately overlap. For example, a safety mechanism can be used to prevent two different nodes from claiming responsibly for a system resource (e.g., a message) or logical identity within that system. In some environments, liveness mechanisms are used to insure that if a message is repeatedly sent to a target the message is accepted. Unfortunately, many existing asynchronous systems provide only limited safety and liveness mechanisms. For example, some asynchronous systems provide only eventually safety and liveness. Thus, these asynchronous systems are not suitable for various types of applications, such as, for example, authoritative storage.

BRIEF SUMMARY

The present invention extends to methods, systems, and computer program products for a joining node to join a ring of nodes within a rendezvous federation. In some embodiments, a joining node establishes a neighborhood of multiple nodes on a ring of nodes, where the neighborhood includes at least an immediately adjacent predecessor node and an immediately adjacent successor node. The joining node indicates to one of the immediately adjacent nodes selected from among the immediately adjacent predecessor node and an immediately adjacent successor node, the intent of the joining node to take id-space ownership for a portion of the id-space between the joining node and the selected immediately adjacent node. The joining node initiates a one-way monitoring relationship with the selected immediately adjacent node.

The joining node receives an indication from the selected immediately adjacent node that indicates acceptance of the joining node's intent to take id-space ownership for a portion of the id-space between the joining node and the selected immediately adjacent node and indicates establishment of a one-way monitoring relationship between the selected immediately adjacent node and the joining node. The joining node agrees to participate in a one-way monitoring relationship with the selected immediately adjacent node.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
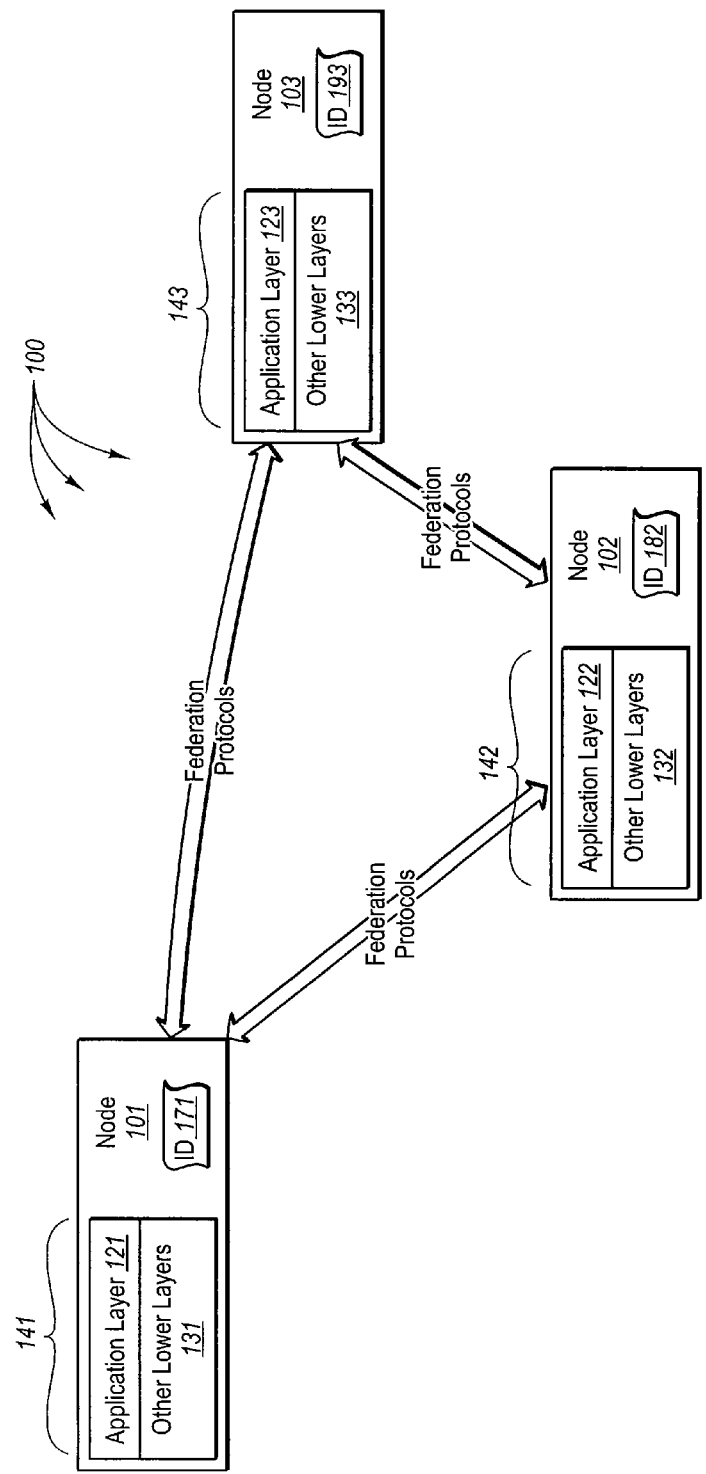
FIG. 1 illustrates an example of a federation infrastructure.

The present invention extends to methods, systems, and computer program products for allocating and reclaiming resources within a rendezvous federation. In some embodiments, message is routed towards a destination node. A receiving node received a message along with a destination identifier indicating a destination on the ring of nodes. The destination identifier located between the receiving node and an immediate neighborhood node. The immediate neighborhood node is selected from among an immediate predecessor neighbor node and an immediate successor neighborhood node.

The receiving node refers to a cached two-way agreement between the receiving node and the immediate neighbor node to determine the next appropriate node that is to receive the message. The cached two-way agreement at least implies a division of responsibility for the identifier space between the receiving node and an immediate neighbor node. The receiving node sends the message to the next appropriate component based on the determination of the next appropriate node.

In other embodiments, a two-way agreement between a current node and an immediate neighborhood node is formulated. The current node accessing an indication that the configuration of the ring of nodes has changed. The indication is indicative of a change in at least a current immediate neighbor node. The current immediate neighbor node selected from among a current immediate predecessor node and a current immediate successor node. The change results in a new immediate neighbor node.

The indication a further indication of a need to formulate a two-way agreement dividing responsibility for at least unoccupied identifiers on the ring between the current node and the new immediate neighbor node. The current node and the new immediate neighbor node agreeing to a responsibility boundary between the current node and new immediate neighbor node. The responsibility boundary divides responsibility for the unoccupied identifiers between the current node and the new immediate neighbor node. Unoccupied identifiers between the current node and the responsibility boundary become the responsibility of the current node. Likewise, unoccupied identifiers between the responsibility boundary and the new immediate neighbor node being the responsibility of the new immediate neighbor node.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry or transport desired program code means in the form of computer-executable instructions or data structures and which can be accessed by a general purpose or special purpose computer. Combinations of the above should also be included within the scope of computer-readable media.

However, it should be understood, that upon reaching various computer system components, program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

In some embodiments, hardware modules, such as, for example, special purpose integrated circuits or Gate-arrays are optimized to implement the principles of the present invention.

In this description and in the following claims, a "node" is defined as one or more software modules, one or more hardware modules, or combinations thereof, that work together to perform operations on electronic data. For example, the definition of a node includes the hardware components of a personal computer, as well as software modules, such as the operating system of the personal computer. The physical layout of the modules is not important. A node can include one or more computers coupled via a network. Likewise, a node can include a single physical device (such as a mobile phone or Personal Digital Assistant "PDA") where internal modules (such as a memory and processor) work together to perform operations on electronic data. Further, a node can include special purpose hardware, such as, for example, a router that includes special purpose integrated circuits.

Those skilled in the art will appreciate that the invention may be practiced in network computing environments with many types of node configurations, including, personal computers, laptop computers, hand-held devices, multi-processor systems, microprocessor-based or programmable consumer electronics, network PCs, minicomputers, mainframe computers, mobile telephones, PDAs, pagers, routers, gateways, brokers, proxies, firewalls, redirectors, network address translators, and the like. The invention may also be practiced in distributed system environments where local and remote nodes, which are linked (either by hardwired data links, wireless data links, or by a combination of hardwired and wireless data links) through a network, both perform tasks. In a distributed system environment, program modules may be located in both local and remote memory storage devices.

Federation Architecture

FIG. 1 illustrates an example of a federation infrastructure 100. The federation infrastructure 100 includes nodes 101, 102, 103, that can form different types of federating partnerships. For example, nodes 101, 102, 103 can be federated among one another as peers without a root node. Each of nodes 101, 102, and 103 has a corresponding ID 171, 182, and 193 respectively.

Generally, the nodes 101, 102, 103, can utilize federation protocols to form partnerships and exchange information (e.g., state information related to interactions with other nodes). The formation of partnerships and exchange of information facilitates more efficient and reliable access to resources. Other intermediary nodes (not shown) can exist between nodes 101, 102, and 103 (e.g., nodes having IDs between 171 and 193). Thus, a message routed, for example, between node 101 and node 103, can be pass through one or more of the other intermediary nodes.

Nodes in federation infrastructure 100 (including other intermediary nodes) can include corresponding rendezvous protocol stacks. For example, nodes 101, 102, and 103 include corresponding rendezvous protocol stacks 141, 142, and 143 respectively. Each of the protocols stacks 141, 142, and 143 includes an application layer (e.g., application layers 121, 122, and 123) and other lower layers (e.g., corresponding other lower layers 131, 132, and 133). Each layer in a rendezvous protocol stack is responsible for different functionality related to rendezvousing a resource request with a corresponding resource.

For example, other lower layers can include a channel layer, a routing layer, and a function layer. Generally, a channel layer is responsible for reliably transporting a message (e.g., using WS-ReliableMessaging and Simple Object Access Protocol ("SOAP")) from one endpoint to another (e.g., from node 101 to node 103). The channel layer is also responsible for processing incoming and outgoing reliable messaging headers and maintaining state related to reliable messaging sessions.

Generally, a routing layer is responsible for computing the next hop towards a destination. The routing layer is also responsible for processing incoming and outgoing addressing and routing message headers and maintaining routing state. Generally, a function layer is responsible for issuing and processing rendezvous protocol messages such as join and depart requests, pings, updates, and other messages, as well as generation of responses to these messages. The function layer processes request messages from the routing layer and sends back corresponding response messages, if any, to the originating node using the routing layer. The function layer also initiates request messages and utilizes the routing layer to have the requests messages delivered.

Generally, an application layer processes non-rendezvous protocol specific data delivered from the function layer (i.e., application messages). The function layer can access application data from the application layer and get and put application data in rendezvous protocol messages (e.g., pings and updates). That is, the function layer can cause application data to be piggybacked on rendezvous protocol messages and can cause the application data to be passed back to the application layer in receiving rendezvous protocol nodes. In some embodiments, application data is used to identify resources and resource interests. Thus, an application layer can include application specific logic and state that processes data received from and sent to the other lower layers for purposes of identifying resources and resource interests.

Federating Mechanisms

Nodes can federate using a variety of different mechanisms. A first federating mechanism includes peer nodes forwarding information to all other peer nodes. When a node is to join a federation infrastructure, the node utilizes a broadcast/multicast discovery protocol, such as, for example, WS-Discovery to announce its presence and issues a broadcast/multicast find to detect other nodes. The node then establishes a simple forwarding partnership with other nodes already present on the network and accepts new partnerships with newly joining nodes. Thereafter, the node simply forwards all application specific messages to all of its partner nodes.

A second federating mechanism includes peer nodes that most efficiently transmit application specific messages to their destination(s). When a new node is to join a federation infrastructure, the new node utilizes a broadcast/multicast discovery protocol, such as, for example, WS-Discovery to announce its presence and issues a broadcast/multicast find to detect other nodes that are part of the federation infrastructure. Upon detecting another node, the new node establishes a partnership with the other node. From the established partnership, the new node learns about the presence of other nodes already participating in federation infrastructure. It then establishes partnerships with these newly-learned nodes and accepts any new incoming partnership requests.

Both node arrivals/departures and registrations of interest in certain application specific messages are flooded through the federation infrastructure resulting in every node having global knowledge of other partner nodes and registrations of interest in application specific messages. With such global knowledge, any node can send application specific messages directly to the nodes that have expressed interest in the application specific message.

A third federating mechanism includes peer nodes indirectly forwarding all application specific messages to their destination/s. In this third mechanism, nodes are assigned identifiers (ID's), such as, for example, a 128-bit or 160-bit ID. The node responsible for a maintaining registration of interest in a given application specific message can be determined to be the one whose ID is closest to the one obtained by mapping (e.g., hashing) the destination identity (e.g. URI) of the application specific message to this 128-bit or 160-bit ID-space.

In this third mechanism, node arrivals and departures are flooded over the entire fabric. On the other hand, registrations of interest in certain application specific messages are forwarded to the nodes determined to be responsible for maintaining such registration information. For scalability, load balancing, and fault-tolerance, the node receiving registration of interest in certain application specific messages can reliably flood that registration information within its neighborhood set. The neighborhood set for a specified node can be determined to be the set of nodes having IDs within a predefined range on either side of the ID of specified node.

Similar to the second mechanism, a newly-joining node utilizes a broadcast/multicast discovery protocol, such as, for example, WS-Discovery to announce its presence and issues a local broadcast/multi-cast find to detect a node that is already part of the federation infrastructure. The new node establishes a partnership with the discovered node and uses that partnership to learn about the presence of other new nodes participating in the federation infrastructure. The new node then establishes further partnerships with the newly discovered nodes and accepts any new incoming partnership requests. The new node accepts incoming registrations of interest in certain application layer specific resources from its partners for which it is responsible and may flood them over its neighborhood set. Thus, messages can generally be forwarded to their final destination via intermediary routing nodes (e.g., that a newly joining node has partnered with or that a partner node is aware of).

In response to receiving an incoming application specific message, the new node forwards the message to the partner node that may be responsible for maintaining the registration information for the destination specified in the message. Thus, when using this third mechanism, every node in the federation infrastructure has global knowledge of all other nodes but the registration information is efficiently partitioned among the nodes. Application specific messages are transmitted to their final destination via only the partner's nodes that may have the responsibility for maintaining registration information of interest in those application specific messages. Thus, indirection is accomplished by forwarding only to the partner node that has global knowledge of the registration information of interest for the message being processed. This is in contrast to the first mechanism where the indirection is accomplished by forwarding to all the partner nodes.

A fourth federating mechanism includes peer nodes that route messages to other peer nodes. This fourth mechanism differs from the third mechanism at least in that both node arrivals/departures and registrations of interest in certain application specific messages are all routed instead being flooded. Routing protocols are designed to guarantee rendezvous between application specific messages and the registration messages that express interest in those application specific messages.

Figure 2:
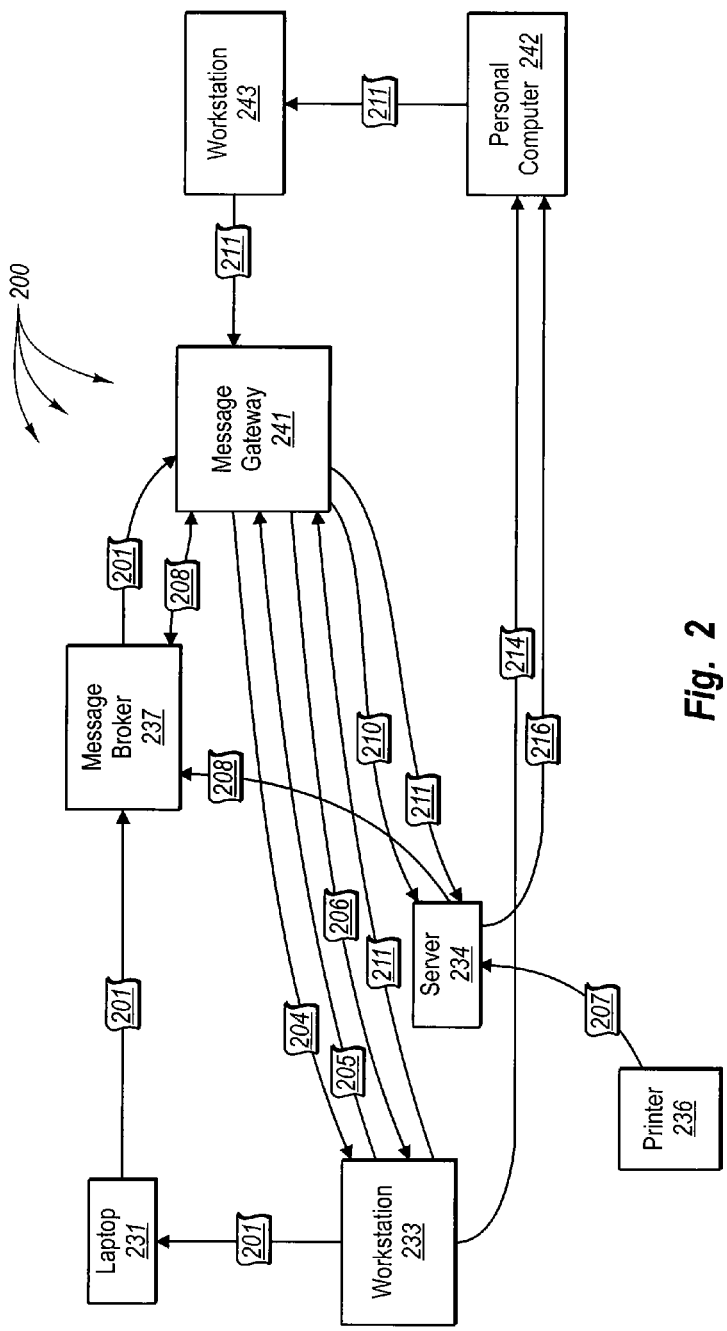
FIG. 2 illustrates an example of a computer architecture that facilitates routing request indirectly to partners.

FIG. 2 illustrates an example of a computer architecture 200 that facilitates routing requests indirectly to partners. Computer architecture 200 depicts different types of computer systems and devices potentially spread across multiple local discovery scopes participating in a federation infrastructure.

Workstation 233 can include a registered PnP provider instance. To inform its partners of the presence of this PnP provider instance, workstation 233 routes registration request 201 over the federation infrastructure. Registration request 201 is initially forwarded to laptop 231, which in turn forwards registration request 201 to message broker 237, which in turn forwards registration request 201 to message gateway 241. Message gateway 241 saves the registration information registration request 201 in its database and returns success message 204 to workstation 233.

Subsequently, another registered provider instance, this time that of running services, comes alive within the workstation 233. This time the node is aware that message gateway 241 is responsible for registrations and forwards registration request 205 to message gateway 241 directly. Message gateway 241 saves the registration information registration request 205 in its database and returns success message 206 to workstation 233.

Subsequently, the printer 236 (e.g., a UPnP printer) is powered on and sends announcement 207. Server 234 detects announcement 207 and routes registration request 208 to message broker 237. Message broker 237 forwards registration request 208 to message gateway 241. Message gateway 241 saves the registration information registration request 208 in its database and returns success message 210 to server 234.

Subsequently, personal computer 242 issues lookup request 211 to discover all devices. Since personal computer 242 doesn't know where to forward lookup request 211, it routes lookup request 211 through workstation 243. As registration and lookup requests are routed to the same destination, the routing protocol essentially guarantees rendezvous between the two requests resulting in workstation 243 forwards find request 211 to message gateway 241. Message gateway 241 looks up the registration information maintained by it and forwards find request 211 to both the workstation 233 and server 234. Workstation 233 and server 234 send response messages 214 and 216 respectively to personal computer 242.

This fourth mechanism works by routing (instead of flooding) a request to the node (message gateway 241) that has global knowledge of the registrations specified in a request. This fourth mechanism, as will be described in further detail below, essentially guarantees that routing can be accomplished in O(log N) hops, where N is the number of nodes participating in the federation infrastructure. Since this fourth mechanism efficiently partitions both node partnership and registration information, it scales to very large networks, even the Internet.

Although a number of federating mechanisms have been described, it would be apparent to one skilled in the art, after having reviewed this description, that other federation mechanisms are possible.

Relationship Between Nodes in a Federation

Accordingly, a federation consists of a set of nodes that cooperate among themselves to form a dynamic and scalable network in which information can be systematically and efficiently disseminated and located. Nodes are organized to participate in a federation as a sorted list using a binary relation that is reflexive, anti-symmetric, transitive, total, and defined over the domain of node identities. Both ends of the sorted list are joined, thereby forming a ring. Thus, each node in the list can view itself as being at the middle of the sorted list (as a result of using modulo arithmetic). Further, the list is doubly linked so that any node can traverse the list in either direction.

Each federating node can be assigned an ID (e.g., by a random number generator with duplicate detection) from a fixed set of IDs between 0 and some fixed upper bound. Thus, adding 1 to an ID of the fixed upper bound results in an ID of zero (i.e., moving from the end of the linked list back to the beginning of the linked listed. In addition, a 1:1 mapping function from the value domain of the node identities to the nodes themselves is defined.

Figure 3:
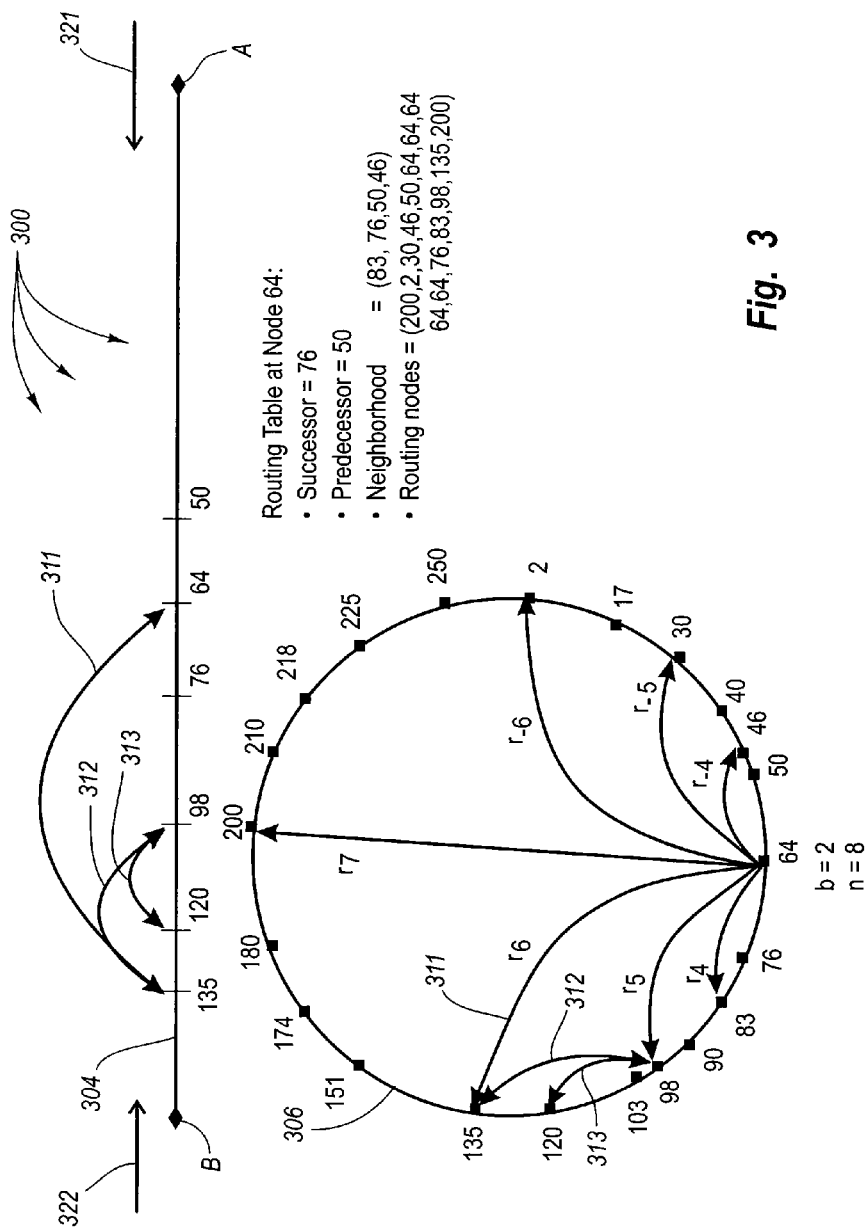
FIG. 3 illustrates an example binary relationship between nodes in a federation infrastructure in the form of a sorted list and corresponding ring.

FIG. 3 depicts an example linked list 304 and corresponding ring 306. Given such a ring, the following functions can be defined:

RouteNumerically(V, Msg): Given a value V from the value domain of node identities and a message "Msg," deliver the message to node X whose identity can be mapped to V using the mapping function.

Neighborhood(X, S): Neighborhood is the set of nodes on the either side of node X with cardinality equal to S.

When every node in the federation has global knowledge of the ring, RouteNumerically(V, Msg) is implemented by directly sending Msg to the node X, whose identity is obtained by applying the mapping function to V. Alternately, when nodes have limited knowledge of other nodes (e.g., only of immediately adjacent nodes), RouteNumerically(V, Msg) is implemented by forwarding the message to consecutive nodes along the ring until it reaches the destination node X.

Alternately (and advantageously), nodes can store enough knowledge about the ring to perform a distributed binary search (without having to have global knowledge or implement routing between immediately adjacent nodes). The amount of ring knowledge is configurable such that maintaining the ring knowledge has a sufficiently small impact on each node but allows increased routing performance from the reduction in the number of routing hops.

As previously described, IDs can be assigned using the "<" (less than) relation defined over a sufficiently large, bounded set of natural numbers, meaning its range is over a finite set of numbers between 0 and some fixed value, inclusive. Thus, every node participating in the federation is assigned a natural number that lies between 0 and some appropriately-chosen upper bound, inclusive. The range does not have to be tight and there can be gaps between numbers assigned to nodes. The number assigned to a node serves as its identity in the ring. The mapping function accounts for gaps in the number space by mapping a number falling in between two node identities to the node whose identity is numerically closest to the number.

This approach has a number of advantages. By assigning each node a uniformly-distributed number, there is an increased likelihood that all segments of the ring are uniformly populated. Further, successor, predecessor, and neighborhood computations can be done efficiently using modulo arithmetic.

In some embodiments, federating nodes are assigned an ID from within an ID space so large that the chances of two nodes being assigned the same ID are highly unlikely (e.g., when random number generation is used). For example, a node can be assigned an ID in the range of 0 to $b^n-1$, where b equals, for example, 8 or 16 and n equals, for example, 128-bit or 160-bit equivalent digits. Accordingly, a node can be assigned an ID, for example, from a range of 0 to $16^{40}-1$ (or approximately 1.461502E48). The range of 0 to $16^{40}-1$ would provide, for example, a sufficient number of IDs to assign every node on the Internet a unique ID.

Thus, each node in a federation can have:

An ID which is a numerical value uniformly distributed in the range of 0 to $b^n-1$; and A routing table consisting of (all arithmetic is done modulo $b^n$):

Successor node (s);

Predecessor node (p);

Neighborhood nodes ($p_k, \ldots, p_1, p, s, s_1, \ldots, s_j$) such that $s_j.s.id>(id+u/2)$, $j \geq v/2-1$, and $p_k.p.id<(id-u/2)$, and $k \geq v/2-1$; and Routing nodes ($r_{-(n-1)}, \ldots, r_{-1}, r_1, \ldots, r_{n-1}$) such that $r_{\pm i}$=RouteNumerically($id \pm b^i$, Msg).

where b is the number base, n is the field size in number of digits, u is the neighborhood range, v is the neighborhood size, and the arithmetic is performed modulo $b^n$. For good routing efficiency and fault tolerance, values for u and v can be u=b and v≥max($\log_2(N)$, 4), where N is the total number of nodes physically participating in the federation. N can be estimated from the number of nodes present on a ring segment whose length is greater than or equal to b, for example, when there is a uniform distribution of IDs. Typical values for b and n are b=8 or 16 and n=128-bit or 160-bit equivalent digits.

Accordingly, routing nodes can form a logarithmic index spanning a ring. Depending on the locations of nodes on a ring, a precise logarithmic index is possible, for example, when there is an existing node at each number in the set of $id+b^i$ where i=(1, 2, … (n−1)). However, it may be that there are not existing nodes at each number in the set. IN those cases, a node closest to id±b$^i$ can be selected as a routing node. The resulting logarithmic index is not precise and may even lack unique routing nodes for some numbers in the set.

Referring again to FIG. 3, FIG. 3 illustrates an example of a binary relation between nodes in a federation infrastructure in the form of sorted list 304 and corresponding ring 306. The ID space of sorted list 304 is in the range 0 to $2^8-1$ (or 255). That is, b=2 and n=8. Thus, nodes depicted in FIG. 3 are assigned IDs in a range from 0 to 255. Sorted list 304 utilizes a binary relation that is reflexive, anti-symmetric, transitive, total, and defined over the domain of node identities. Both ends of sorted list 304 are joined, thereby forming ring 306. This makes it possible for each node in FIG. 3 to view itself as being at the middle of sorted list 304. The sorted list 304 is doubly linked so that any node can traverse the sorted list 304 in either direction. Arithmetic for traversing sorted list 304 (or ring 306) is performed modulo $2^8$. Thus, 255 (or the end of sorted list 304)+1=0 (or the beginning of sorted list 304).

The routing table indicates that the successor to ID 64 is ID 76 (the ID immediately clockwise from ID 64). The successor can change, for example, when a new node (e.g., with an ID of 71) joins or an existing node (e.g., ID 76) leaves the federation infrastructure. Likewise, the routing table indicates that the predecessor to ID 64 is ID 50 (the ID immediately counters clockwise from ID 64). The predecessor can change, for example, when a new node (e.g., with an ID of 59) joins or an existing node (e.g., ID 50) leaves the federation infrastructure.

The routing table further indicates that a set of neighborhood nodes to ID 64 have IDs 83, 76, 50 and 46. A set of neighbor nodes can be a specified number of nodes (i.e., neighborhood size v) that are within a specified range (i.e., neighbor range u) of ID 64. A variety of different neighborhood sizes and neighbor ranges, such as, for example, V=4 and U=10, can potentially be used to identify the set of neighborhood nodes. A neighborhood set can change, for example, when nodes join or leave the federation infrastructure or when the specified number of nodes or specified range is changed.

The routing table further indicates that ID 64 can route to nodes having IDs 200, 2, 30, 46, 50, 64, 64, 64, 64, 76, 83, 98, 135, and 200. This list is generated by identifying the node closest to each number in the set of id±$2^i$ where i=(1, 2, 3, 4, 5, 6, 7). That is, b=2 and n=8. For example, the node having ID 76 can be identified from calculating the closest node to 64+$2^3$, or 72.

A node can route messages (e.g., requests for access to resources) directly to a predecessor node, a successor node, any node in a set of neighborhood nodes, or any routing node. In some embodiments, nodes implement a numeric routing function to route messages. Thus, RouteNumerically (V, Msg) can be implemented at node X to deliver Msg to the node Y in the federation whose ID is numerically closest to V, and return node Y's ID to node X. For example, the node having ID 64 can implement RouteNumerically(243, Msg) to cause a message to be routed to the node having ID 250. However, since ID 250 is not a routing node for ID 64, ID 64 can route the message to ID 2 (the closest routing node to 243). The node having ID 2 can in turn implement RouteNumerically(243, Msg) to cause the message to be routed (directly or through further intermediary nodes) to the node having ID 250. Thus, it may be that a RouteNumerically function is recursively invoked with each invocation routing a message closer to the destination.

Proximity

Advantageously, other embodiments of the present invention facilitate partitioning a ring into a ring of rings or tree of rings based on a plurality of proximity criteria of one or more proximity categories (e.g., geographical boundaries, routing characteristics (e.g., IP routing hops), administrative domains, organizational boundaries, etc.). It should be understood a ring can be partitioned more than once using the same type of proximity criteria. For example, a ring can be partition based on a continent proximity criteria and a country proximity criteria (both of a geographical boundaries proximity category).

Since IDs can be uniformly distributed across an ID space (a result of random number generation) there is a high probability that any given segment of a circular ID space contains nodes that belong to different proximity classes provided those classes have approximately the same cardinality. The probability increases further when there are a sufficient number of nodes to obtain meaningful statistical behavior.

Thus, neighborhood nodes of any given node are typically well dispersed from the proximality point of view. Since published application state can be replicated among neighborhood nodes, the published information can be well dispersed as well from the proximality point of view.

Figure 4:
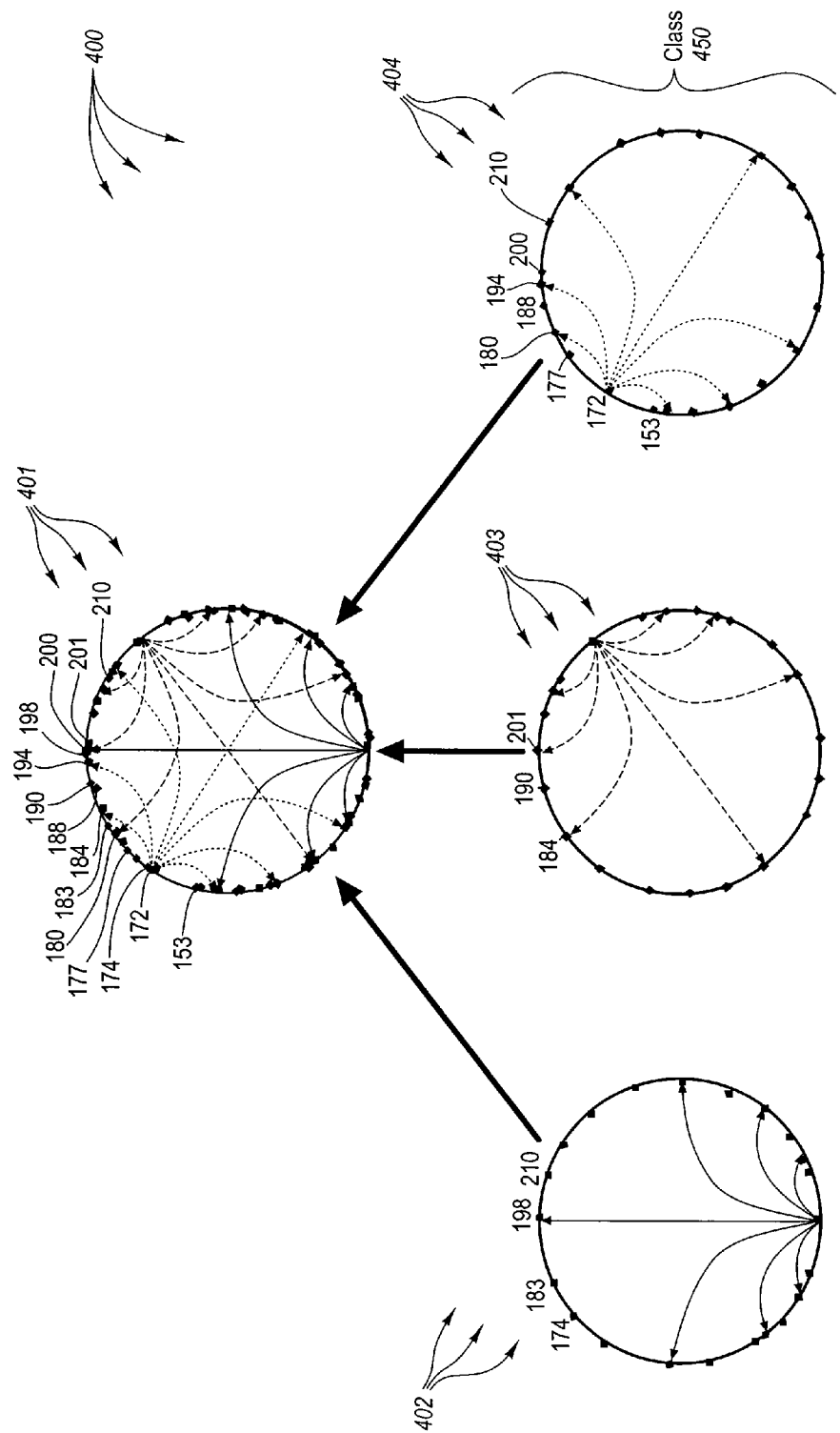
FIG. 4 illustrates an example ring of rings that facilitates proximal routing.

FIG. 4 illustrates a ring of rings 400 that facilitates proximal routing. Ring 401 can be viewed as a master or root ring, and contains all the nodes in each of the rings 402, 403, and 404. Each of the rings 402, 403, and 404 contain a subset of nodes from ring 401 that are partitioned based on a specified proximity criterion. For example, ring 401 may be partitioned based on geographic location, where ring 402 contains nodes in North America, ring 403 contains nodes in Europe, and ring 404 contains nodes in Asia.

In a numerical space containing 65,536 ($2^{16}$) IDs, routing a message from a North American node having an ID 5,345 to an Asian node having an ID 23,345 can include routing the message within ring 402 until a neighbor node of the Asian node is identified. The neighbor node can then route the message to the Asian node. Thus, a single hop (as opposed to multiple hops) is made between a North American node and an Asian node. Accordingly, routing is performed in a resource efficient manner.

Figure 5:
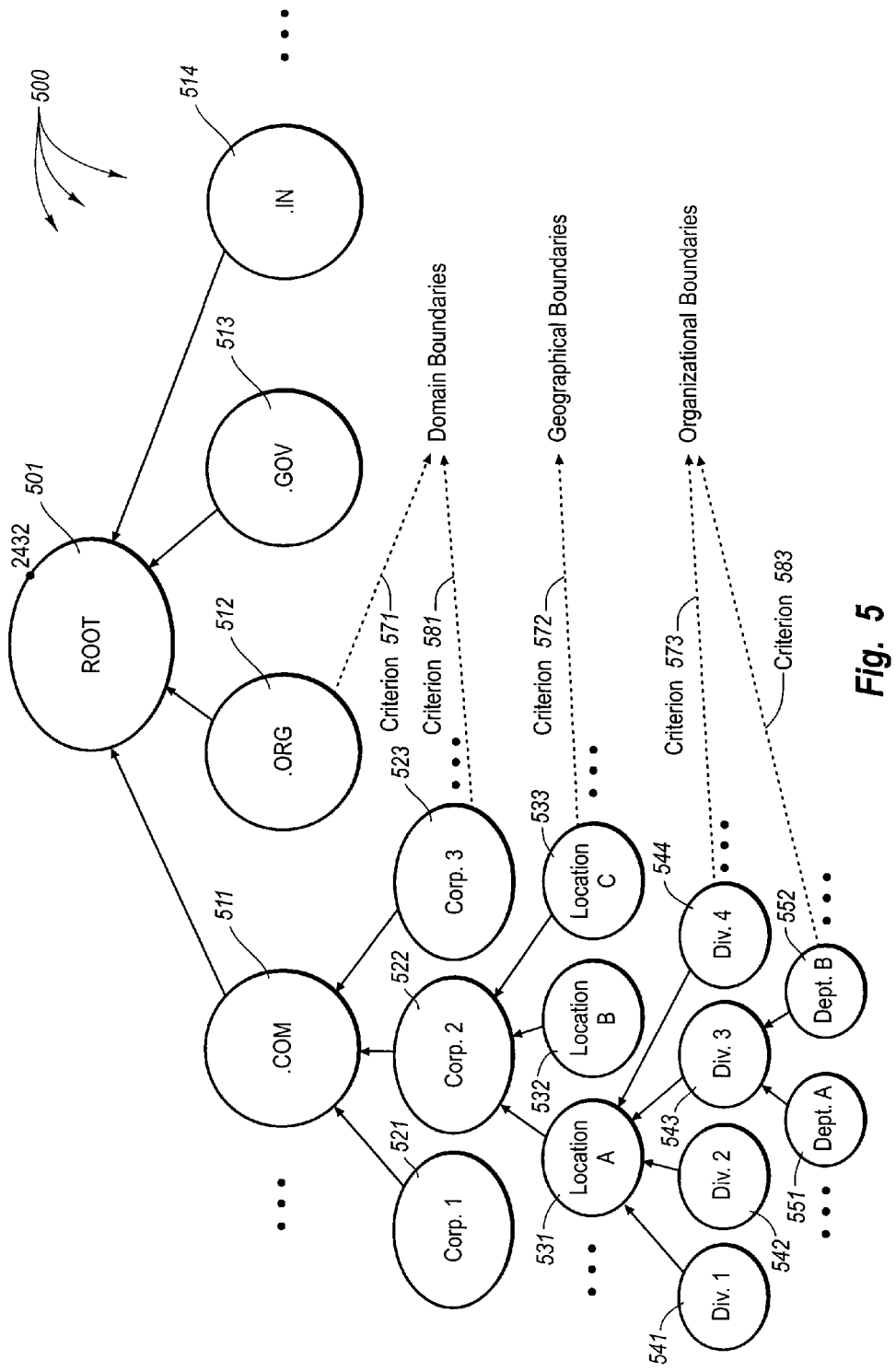
FIG. 5 illustrates an example proximity induced partition tree of rings that facilitates proximal routing.
Figure 5A:
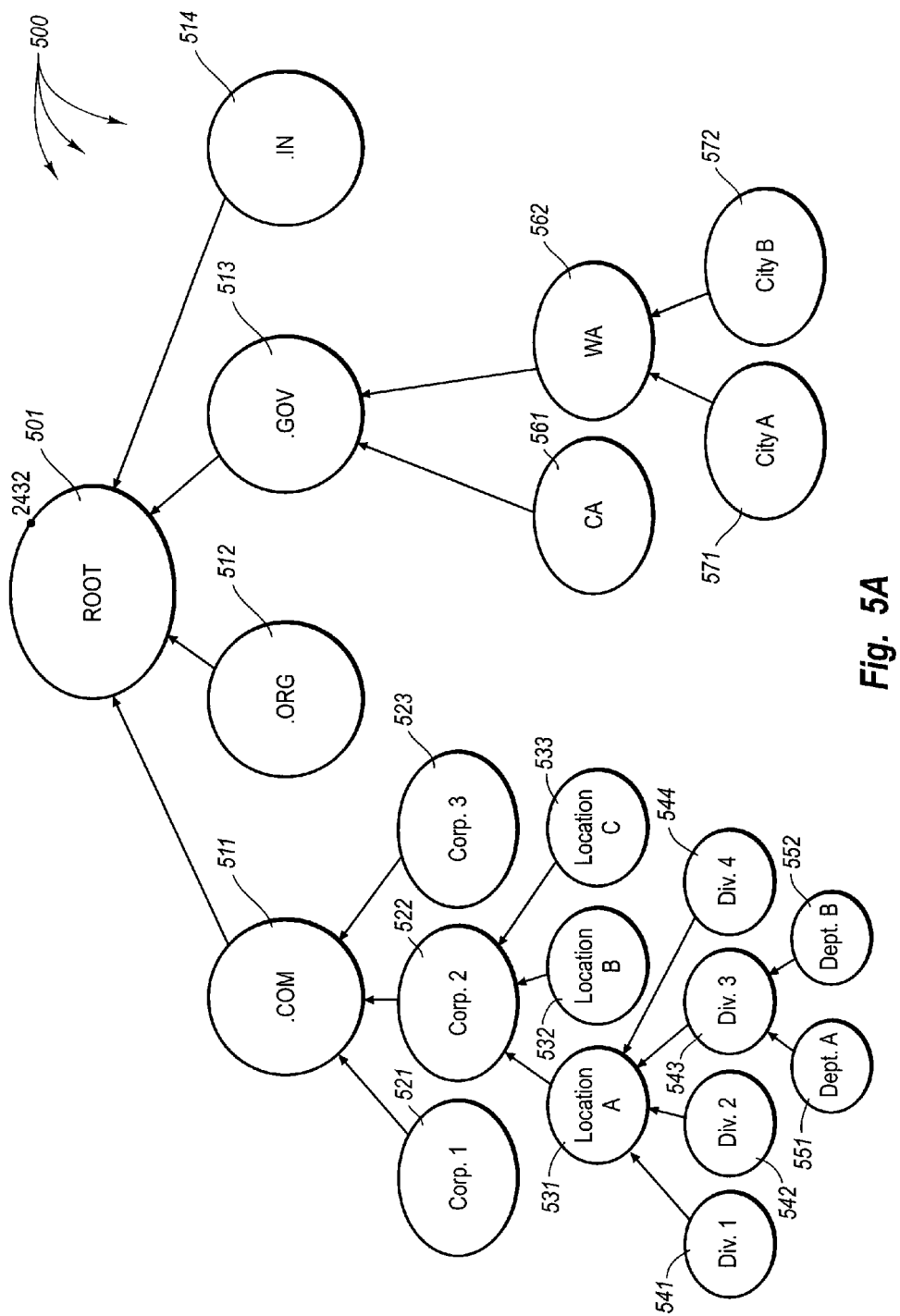
FIG. 5A illustrates the example proximity induced partition tree of rings of FIG. 5 with additional detail in portions of the partition tree of rings of FIG. 5.

FIG. 5 illustrates an example proximity induced partition tree of rings 500 that facilitates proximal routing. As depicted, partition tree of rings 500 includes a number of rings. Each of the rings represents a partition of a sorted linked list. Each ring including a plurality a nodes having IDs in the sorted linked list. However for clarity due to the number of potential nodes, the nodes are not expressly depicted on the rings (e.g., the ID space of partition tree 500 may be b=16 and n=40).

Within partition tree 500, root ring 501 is partitioned into a plurality of sub-rings, including sub-rings 511, 512, 513, and 514, based on criterion 571 (a first administrative domain boundary criterion). For example, each component of a DNS name can be considered a proximity criterion with the partial order among them induced per their order of appearance in the DNS name read right to left. Accordingly, sub-ring 511 can be further partitioned into a plurality of sub-rings, including sub-rings 521, 522, and 523, based on criterion 581 (a second administrative domain boundary criterion).

Sub-ring 522 can be further partitioned into a plurality of sub-rings, including sub-rings 531, 532, and 533, based on criterion 572 (a geographic boundary criterion). Location based proximity criterion can be partially ordered along the lines of continents, countries, postal zip codes, and so on. Postal zip codes are themselves hierarchically organized meaning that they can be seen as further inducing a partially ordered sub-list of proximity criteria.

Sub-ring 531 can be further partitioned into a plurality of sub-rings, including sub-rings 541, 542, 543, and 544, based on criterion 573 (a first organizational boundary criterion). A partially ordered list of proximity criterion can be induced along the lines of how a given company is organizationally structured such as divisions, departments, and product groups. Accordingly, sub-ring 543 can be further partitioned into a plurality of sub-rings, including sub-rings 551 and 552, based on criterion 583 (a second organizational boundary criterion).

Within partition tree 500, each node has a single ID and participates in rings along a corresponding partition path starting from the root to a leaf. For example, each node participating in sub-ring 552 would also participate in sub-rings 543, 531, 522, 511 and in root 501. Routing to a destination node (ID) can be accomplished by implementing a RouteProximally function, as follows:

RouteProximally(V, Msg, P): Given a value V from the domain of node identities and a message "Msg," deliver the message to the node Y whose identity can be mapped to V among the nodes considered equivalent by the proximity criteria P.

Thus, routing can be accomplished by progressively moving closer to the destination node within a given ring until no further progress can be made by routing within that ring as determined from the condition that the destination node lies between the current node and its successor or predecessor node. At this point, the current node starts routing via its partner nodes in the next larger ring in which it participates. This process of progressively moving towards the destination node by climbing along the partitioning path towards the root ring terminates when the closest node to the destination node is reached within the requested proximal context, as originally specified in the RouteProximally invocation.

Routing hops can remain in the proximal neighborhood of the node that originated the request until no further progress can be made within that neighborhood because the destination node exists outside it. At this point, the proximity criterion is relaxed to increase the size of the proximal neighborhood to make further progress. This process is repeated until the proximal neighborhood is sufficiently expanded to include the destination node (ID). The routing hop made after each successive relaxation of proximal neighborhood criterion can be a potentially larger jump in proximal space while making a correspondingly smaller jump in the numerical space compared to the previous hop. Thus, only the absolutely required number of such (inter-ring) hops is made before the destination is reached.

It may be the case that some hops are avoided for lookup messages since published application data gets replicated down the partition tree when it is replicated among the neighborhood nodes of the destination node.

To accomplish proximal routing, each federation node maintains references to its successor and predecessor nodes in all the rings it participates as a member (similar to successor and predecessor for a single ring)—the proximal predecessor, proximal successor, and proximal neighborhood. In order to make the routing efficient, the nodes can also maintain reference to other nodes closest to an exponentially increasing distance on its either half of the ring as routing partners (similar to routing nodes for a single ring). In some embodiments, routing partner nodes that lie between a pair of consecutive successor or predecessor nodes participate in the same lowest ring shared by the current node and the node numerically closest to it among the successor or predecessor node pairs respectively. Thus, routing hops towards a destination node transition into using a relaxed proximity criterion (i.e., transitioning to a higher ring) only when absolutely needed to make further progress. Accordingly, messages can be efficiently rendezvoused with a corresponding federation node.

In some embodiments, nodes implement a proximal routing function to route messages based on equivalence criteria relations. Thus, given a number V and a message "Msg", a node can implement RouteProximally(V, Msg, P) to deliver the message to the node Y whose identify can be mapped to V among the nodes considered equivalent by proximity criterion P. The proximity criterion P identifies the lowest ring in the partition tree that is the common ancestor to all the nodes considered proximally equivalent by it. It can be represented as a string obtained by concatenating the proximity criterion found along the path from the root ring to the ring identified by it separated by the path separator character '/'. For example, the proximity criterion identifying sub-ring 542 can be represented as "Proximity:/.COM/Corp2/LocationA/Div2". Each ring in the partition tree 500 can be assigned a unique number, for example, by hashing its representational string with a SHA based algorithm. If the number 0 is reserved for the root ring, it can be inferred that RouteNumerically(V, Msg) RouteProximally(V, Msg, 0).

For example, a node in sub-ring 544 can implement RouteProximally to identify a closer node in sub-ring 531 (e.g., to a node in sub-ring 513). In turn, sub-ring 531 can implement RouteProximally to identify a closer node in sub-ring 522. Likewise, sub-ring 522 can implement RouteProximally to identify a closer node in sub-ring 511. Similarly, sub-ring 511 can implement RouteProximally to identify a closer node in ring 501. Thus, it may be that a RouteProximally function is recursively invoked with each invocation routing a message closer to the destination.

Thus, when proximity criterion is taken into account, routing hops on a path to a final destination can remain within the proximity of a node that originates a request, while making significant progress between the originating node and the destination node in a numerical space, until either the destination node is reached or no further progress can be made under the chosen proximity criterion at which point it is relaxed just enough to make further progress towards the destination. For example, proximity criterion can be relaxed enough for a message to be routed from ring 531 up to ring 522, etc.

Utilizing the above approach to proximity, it is possible to confine published information to a given ring. For example, organizations may like to ensure that organization specific information is not available to entities outside of their trust domains either (1) implicitly in the form of neighborhood replication to nodes outside of their domains or (2) explicitly in the form of servicing lookup requests for such information. The first aspect is satisfied by replicating published information only among the nodes neighboring the target ID within the specified ring. Because all messages originated by a node are routed by successively climbing the rings to which it belongs towards the root ring, there is a high likelihood that all lookup requests originated within an organization will be able to locate the published information confined to it thereby implicitly satisfying the second aspect.

Also, organizations dislike nodes automatically federating with nodes outside of their trust domain. This can happen, for example, when a visiting sales person connects his/her laptop computer to the network in the customer premises. Ideally, the laptop computer belonging to the sales person wishes to locate information published in its home domain and/or federate with the nodes in its home domain starting at its lowest preferred proximity ring. It will typically not be permitted to federate with the nodes in the customer's domain. Supporting this scenario requires ability to locate seed nodes in the home domain. Such seed nodes can be used for locating information published in the home domain, to join the home federation, to selectively import and export published information across domains, and as one possible way to arbitrate conflicting failure reports submitted by other nodes. Seed nodes are also sometimes referred as message gateways.

In other embodiments, an entity publishes references to seed nodes in the root ring. Seed nodes can be published at the unique number (such as the one obtained by hashing its representational string) associated with the ring (as a target ID). Seed node information can further be on-demand cached by the nodes in various rings that are on the path to the corresponding target IDs in the root ring. Such on-demand caching provides for improved performance and reduction in hotspots that might occur when semi-static information is looked up quite frequently. Seed node information can also be obtained via other means such as DNS To provide fault tolerance for confined published information, each node can maintain a set of neighborhood nodes in all of the rings it participates in. Given the above, the state maintained by a node can be summarized as follows:

An ID which is a numerical value uniformly distributed in the range of 0 to $b^n-1$.

A routing table consisting of (all arithmetic is done modulo $b^n$):

For each ring, say ring d, in which the node participates
Successor node ($s_d$)
Predecessor node ($p_d$)
Neighborhood nodes ($p_{kd}, \ldots, p_{1d}, p_d, s_d, s_{1d}, \ldots, s_{jd}$) such that $s_{jd}.s_d.id>(id+u/2)$, $j \geq v/2-1$, $p_{kd}.p_d.id<(id-u/2)$, and $k \geq v/2-1$.
Routing nodes ($r_{-(n-1)}, \ldots, r_{-1}, r_1, \ldots, r_{n-1}$) such that $r_{\pm i}$=RouteProximally($id \pm b^i$, updateMsg, d) such that $s_d \leq id+b^i \leq s_{d+1}$ or $p_{d+1} \leq id-b^i \leq p_d$ as appropriate.

where b is the number base, n is the field size in number of digits, u is the neighborhood range, and v is the neighborhood size.

Note that a subset of the neighborhood nodes maintained by a given node in ring "d" can appear again as neighborhood nodes in the child ring "d+1" in which the given node participates as well. As such one can derive the upper bound on the total number of neighborhood nodes maintained by a given node across all the D rings it participates as D*max (u,v)/2. This considers that only one reference to a given node is kept and the worst case upper bound is for a balanced tree.

It should be noted that when a ring is partitioned into a plurality of corresponding sibling sub-rings, it is permitted for a specified node to simultaneously participate in more than one of the plurality of corresponding sibling sub-rings, for example, through aliasing. Aliasing can be implemented to associate different state, for example, from different sub-rings, with the specified node. Thus, although aliases for a given node have the same ID, each alias can have distinct state associated with them. Aliasing allows the specified node to participate in multiple rings having distinct proximity criteria that are not necessarily common ancestors of more specific proximity criteria. That is, the specified node can participate in multiple branches of the proximity tree.

For example, a dual NIC (wired and wireless) laptop can be considered to be proximally equivalent to both other wireless and wired nodes sharing the same LAN segments as the laptop. But, these two distinct proximity criteria can be modeled as sub-criteria that are applicable only after application of a different higher priority proximity criterion, such as, for example, one based on organizational membership. As the laptop belongs to the same organization, the aliased nodes in the two sub-rings representing 1) membership in the wired and 2) membership in the wireless LAN segments merge into a single node in the ring representing the organization to which the laptop belongs. It should be understand that the RouteProximally works as expected without any modifications in the presence of aliasing.

Each proximal ring can be configured in accordance with (potentially different) ring parameters. Ring parameters can be used to define a neighborhood (e.g., ring parameters can represent a neighborhood range, a neighborhood size, ping message and depart message timing and distribution patterns for ping and depart messages), indicate a particular federating mechanisms (e.g., from among the above-described first through fourth federating mechanisms previously described or from among other federating mechanisms), or define communication specifics between routing partners in the same proximal ring. Some ring parameters may be more general, applying to a plurality of different federating mechanisms, while other ring parameters are more specific and apply to specific type of federating mechanism.

Ring parameters used to configure a higher level proximal ring can be inherited in some embodiments by lower level proximal rings. For example, it may be that ring 543 inherits some of the ring parameters of ring 531 (which in turn inherited from ring 522, etc.). Thus, a neighborhood size and neighborhood range associated with ring 531 is also associated with ring 541.

However, inherited ring parameters can be altered and/or proximal rings can be individually configured in accordance with different ring parameters. For example, it may be that ring 511 is for an administrative domain that contains a large number of nodes and thus the above-described fourth federating mechanism is more appropriate for ring 511. On the other hand, it may be that ring 521 is for a small business with a relatively smaller number of nodes and thus the above-described second federating mechanism is more appropriate for ring 521. Thus, the ring parameters associated with ring 521 can be set to (or inherited parameters changed to) different values than the ring parameters associated with ring 511. For example, a ring parameter indicating a particular type of federating mechanisms can be different between rings 511 and 521. Similarly parameters defining a neighborhood can be different between rings 511 and 521. Further, ring 521 can be configured in accordance with specific parameters that are specific to the above-described second federating mechanism, while ring 511 is configured in accordance additional with specific parameters that are specific to the above-described fourth federating mechanism.

Accordingly, proximal rings can be flexibly configured based on the characteristics (e.g., number, included resources, etc.) of nodes in the proximal rings. For example, an administrator can select ring parameters for proximal rings using a configuration procedure (e.g., through a user-interface). A configuration procedure can facilitate the configuration of inheritance relationships between proximal rings as well as the configuration of individual proximal rings, such as, for example, to override otherwise inherited ring parameters.

Figure 8:
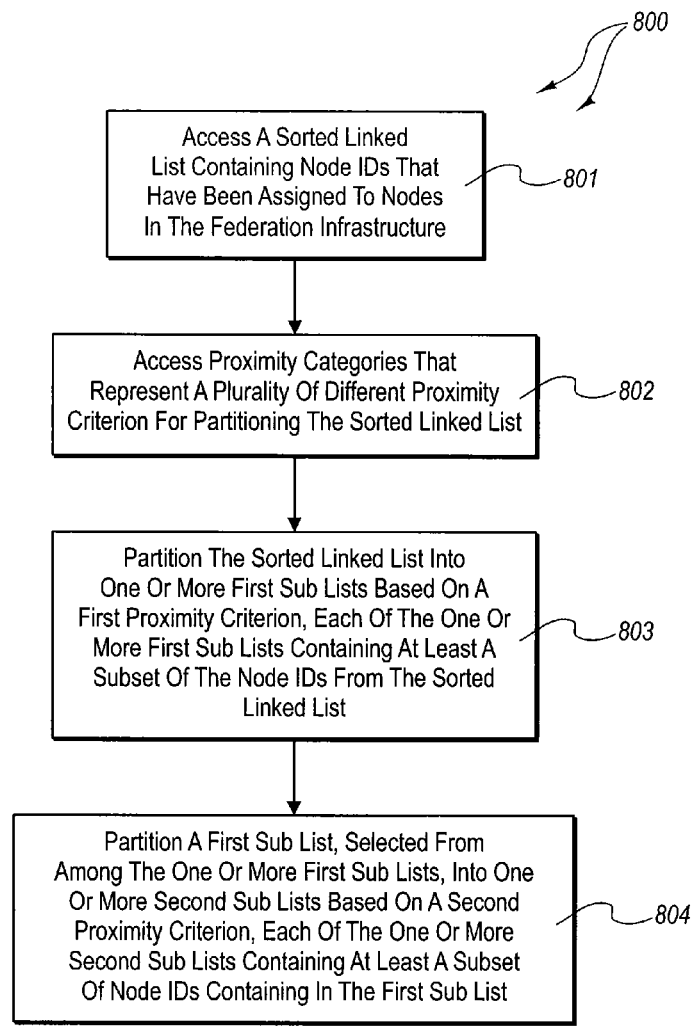
FIG. 8 illustrates an example flow chart of a method for partitioning the nodes of a federation infrastructure.

FIG. 8 illustrates an example flow chart of a method 800 for partitioning the nodes of a federation infrastructure. The method 800 will be described with respect to the rings of partition a tree 500 in FIG. 5. Method 800 includes an act of accessing a sorted linked list containing node IDs that have been assigned to nodes in a federation infrastructure (act 801). For example, the sorted linked list represented by ring 501 can be accessed. The node IDs of the sorted linked list (the nodes depicted on ring 501) can represent nodes in a federation infrastructure (e.g., federation infrastructure 100).

Method 800 includes an act of accessing proximity categories that represent a plurality of different proximity criteria for partitioning the sorted linked list (act 802). For example, proximity criterion representing domain boundaries 561, geographical boundaries 562, and organizational boundaries 563 can be accessed. However, other proximity criteria, such as, trust domain boundaries, can also be represented in accessed proximity criterion. Proximity categories can include previously created partially ordered lists of proximity criteria. A ring can be partitioned based on partially ordered lists of proximity criteria.

Method 800 includes an act of partitioning the sorted link list into one or more first sub lists based on a first proximity criterion, each of the one or more first sub lists containing at least a subset of the node IDs from the sorted linked list (act 803). For example, ring 501 can be partitioned into sub-rings 511, 512, 513, and 514 based on criterion 571. Each of sub-rings 511, 512, 513, and 514 can contain a different sub-set of node IDs from ring 501.

Method 800 includes an act of partitioning a first sub list, selected from among the one or more first sub lists, into one or more second sub lists based on a second proximity criterion, each of the one or more second sub lists containing at least a subset of node IDs contained in the first sub list (act 804). For example, sub-ring 511 can be partitioned into sub-rings 521, 522, and 523 based on criterion 581. Each of the sub-rings 521, 522, and 523 can contain a different sub-set of node IDs from sub-ring 511.

Figure 9:
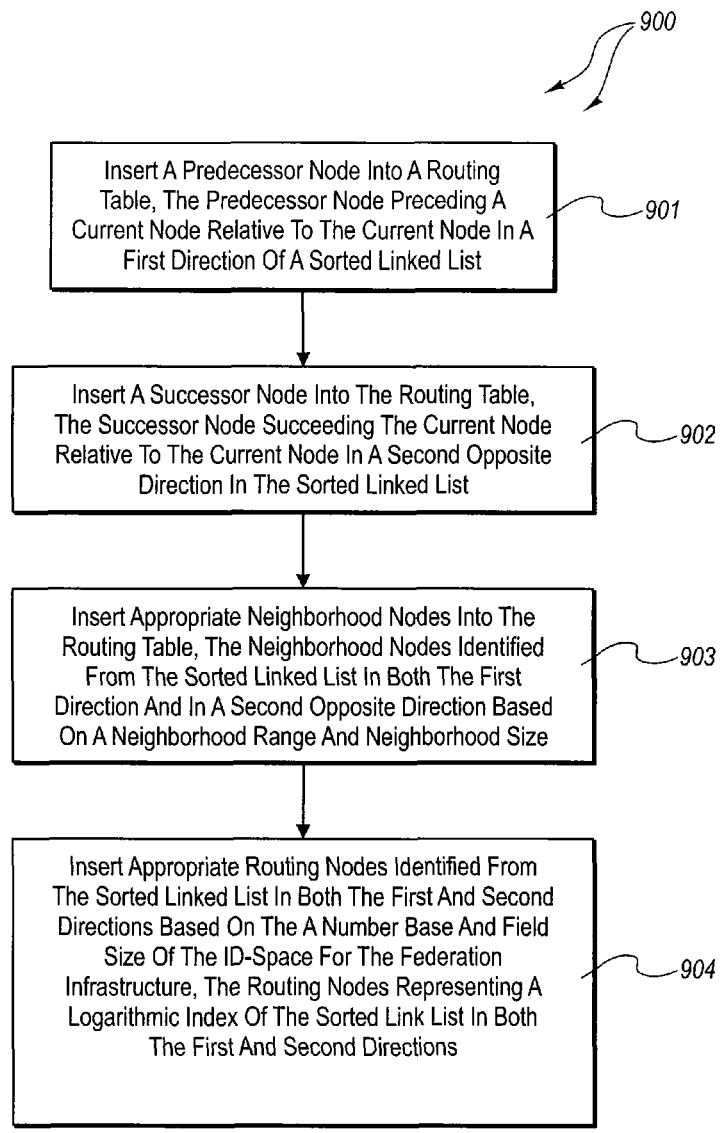
FIG. 9 illustrates an example flow chart of a method for populating a node routing table.

FIG. 9 illustrates an example flow chart of a method 900 for populating a node's routing table. The method 900 will be described with respect to the sorted linked list 304 and ring 306 in FIG. 3. Method 900 includes an act of inserting a predecessor node into a routing table, the predecessor node preceding a current node relative to the current node in a first direction of a sorted linked list (act 901). For example, the node having ID 50 can be inserted into the routing table as a predecessor for the node having ID 64 (the current node). Moving in a clockwise direction 321 (from end A of sorted linked list 304 towards end B of sorted linked list 304), the node having ID 50 precedes the node having ID 64. Inserting a predecessor node can establish a symmetric partnership between the current node and the predecessor node such that current node is a partner of predecessor node and the predecessor node is a partner of the current node Method 900 includes an act of inserting a successor node into the routing table, the successor node succeeding the current node relative to the current node in the first direction in the sorted linked list (act 902). For example, the node having ID 76 can be inserted into the routing table as a successor for the node having ID 64 (the current node). Moving in a counter-clockwise direction 322, the node having ID 76 succeeds the node having ID 64. Inserting a successor node can establish a symmetric partnership between the current node and the successor node such that current node is a partner of the successor node and the successor node is a partner of the current node.

Method 900 includes an act of inserting appropriate neighborhood nodes into the routing table, the neighborhood nodes identified from the sorted linked list in both the first direction and in a second opposite direction based on a neighborhood range and neighborhood size (act 903). For example, the nodes having IDs 83, 76, 50, and 46 can be inserted into the routing table as neighborhood nodes for the node having ID 64 (the current node). Based on a neighborhood range of 20 and a neighborhood size 4, the nodes having IDs 83 and 76 can be identified in clockwise direction 321 and the nodes having IDs 50 and 46 can be identified in counter-clockwise direction 322 (moving from end B of sorted linked list 304 towards end A of sorted linked list 304). It may be that in some environments no appropriate neighborhood nodes are identified. Inserting a neighborhood node can establish a symmetric partnership between the current node and the neighborhood node such that current node is a partner of the neighborhood node and the neighborhood node is a partner of the current node.

Method 900 includes an act of inserting appropriate routing nodes into the routing table, the routing nodes identified from the sorted linked list in both the first and second directions based on the a number base and field size of the ID space for the federation infrastructure, the routing nodes representing a logarithmic index of the sorted link list in both the first and second directions (act 904). For example, the nodes having IDs 200, 2, 30, 46, 50, 64, 64, 64, 64, 64, 76, 83, 98, 135 and 200 can be inserted into the routing table as routing nodes for the node having ID 64. Based on the number base 2 and field size of 8 the nodes having IDs 64, 64, 76, 83, 98, 135 and 200 can be identified in direction 321 and the nodes having IDs 64, 64, 50, 46, 30, 2, and 200 can be identified in direction 322. As depicted inside ring 306, the routing nodes represent a logarithmic index of the sorted link list 304 in both clockwise direction 321 and counter-clockwise direction 322. Inserting a routing node can establish a symmetric partnership between the current node and the routing node such that current node is a partner of the routing node and the routing node is a partner of the current node.

Figure 7:
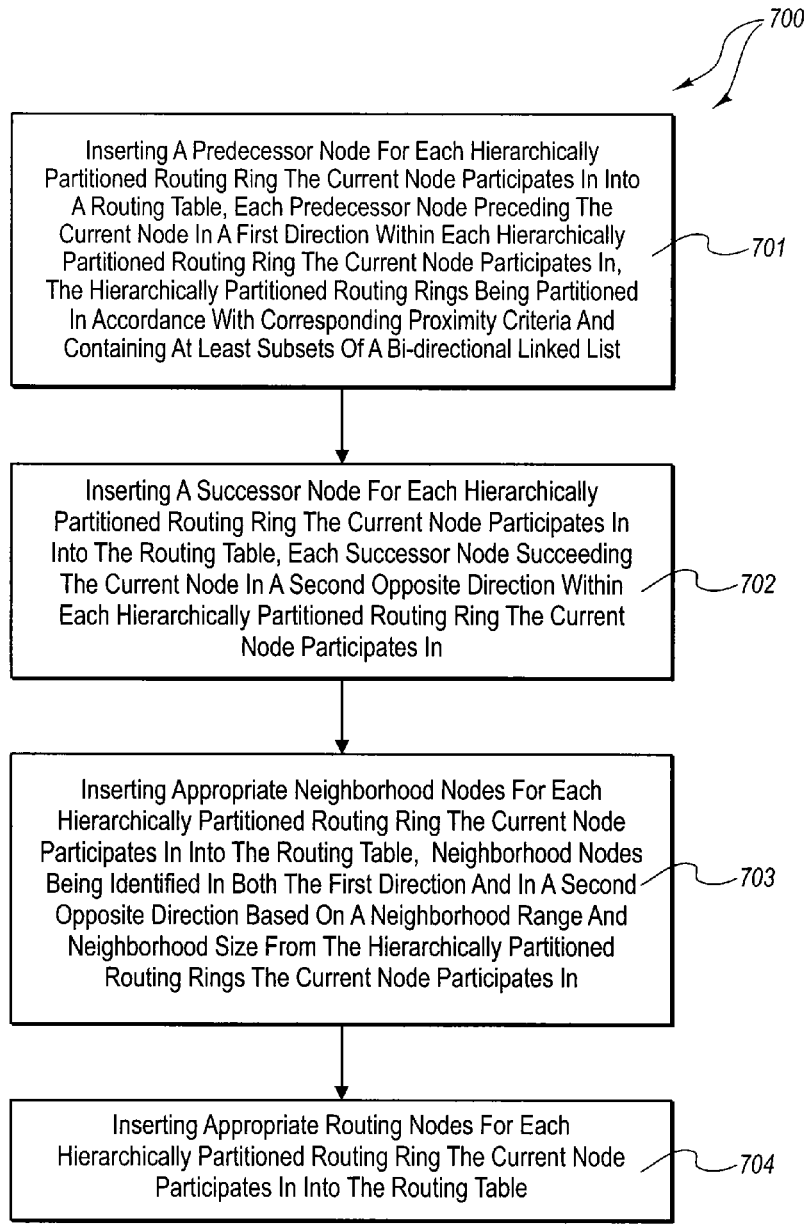
FIG. 7 illustrates an example flow chart of a method for populating a node routing table that takes proximity criteria into account

FIG. 7 illustrates an example flow chart of a method 700 for populating a node routing table that takes proximity criteria into account. The method 700 will be described with respect to the rings in FIG. 5. Method 700 includes an act of inserting a predecessor node for each hierarchically partitioned routing ring the current node participates in into a routing table (act 701). Each predecessor node precedes the current node in a first direction (e.g., clockwise) within each hierarchically partitioned routing ring the current node participates in. The hierarchically partitioned routing rings are partitioned in accordance with corresponding proximity criteria and contain at least subsets of a bi-directionally linked list (and possibly the whole bi-directionally linked list). For example, it may be that a specified node participates in root ring 501 and sub-rings 511, 522, 523, 531, and 542. Thus, a predecessor node is selected for the specified node from within each of the rings 501 and sub-rings 511, 522, 523, 531, and 542.

Method 700 includes an act of inserting a successor node for each hierarchically partitioned routing ring the current node participates in into the routing table (act 702). Each successor node succeeding the current node in the first direction within each hierarchically partitioned routing ring the current node participates in. For example, a successor node is selected for the specified node from within each of the rings 501 and sub-rings 511, 522, 523, 531, and 542.

Method 700 includes an act of inserting appropriate neighborhood nodes for each hierarchically partitioned routing ring the current node participates in into the routing table (act 703). The neighborhood nodes can be identified in both the first direction (e.g., clockwise) and in a second opposite direction (e.g., counter clockwise) based on a neighborhood range and neighborhood size from the hierarchically partitioned routing rings the current node participates in. For example, neighborhood nodes can be identified for the specified node from within each of the rings 501 and sub-rings 511, 522, 523, 531, and 542.

Method 700 includes an act of inserting appropriate routing nodes for each hierarchically partitioned routing ring the current node participates in into the routing table (act 704). For example, routing nodes can be identified for the specified node from within each of the rings 501 and sub-rings 511, 522, 523, 531, and 542.

In some embodiments, appropriate routing nodes are inserted for each proximity ring d except the leaf ring (or leaf rings in embodiments that utilize aliasing), in which the node Y participates. Appropriate routing nodes can be inserted based on the following expression(s):

if $Y.s_d.id < Y.id + b^i < Y.s_{d+1}.id$ is true, then use ring d: or
if $Y.p_d.id < Y.id - b^i < Y.p_{d+1}.id$ is true, then use ring d.

If a ring has not been identified in the previous step, use the lead (e.g., ring 501) ring as ring d. Now, ring d is the proximity ring in which node Y should look for the routing partner closest to z.

Figure 10:
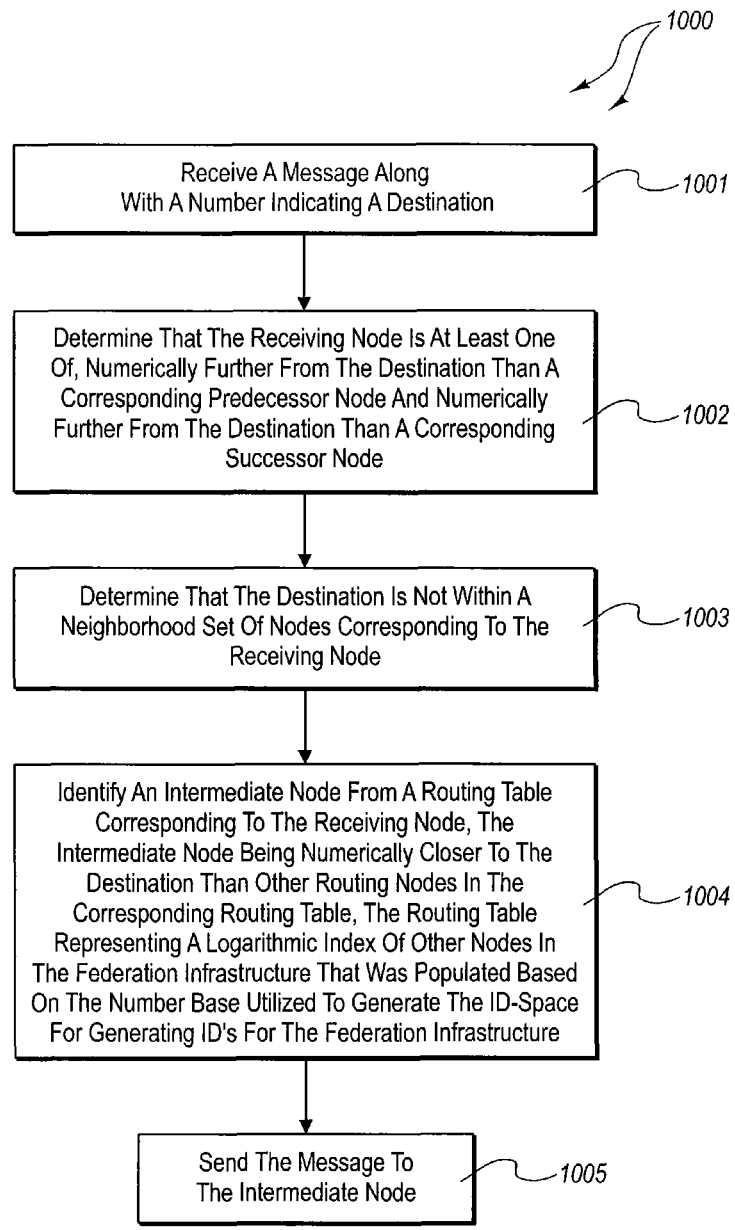
FIG. 10 illustrates an example flow chart of a method for numerically routing a message towards a destination node.

FIG. 10 illustrates an example flow chart of a 1000 method for routing a message towards a destination node. The method 1000 will be described with respect to the sorted linked list 304 and ring 306 in FIG. 3. Method 1000 includes an act of a receiving node receiving a message along with a number indicating a destination (act 1001). For example, the node having ID 64 can receive a message indicating a destination of 212.

Method 1000 includes an act of determining that the receiving node is at least one of numerically further from the destination than a corresponding predecessor node and numerically further from the destination than a corresponding successor node (act 1002). For example, in direction 322, ID 64 is further from destination 212 than ID 50 and, in direction 321, ID 64 is further from destination 212 than ID 76. Method 1000 includes an act of determining that the destination is not within a neighborhood set of nodes corresponding to the receiving node (act 1003). For example, the node with ID 64 can determine that destination 212 is not within the neighborhood set of 83, 76, 50, and 46.

The method 1000 includes an act of identifying an intermediate node from a routing table corresponding to the receiving node, the intermediate node being numerically closer to the destination than other routing nodes in the corresponding routing table (act 1004). For example, the node having ID 64 can identify the routing node having ID 200 as being numerically closer to destination 212 that other routing nodes. The method 1000 includes an act of sending the message to the intermediate node (act 1005). For example, the node having ID 64 can send the message to the node having ID 200.

Figure 11:
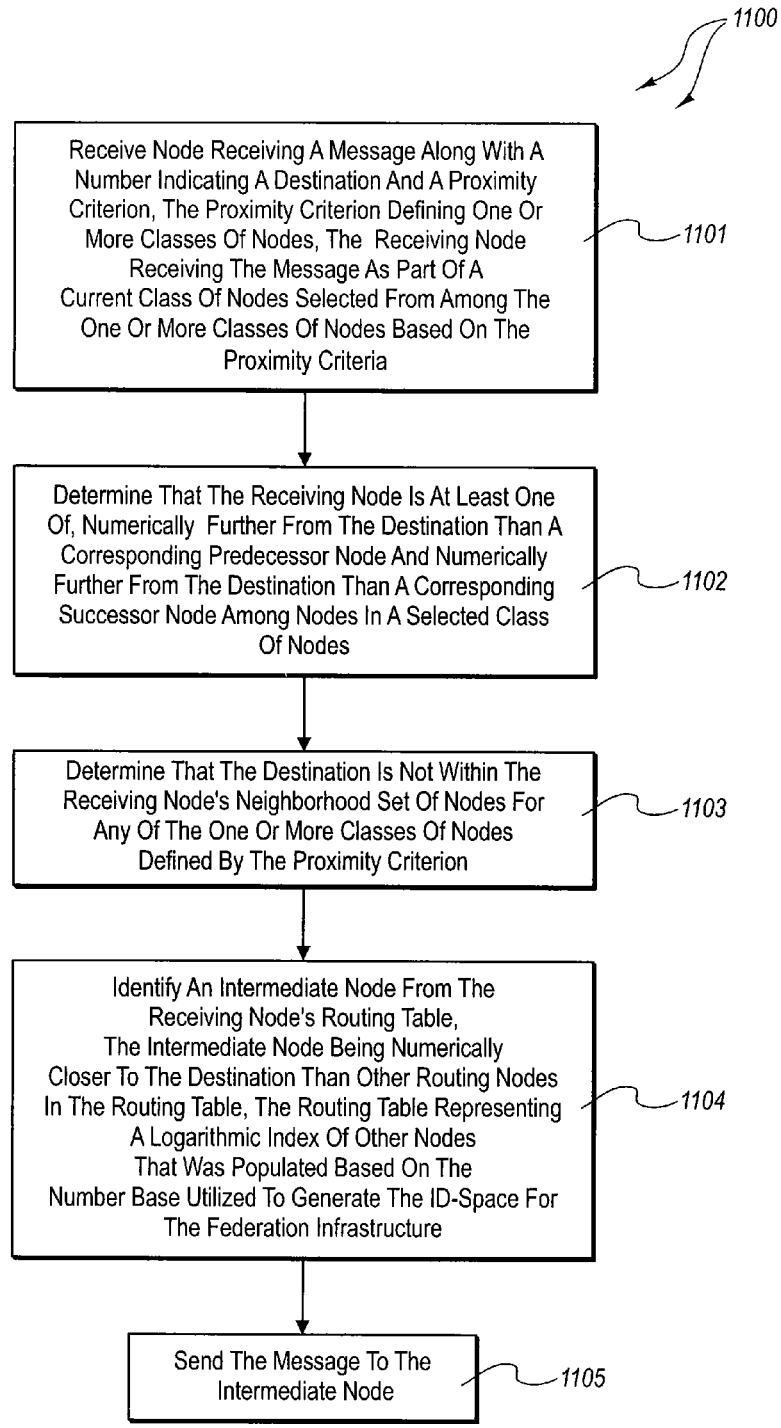
FIG. 11 illustrates an example flow chart of a method for proximally routing a message towards a destination node.

FIG. 11 illustrates an example flow chart of a method 1100 for routing a message towards a destination node based on proximity criteria. The method 1100 will be described with respect to the rings in FIG. 4 and FIG. 5. Method 1100 includes an act of a receiving node receiving a message along with a number indicating a destination and a proximity criterion (act 1101). The proximity criterion defines one or more classes of nodes. The receiving node receives the message as part of a current class of nodes selected form among the one or more classes of nodes based on the proximity criterion. For example, the node having ID 172 can receive a message indicating a destination of 201 and proximity criterion indicating that the destination node be part of classes represented by ring 401. The node having ID 172 can receive the message as part of ring 404.

Method 1100 includes an act of determining that the receiving node is at least one of, numerically further from the destination than a corresponding predecessor node and numerically further from the destination than a corresponding successor node, among nodes in a selected class of nodes (act 1102). For example, within ring 404, the node with ID 172 is further from destination 201 than the node having ID 174 in the clockwise direction and is further from destination 201 than the node having ID 153 in the counterclockwise direction.

Method 1100 includes an act of determining that the destination is not within the receiving node's neighborhood set of nodes for any of the one or more classes of nodes defined by the proximity criterion (act 1103). For example, the node having ID 172 can determine that destination 201 is not in a corresponding neighborhood set in ring 404 or in ring 401.

Method 1100 includes an act of identifying an intermediate node from the receiving node's routing table, the intermediate node being numerically closer to the destination than other routing nodes in the routing table (act 1104). For example, the node having ID 172 can identify the node having ID 194 as being numerically closer to destination 201 than other routing nodes in ring 404. The method 1100 includes an act of sending the message to the intermediate node (act 1105). For example, the node having ID 172 can send the received message to the node having ID 194. The node having ID 172 can send the received message to the node having ID 194 to honor a previously defined partially ordered list of proximity criterion Node 194 may be as close to destination 201 as is possible within ring 404. Thus, proximity can be relaxed just enough to enable further routing towards the destination to be made in ring 401 in the next leg. That is, routing is transitioned from ring 404 to ring 401 since no further progress towards the destination can be made on ring 404. Alternately, it may be that the node having ID 201 is within the neighborhood of the node having ID 194 in ring 401 resulting in no further routing. Thus, in some embodiments, relaxing proximity criteria to get to the next higher ring is enough to cause further routing.

However, in other embodiments, incremental relaxation of proximity criteria causing transition to the next higher ring continues until further routing can occur (or until the root ring is encountered). That is, a plurality of transitions to higher rings occurs before further routing progress can be made. For example, referring now to FIG. 5, when no further routing progress can be made on ring 531, proximity criteria may be relaxed enough to transition to ring 511 or even to root ring 501.

Node Phases

A node participating in a federation infrastructure can operate in different operational phases. Valid phase values for a node can be defined to be members of an ordered set. For example, {NodeId}.{InstanceIds}.{Phase Value [Phase-State Values: Inserting, Syncing, Routing, Operating].[Phase.Unknown Indication: phase known at time of transmission, phase unknown at time of transmission]} defines one possible ordered set representing a phase-space of a given node within a federation infrastructure. A node instance can transition (or advance) through the node phase-states from Inserting to Syncing to Routing to Operating in order. Further, in some embodiments, a node instance can be configured such that the node instance is prevented from transitioning back to a prior node phase-state. In some embodiments, a node advances its instance ID each time the node comes up.

For example, a node instance can prevented from transitioning from Routing back to Syncing (or back to Inserting), etc. Accordingly, in some embodiments, when it is known that a given node instance (e.g., identified by (NodeId, InstanceId)) has advanced to a particular node phase-state (e.g., Operating), it is also known that the given node instance is not likely to (and in some embodiments will not) revert to a prior node phase-state (e.g., back to Routing, Syncing, or Inserting). Thus, there is a significant likelihood that any node instance in a node phase prior to the particular node phase-state is a new (and advanced) instance of the node.

In some embodiments, phase information and corresponding instance Ids (which advance as a node comes up) are transferred together. Thus, it is possible to determine that a lesser node phase-state for the same instance is older. Further, when a newer node instance is known (at any phase-state values) any information about older instances is considered out of date.

From time to time, nodes can reboot or lose communication with one another, such as, for example, when first starting up, through a graceful departure, or as a result of abnormal termination (crash). Thus, there is the potential for a node in any node phase-state to reboot or lose communication with other nodes. For example, a crash can cause a node in a Routing phase-state to reboot. During a reboot or lose of communication, there may be no way to determine what node phase-state a node is in. Accordingly, when a node is rebooting or communication to a node is lost, a [Phase.Unknown Indication] can be set to indicate that the phase-state for the node is currently not known. However, any previously expressed and/or detected phase-state for the node can be maintained and is not lost.

The [Phase.Unknown Indication] can be used to indicate whether a phase-state was known at the time a phase-state value was transmitted (e.g phase value with phase.unknown not set) or if a phase-state is a previously expressed phase-state and the phase-state was not known at the time the phase-state was transmitted (e.g., phase value with phase.unknown set). Thus, the phase of a node (its phase value) can be represented using both a phase-state value and a phase.unknown indication.

Join Protocol

Figure 12A:
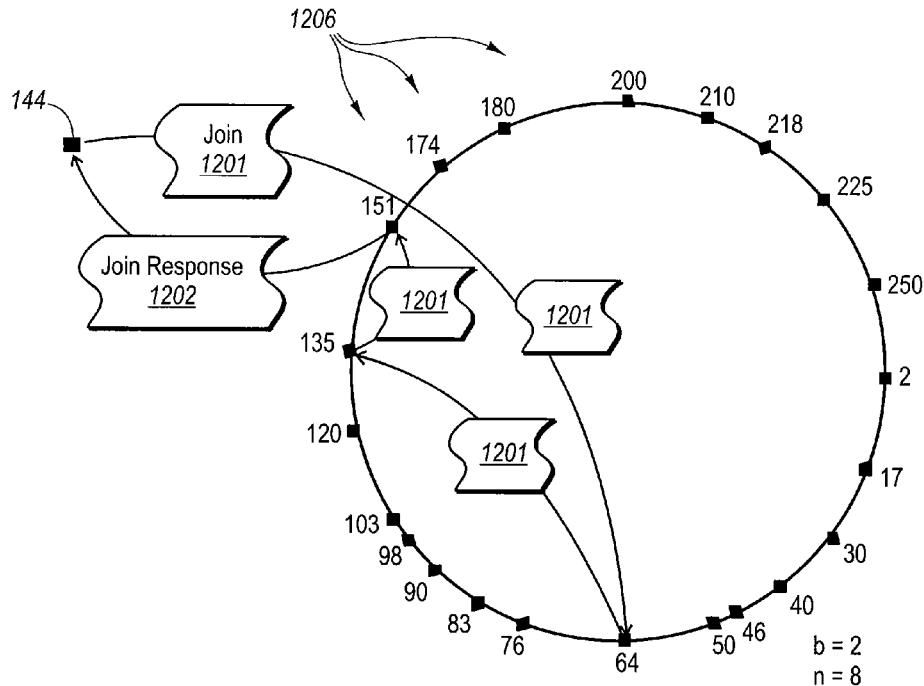
FIG. 12A illustrates an example of a node establishing membership within an existing federation.
Figure 12B:
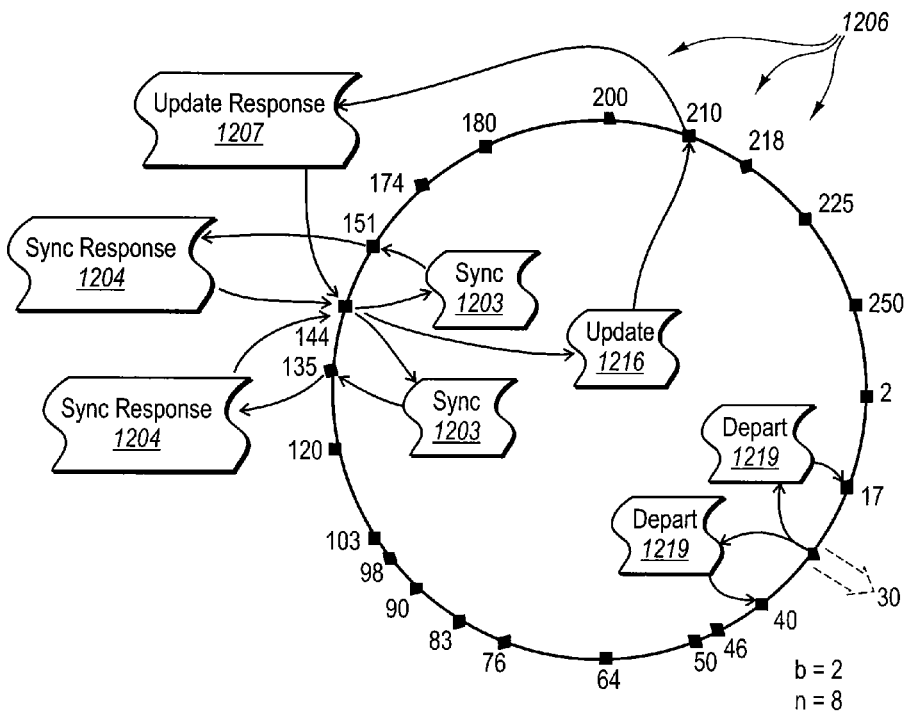
FIG. 12B illustrates an example of nodes in a federation infrastructure exchanging messages.

From time to time, nodes can join to and depart from existing federations. The nodes can implement appropriate protocols for joining and departing federations. For example, a node can implement a Join( ) function to become part of an existing federation. A node implementing the Join( ) function can transition through three ordered phase-states: an inserting phase-state, a synchronizing phase-state, and a routing phase-state before reaching the final operating phase-state. In other embodiments these specific order phase-states may not exist while others may be defined. FIG. 12A illustrates an example of a node establishing membership within a federation infrastructure. FIG. 12B illustrates an example of nodes in a federation infrastructure exchanging messages.

Insertion Phase:

A node, Y, enters this phase-state by issuing a join message, including at least its node ID and indicating a join action to the federation. A join message can be a routed message sent by a newly joining node (node Y) with its destination property set to the identity of the newly joining node. In this phase-state, a newly-joining node is inserted between its predecessor and successor nodes in the federation. The insertion phase-state can be implemented according to the following algorithm (All arithmetic is performed modulo $b^n$):

IP1 Y identifies an existing node that is already part of a lowest ring from which the joining node wishes to participate in the federation. This can either be statically configured or dynamically discovered using DHCP and/or DNS and/or WS-Discovery or a (potentially well-known) constant. Let this existing federation node be E.

IP2. Y invokes E.RouteNumerically(Y, joinMsg) to determine the node X whose ID is numerically closest to Y.id in every proximity ring that the node Y participates. This can include routing a join message to multiple nodes.

IP3. Determine the numerical successor (s) and predecessor (p) nodes. (Note that the data needed to do the following insertion can be carried in the join message and its response. As such, there are no additional roundtrips needed.)

Case 1: X.id>Y.id
Y.s=X, Y.p=X.p, X.p.s=Y, and X.p=Y
Case 2: X.id<Y.id
Y.p=X, Y.s=X.s, X.s.p=Y, and X.s=Y In response to the join message, node X (the node that processed the join message) can send a join response back to node Y. The join response can indicate the predecessor node (Y.p) and successor node (Y.s) for node Y. Node Y can receive the join response and process the join response to become aware of its predecessor and successor nodes. After processing the join response, Node Y can be a weak routing participant in the federation. For example, Node Y can simply forward message sent to it, either to its successor or predecessor nodes. Thus, Node Y is inserted into the federation infrastructure but routing and neighborhood tables are not populated. Before reaching this point, node Y will request other nodes sending it messages to redirect the messages sent to it through a different node by returning a status message to the sending node indicating that node Y's liveness phase is in an inserting phase-state.

Generally, from time to time, nodes can exchange sync request and response messages. Sync request and sync response messages can include liveness information (e.g., headers) for other nodes from the sender's point of view. Neighborhood state can also be included in sync request and response messages such that application layers in a neighborhood are aware of one another's state. One example of when sync request and response messages are exchanged is during a synchronizing phase-state of a joining node. However, sync request and response messages can be exchanged during other operational phase-states as well (e.g. while in the Operating Phase-state).

Figure 16:
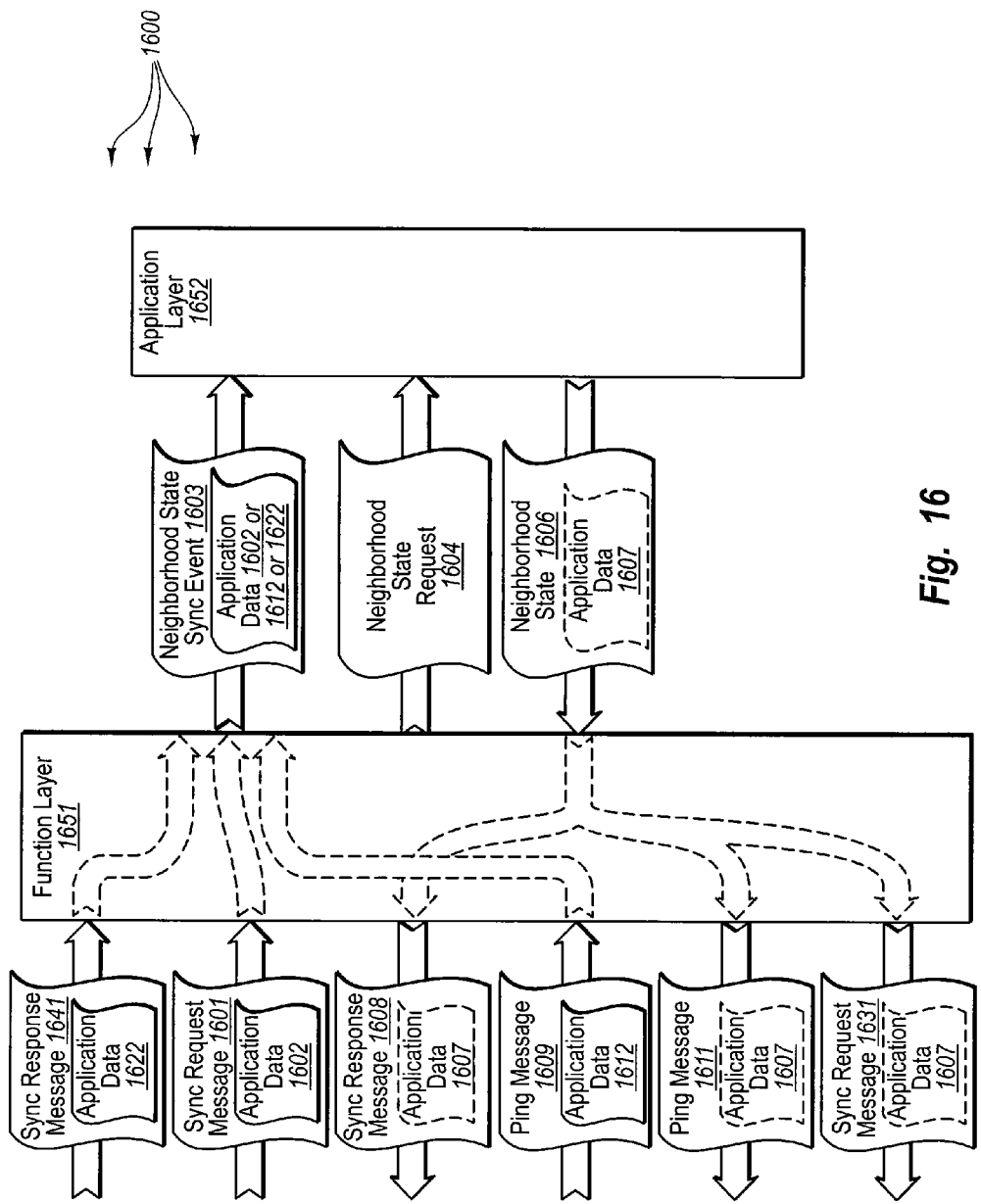
FIG. 16 illustrates an example of a message model and related processing model.

FIG. 16 depicts an example of a message model and related processing model 1600. As depicted in FIG. 16, a node can send and receive sync requests messages. For example, sync request message 1601 can be received at function layer 1651 from a newly inserted node (e.g., the node in FIG. 12B having ID 144). Application data 1602 (e.g., namespace subscriptions) can be piggybacked in sync request message 1601. Function layer 1651 can inform application layer 1652 of any application data included in sync requests messages. For example, function layer 1651 can invoke neighborhood state sync event 1603, including application data 1602, to application layer 1652. Sync request 1631, including application data 1607, can also be sent to another node that processes sync request 1631 similar to the processing to sync request 1601 in processing model 1600.

In response to some function layer event (e.g., sync request message 1601, sync response message 1641, or ping message 1612) function layer 1651 can invoke the neighborhood state request function 1604 in application layer 1652. Neighborhood state request 1604 is a request to the application layer to obtain the state that needs to be propagated in the neighborhood. In response to neighborhood state request 1604, application layer 1652 can supply neighborhood state 1606, including optional application data 1607, to function layer 1651. Alternately, application layer 1652 can send neighborhood state 1606, including optional application data 1607 in reaction to some application layer event. Using internal mechanisms similar to the above, function layer 1651 can send sync response message 1608, including optional application data 1607, to propagate application layer neighborhood state.

Synchronization Phase:

After processing a join response message, a node Y transitions from the insertion phase-state to synchronizing (Syncing) phase-state. In the synchronization phase-state, the newly-inserted node Y synchronizes information with nodes in the neighborhood. Generally, Node Y can send sync messages to at least its predecessor and successor nodes identified in the insertion phase-state. These nodes processing the sync messages can return sync responses that indicate corresponding neighborhood and routing partner nodes of these processing nodes. In a more specific example, the synchronizing phase-state can be implemented according to the following algorithm (All arithmetic is performed modulo $b^n$):

SP1. Compute the Neighborhood(Y) from the union of Neighborhood(Y.s) and Neighborhood(Y.p) nodes in each proximal ring the node Y participates. The union computation can be done as follows:

$(s_j, \ldots, s_1, s, p, p_1, \ldots, pk)$ such that $s_j.s.id > (Y.id + u/2)$, $j \geq v/2 - 1$, $p_k.p.id < (Y.id - u/2)$, and $k \geq v/2 - 1$ SP2. Referring briefly to FIG. 16, query Y's local application layer (e.g., application layer 1652) via a neighborhood state request (e.g., neighborhood state request) 1604 to obtain optional application specific neighborhood data (e.g., application specific data 1607).

SP3. Send synchronize message to at least the proximal successor and predecessor nodes including at least liveness state information of each proximal neighborhood and routing partner node from Y's perspective. Any optional application specific neighborhood data (e.g., application data 1607) accessed via SP 2 is included in the sync request 1631.

SP3. Y receives sync response messages back from those nodes processing sync messages sent in SP2. For example, node Y can exchange synchronize messages (request/response) with one or more nodes within its computed neighborhood. After synchronize messages are exchanged with at least one and potentially all of a node Y's neighborhood nodes, the computed neighborhood nodes can exchange further messages to propagate synchronized data. A synchronization message (request or response) can be a non-routed message sent by a node to proactively synchronize its data with a target node that is, for example, in the nodes neighborhood.

SP4. As sync response message in SP3 are received (e.g., sync response message 1641), any optional application specific neighborhood data present in these received sync response messages (e.g., application data 1622) can be offered to Y's application layer 1652 via neighborhood state sync event 1603.

As part of the synchronizing phase-state, the proximal successor (e.g., Y.s) and predecessor (Y.p) nodes exchange their routing tables with the newly-inserted node (e.g., Y). Nodes that receive sync messages can respond by sending sync responses. Sync responses carry data similar to synchronize messages except from the perspective of the responding node. Both sync messages and sync responses can carry (or piggyback) application data. Thus, application data can be propagated between nodes during the synchronizing phase-state. When the synchronize phase-state is complete, the node can process messages destined for it, instead of simply forwarding them either to a successor or predecessor. However, the node may still be viewed as a weak routing participant because its routing table is not populated.

Routing Phase:

After the synchronizing phase-state is completed, a node transitions into the routing phase-state. In the routing phase-state, the newly-synchronized node (e.g., node Y) computes its routing nodes. The routing phase-state can be implemented according to the following algorithm (All arithmetic is performed modulo $b^n$):

RP1 If the routing phase-state is being executed as part of the balancing procedure (explained later), ensure that the successor node (Y.s) and the predecessor node (Y.p) are alive in every proximity ring the node Y participates. If either is not alive, determine the replacement node for the failed one(s) by choosing a next best successor or predecessor node among the neighborhood nodes in the ring under consideration.

RP2. For $1 \leq i \leq n-1$

RP2a. Compute $z = Y.id \pm b^i$

RP2b. If the ring d is not the most specific proximity, find the proximity ring d in which the node Y participates and satisfying the condition $Y.s_d.id < Y.id + b^i < Y.s_{d+1}.id$ or $Y.p_d.id < Y.id - b^i < Y.p_{d+1}.id$. Else make ring d the most specific proximity ring. Ring d is the proximity ring in which node Y should look for the routing partner closest to z. Let Q be the node numerically closest to z between $Y.s_d.r_{\pm i}$ and $Y.p_d.r_{\pm i}$. If $|Q.id - z|$ is within a configurable percentage of $b^i$ (typically 20%), simply make $Y.r_{\pm i} = Q$. If Q.id is closer to z than either $(Y.s_d.id \pm b^i)$ or $(Y.p_d.id \pm b^i)$, it means node Y is a better partner routing node to node Q in proximity ring d than either $Y.s_d$ or $Y.p_d$. Therefore, send updateMsg to node Q, if it has not already been sent, supplying i and node Y as parameters so that node Q can establish node Y as its partner routing node at $r_{-i}$.

RP2c. If this phase-state is being executed as part of the balancing procedure and if $Y.s_d.r_{\pm i}.id == Y.p_d.r_{\pm i}.id$, there is only one node in the numerical range between $(Y.s_d.id \pm b^i)$ and $(Y.p_d.id \pm b^i)$. That node is the one pointed to by the routing node $r_{\pm i}$ of the successor (or predecessor) node. Therefore, simply make $Y.r_{\pm i} = Y.s_d.r_{\pm i}$.

RP2d. Else, compute the routing partner $Y.r_{\pm i}$ by invoking RouteProximally on node Q with the proximity criterion set to that of ring d. This implies $Y.r_{\pm i} = Q.RouteProximally(z, updateMsg, d)$.

RP3. At this point, node Y can process not only messages destined for it but can also route messages.

Figure 17:
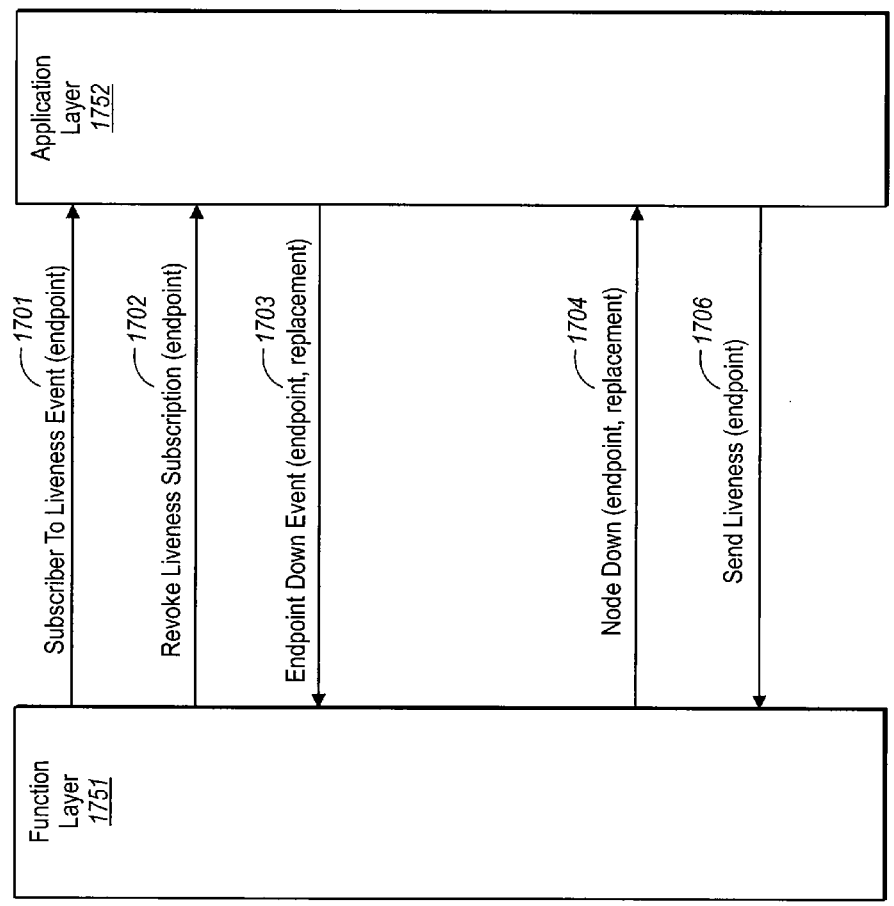
FIG. 17 illustrates an example of a number of liveness interactions that can occur between a function layer and an application layer.

RP4. Subscribe to liveness notification events sent from the application layer for the endpoint IDs of the partner routing nodes, if this has not already been done. Also, revoke any liveness event subscriptions previously established with the application layer for the nodes that are no longer partner routing nodes. For example, subscription and/or revoke requests can be passed up to an application layer (e.g., application layer 121) that implements pub-sub logic for a corresponding application (e.g., a namespace application). When subsequent application specific liveness messages (e.g. those resulting from namespace subscriptions) are received at the application layer, notifications (events) can be pushed down to other lower layers (e.g., other lower layers 131) for processing FIG. 17 depicts an example of a number of liveness interactions that can occur between function layer 1751 and application layer 1752. As depicted in FIG. 17, endpoints are, for example, publish/subscribe topics (e.g., represented by a URL or URI) representing various nodes and can be, for example, federation infrastructure nodes. Subscribe To Liveness Event 1701 can be invoked from function layer 1751 to application layer 1752 to subscribe to a liveness event (e.g., to a publish/subscribe topic). Revoke Liveness Subscription 1702 can be invoked from function layer 1751 to application layer 1752 to revoke a subscription to a liveness event. End Point Down 1703 can be sent from application layer 1752 to function layer 1751 to indicate that an endpoint may be down and provide function layer 1751 with an optional replacement endpoint. End Point Down event 1703 can be sent asynchronously based on a prior subscription (e.g., Subscribe To Liveness Event 1701).

Node Down 1704 can be invoked from function layer 1751 to application layer 1752 to indicate that function layer 1751 (or some other lower layer) has detected a failed node and optionally provide application layer 1752 with a replacement node. Application layer 1752 can subsequently propagate that a potentially failed node was detected to other interested parties. Node down event 1704 can be sent asynchronously anytime function layer 1751 or some other lower layer detects a potentially failed node. Send liveness 1706 can be invoked from application layer 1752 to function layer 1751 when application layer 1752 detects that a node is down (e.g., from node down event 1704 or from some other out-of-band mechanism). Send liveness event 1706 can cause function layer 1751 to send a liveness message. Send liveness event 1706 can also be invoked asynchronously anytime application layer 1752 detects that a node is down and does not depend on any prior established subscriptions (via subscribe to liveness).

Thus, in some embodiments, function layer 1751 is used recursively. For example, function layer 1751 can indicate an interest in a specified node (e.g., is the particular node up or down) to application layer 1752. Application layer 1752 can formulate an application specific subscription for notifications related to the specified node and then reuse function layer 1751 to communicate the formulated subscription to appropriate corresponding application layer 1752 instances in other federation nodes. For example if the application layers 1752 with in federation nodes implemented a namespaces pub/sub behaviors, function layer 1751 can route the subscription to a publish/subscribe manager that manages notifications for the specified node—the pub/sub Manager being implemented as at least part of the application 1752 in the related federation nodes. Accordingly, function layer 1751 is used to route a subscription that function layer 1751 caused to be generated. Similar recursive mechanisms can also be used to unsubscribe or otherwise indicate that there is no longer an interest in the specified node.

Operating Phase:

After the routing phase-state is completed, a node transitions into the operating phase-state. The node can remain in an operating phase-state until it goes down (e.g., rebooting). In the operating phase-state, the node can send update messages to routing partners from time to time. Update messages (both update requests and update responses) can include neighborhood node liveness information for the sending nodes (e.g., for all proximal neighborhoods of interest). This sent liveness information can also include that of the sender's liveness info. Update messages can be routed messages originated by nodes to periodically update its routing partner nodes. Application data can be piggyback on update messages such that application data can be propagated during routing partner updates. The message destination is set to the identity of the perfect routing partner at the desired routing index. The Message ID property of this message is assigned an application sequence number so as to enable the node(s) processing this message to determine the latest message and this message is routed proximally.

A node that receives an update message can respond with an update response. An update response carries the same data as the update message except that the data is from the perspective of the responding node. Through the exchange of update messages and update responses nodes can exchange routing information. From time to time, operational nodes can update routing partners.

From time to time, operational nodes can also send ping messages (e.g., ping messages 1609 and 1611). A ping message is a one-way message sent by a node to periodically announce its presence and disseminate information within its neighborhood about its neighborhood/routing nodes and replicate (e.g., piggybacked) application data.

An origin node can send a ping message to one or more of its immediate predecessor and successor neighborhood nodes. Thus, depending on the ping distribution pattern (i.e., which nodes are sent ping messages) information related to the origin node is propagated to other nodes on a ring within the neighborhood of the origin node. For example, the origin node can send a ping message only to its immediate predecessor and successor nodes and the ping message propagates outward from the position (node ID) of the origin node along the ring in both directions to the edge of the origin's neighborhood. Alternately, the origin node can send a ping message to every $n^{th}$ node in its neighborhood in both its predecessor and successor directions.

Each node receiving a ping message checks its interest in the origin node from a neighborhood range perspective. If not interested, it discards the ping message. If interested it processes the ping message and forwards the ping message according to its specified ping pattern if such forwarding is constrained to the neighborhood of the originating node. For example, after processing a ping message a receiving node can forward the ping message to at least its successor node if the sending and origin nodes are in its predecessor node set or at least its predecessor node if the sending and origin node are in its successor set.

Thus, the outward propagation of ping messages stops when the message reaches the edge of the neighborhood node set around the origin node. The Message ID property of ping message is assigned an application sequence number so as to enable the nodes processing this message to determine the latest message from the origin node and avoid duplicate processing or otherwise unneeded forwarding.

Referring back to FIG. 16, ping message 1609 can be received at function layer 1651 from a neighborhood node. Application data 1612 (e.g., namespace subscriptions) can be piggybacked in ping message 1609. Function layer 1651 can inform application layer 1652 of any application data included in ping messages. Similarly, function layer 1651 can inform application layer 1652 of any application data included in Sync Request messages. Both of these cases of transference can be accomplished via sending a neighborhood state sync event 1603, including application data 1612, to application layer 1652.

In response to some function layer event (e.g., received ping message 1609) function layer 1651 can send neighborhood state request 1604 to application layer 1652. Neighborhood state request 1604 is invoked on the application layer 1652 to obtain the state that needs to be optionally propagated in the neighborhood. In response to neighborhood state request 1604, application layer 1652 can return neighborhood state 1606, including optional application data 1607, to function layer 1651. Function layer 1651 can send ping message 1611, including optional application data 1607, to propagate neighborhood and routing partner node liveness information as well as optional application layer neighborhood state. Function layer 1651 can also send sync response 1608, including optional application data 1607, to propagate application state.

Departure Protocol

When it is appropriate for a node to depart from a federation, the node can implement a Depart function to be gracefully removed from the federation. A node departs an existing federation by sending a departure message to one or more of its immediate proximal predecessor and successor nodes, and maybe other nodes in the same proximal neighborhood. Thus, depending on the departure distribution pattern (i.e., which nodes are sent departure messages) information related to the departing node is propagated to other nodes on a ring within the neighborhood of the departing node. A departure message is a one-way message originated by a gracefully departing node to inform one or more other nodes within at least one of its proximal neighborhoods about its impending departure. The departing node propagates the depart message (e.g., within its neighborhood) in a manner similar to the propagation of the ping messages. For example, the node having ID 30 can send depart messages 1219 to the nodes having IDs 17 and 40. The node having ID 30 can then remove itself from the federation infrastructure from the standpoint of a given proximal ring. Note that it is possible that a node remove itself from one proximal neighborhood but not others to which it may belong.

Since the nodes having IDs 17 and 40 (i.e., the predecessor and successor nodes) are likely to be the closest nodes to ID 30 after the node having ID 30 is removed, the nodes having IDs 17 and 40 are made aware of the node having ID 30's departure. Thus, future messages that are to be delivered to ID 30 can be appropriately processed at the nodes having IDs 17 and 40. The nodes having IDs 17 and 40 can propagate the departure of the node having ID 30 to the other nodes on ring 1206. In the absence of the node having ID 30, the nodes have IDs 17 and 40 can also recompute predecessor and successor pointers, potentially pointing to each other.

The Message ID property of a depart message is assigned the same application sequence ID as that of Ping messages so as to enable the nodes processing the depart message to determine the latest message among a series of ping and depart messages sent by an origin node. Graceful departure from a federation proximal ring is optional but encouraged. However, the federation is designed to self-heal if nodes leave abruptly.

Liveness

During the lifetime of a federation, nodes can exchange liveness information to maintain the federation. Liveness information can be included in virtually any message that is exchanged within a federation in the form of Liveness Message Headers. For example, join messages, join responses, sync messages, sync responses, update messages, update response, application specific messages, liveness messages, and ping messages can all include liveness information headers. When a federation node sends any message or response, the node can include Liveness information for processing by other nodes. Linveness information can be included in a liveness information header of liveness message.

Liveness information indicating the liveness state of a node can be represented using the following properties:

[Node]: Identifies the node whose liveness state is being represented. A node can be identified based on [Reference Properties] that further include an [Instance ID].

[Reference Properties]: Element information items specified in the WS-addressing specification. WS-addressing defines the [Instance ID] reference property for inclusion in the reference property set.

[Instance ID]: A number that identifies a particular instance of a node. An incrementing boot count can be used as the instance ID of a node.

[Phase]: Conveys the phase of identified node.

[Phase-State Value] Conveys the highest phase-state (inserting, synchronizing, routing, operating) that the indicated node instance was know to have achieved

[Phase.Unknown Indication] An indicator that conveys if the current phase is known or unknown.

[Freshness]: Conveys the freshness of the information and its value ranges from 0 to MaxFreshness. The higher the value, the fresher the information with 0 implying no information and MaxFreshness is a protocol defined constant.

[Color]: Identifies the proximity equivalence class to which the node belongs. Two nodes with the same color value are always considered to be proximally closest because they both belong to the same equivalence class identified by the color value. The number of proximity equivalence classes can increase over time as more nodes join the federation.

[Weight]: Supplies the node capability metric and its value ranges from 0 to MaxWeight. It measures the desirable characteristics of a federation node such as large computational power, high network bandwidth, and long uptime. The higher the value, the more capable the node is making it more desirable from a partnership perspective.

In some environments, the [Node] and [Freshness]properties of a node are either implicitly or explicitly conveyed in a larger scope such as the [Origin] and [Sender] message headers and as such inclusion of the above properties again in the liveness headers will be duplicative. For example the sender of a message need only convey its current phase, color, and weight information as its ID, Instance Id are supplied in the message addressing headers and its Freshness is implied.

Liveness state can be at least partially ordered based on a "<" binary relation defined as follows:

"L1<L2" is true if
1. "L1.[Node].[Name]==L2.[Node].[Name]" is true and one of the following is true with the tests performed and short-circuited in the order listed:
   L1.[Node].[Reference Properties].[Instance ID]<L2.[Node].[Reference Properties].[Instance ID]
   L1.[Phase.Unknown Indication]!=true AND L2.[Phase.Unknown Indication]!=true AND L1.[Phase-State]<L2.[Phase-State]
   L1.[Freshness]<L2.[Freshness]
2. Or "L1.[Color]-=L2.[Color]" is true and one of the following is true with the tests performed and short-circuited in the order listed:
   L1.[Phase-State]<L2.[Phase-State]
   L1.[Weight]<L2.[Weight]

Further, a liveness "down" message can be sent to a specified node when it is detected or suspected that the specified node has become unavailable (e.g. gone down). As an example, when an application layer (e.g., application layer 121) detects that another application layer (e.g., application layer 123) or a node hosting that another application layer is down, the detecting application layer can notify other lower layers (e.g., other lower layers 131) that the node may be down, for example, in accordance with message model and related processing models 1600 and/or 1700. Such a notification can cause other lower layers, such as, for example, function layer 1651, to send a liveness down message. This is only one example of stimulus for the generation of liveness down messages.

Since liveness down messages are routed and thus delivered to a node closest to those nodes suspected of being down, if a liveness down message for a specified node gets delivered back to the specified node, then either the specified node never went down or the specified node is a different instance (e.g., with a different instance ID). On the other hand, if the liveness down message gets delivered to another node, it indicates the specified node does appear to have gone down. Accordingly, if the node receiving the liveness down message views itself as being in the proximal neighborhood of the specified node, it may source a departure message for the specified node into that proximal neighborhood as described as well as indicating to its the application layer (e.g., using Node Down 1704) that the specified node may be down and that the receiving node is its replacement. A liveness down message for the specified node can be routed proximally with its target ID set to that of the node that may be down.

Balancing Procedure

Embodiments of the present invention are designed to accommodate large number of nodes joining and departing the federation in a short period of time. Such changes in the network can cause routing delays if the logarithmic search trees maintained at the various nodes become unbalanced. That is, if there are more nodes on one side of a ring than the other. To facilitate optimal routing efficiency, nodes participating in a federation execute the balancing procedure when certain criteria are met.

For example, when any of the following conditions are true, any node can execute the balancing procedure to ensure a balanced routing table for optimal routing efficiency:

A configured number of liveness messages described above were received.

A configured amount of time has elapsed since the receipt of the last liveness message described above.

The neighborhood has changed in the sense that some new nodes have arrived or some existing nodes have departed.

Balancing the routing tables is a simple process. For example, nodes with an unbalanced routing table can re-execute the Synchronization and Routing phase-states of the Join protocol.

Acts RP2b, RP2d and RP4 combined with 1) finding the closest routing node to a number, 2) the departure protocol followed by the nodes leaving a federation gracefully, and 3) balancing procedure followed by the nodes receiving liveness messages result in a the faster healing system when federating nodes join and depart the network fairly quickly and in large numbers.

Status Messages

Figure 18:
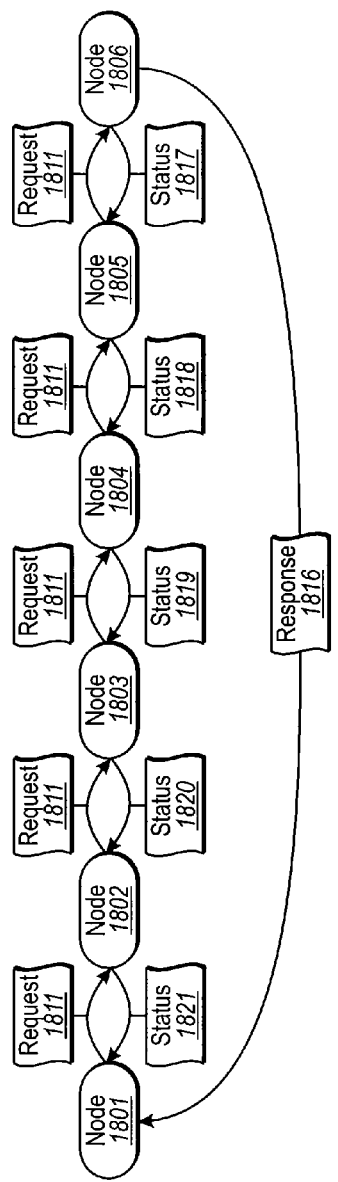
FIG. 18 illustrates an example of messages forming part of a request-response message exchange pattern are routed across nodes on a ring.

A status message is non-routed message sent by a receiver node to a sender node to inform routing success/failure of a correlated message that the sender node previously forwarded to the receiver node. FIG. 18 depicts an example of how messages forming part of a request-response message exchange pattern are routed across nodes on a ring. A status message can include headers that identify the original correlated message whose routing status is being reported. As such, status messages can be used between nodes to indicate that message was successfully routed form one node to the next. For example, routing request message 1811 from node 1801 to node 1806 includes sending request 1811 though nodes 1802, 1803, 1804, and 1805. Corresponding cascading success status messages (status 1817, 1818, 1819, 1820 and 1821) can be sent from node 1806 to node 1805, from node 1805 to node 1804, from node 1804 to node 1803, from mode 1803 to node 1802, and from node 1802 to node 1801 respectively. In response to request 1811, response 1816 can be sent end-to-end from node 1807 to node 1801. Response 1816 is optional and may not exist in a one-way message exchange pattern.

Figure 13:
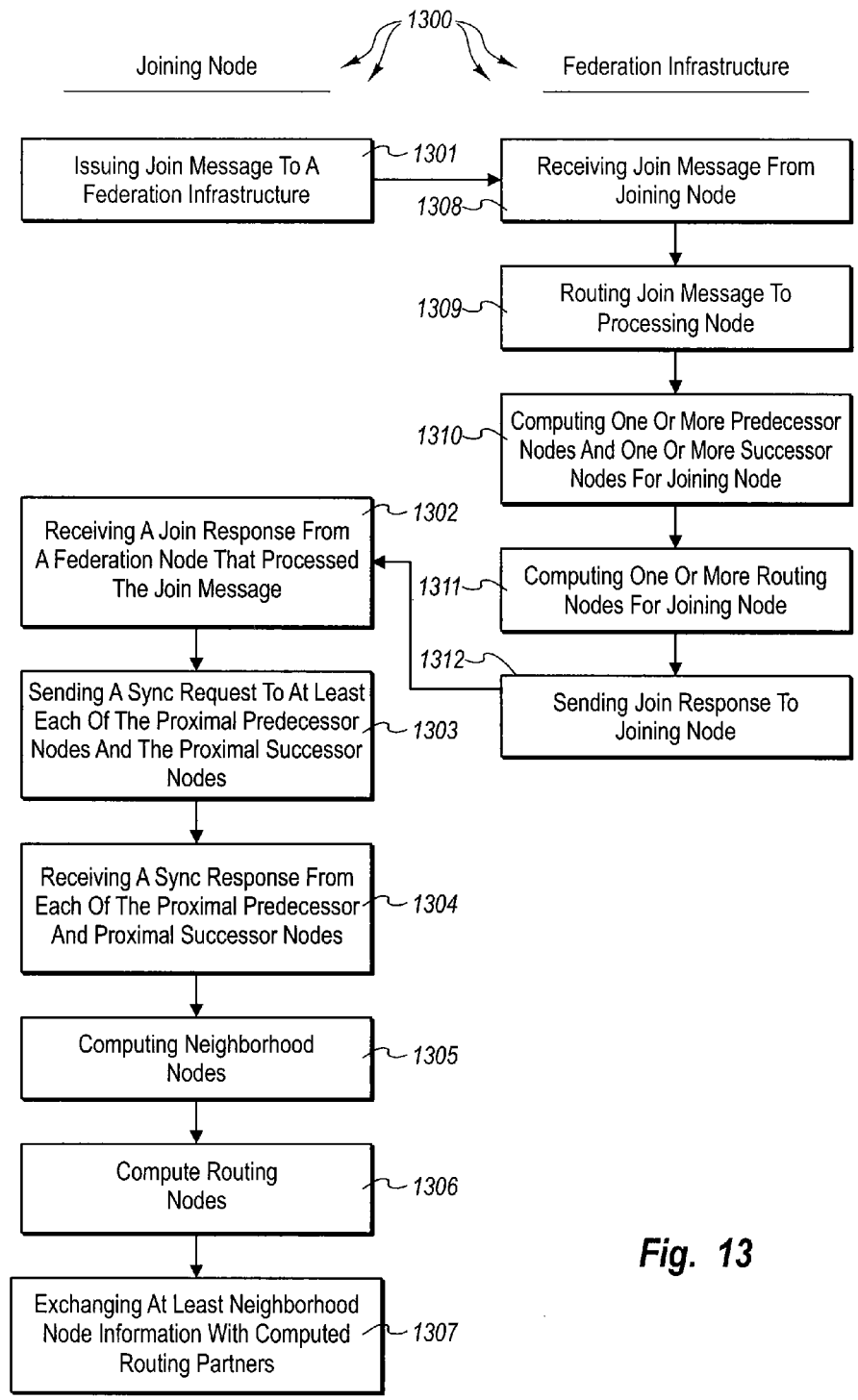
FIG. 13 illustrates an example flow chart of a method for establishing membership within a federation infrastructure.

FIG. 13 illustrates an example flow chart of a method 1300 for a node to join the federation infrastructure. The method 1300 will be described with respect to ring 1206 in FIGS. 12A and 12B. Method 1300 includes an act of issuing a join message to a federation infrastructure (act 1301). For example, the node having ID 144 can issue join 1201 to federation infrastructure including ring 1206. Method 1300 includes an act of receiving a join message from a joining node (act 1308). For example, an existing node in the federation infrastructure including ring 1206 can receive join 1201.

Method 1300 includes an act of routing a join message to a processing node (act 1309). The processing node can be a node having an ID numerically closer the ID of the joining node than other active nodes in the federation infrastructure at the time the join message is being routed. For example, join 1201 can initially be received at the node having ID 64, routed to the node having ID 135 and routing to the node having ID 151.

Method 1300 includes an act of computing one or more predecessor nodes and one or more successor nodes for the joining node (act 1310). For example, the node having ID 151 can compute an immediate predecessor node and an immediate successor node for the node having ID 144. Within ring 1206, the node having ID 151 can compute that the node having ID 135 is an immediate predecessor node that the node having ID 151 is an immediate successor node. Similar computations can be made for other proximal rings.

Method 1300 includes an act of computing one or more routing nodes for the joining node (act 1311). For example, the node having ID 151 can compute routing nodes (from the node having ID 151's perspective) for the node having ID 144. Within ring 1206, the node having ID 151 can compute, for example, that the nodes having IDs 218 and 40 are routing nodes for the node having ID 144. Similar computations can be made for other proximal rings.

Method 1300 includes an act of sending a join response to the joining node (act 1312). A join response can identify all the predecessor and successor neighborhood and routing partner nodes for the joining node as computed by the processing node given its current view of the federation infrastructure. For example, join response 1202 can identify at least the node having ID 135 as the immediate predecessor node to the node have ID 144, can identify the node having ID 151 as the immediate successor node to the node having ID 144, and can identify any routing nodes (for the node having ID 144) computed at the node having ID 151 for node ID 144 (the newly joining node).

Method 1300 includes an act of receiving a join response from a federation node that processed the join message (act 1302). For example, the node having ID 144 can receive join response 1202 from the node having ID 151.

Method 1300 includes an act of sending a sync request to at least each of the immediate proximal predecessor nodes and immediate proximal successor nodes (act 1303). For example, referring now to FIG. 12B, the node having ID 144 can send sync requests 1203 to the nodes having IDs 135 and 151. Sync request 1203 can include an identification of any neighborhood nodes of the node having ID 144 and/or an identification of any routing partners of the node having ID 144.

The nodes having IDs 135 and 151 can receive the sync requests 1203. In response to receiving sync requests 1203, the nodes having IDs 135 and 151 can identify their neighborhood and routing partner nodes from corresponding routing tables. The nodes having IDs 135 and 151 can include their identified neighborhood and routing partner nodes' liveness information in sync response 1204 and send the send sync responses 1204 to the node having ID 144.

Method 1300 includes an act of receiving a sync response from each of the proximal predecessor and successor nodes (act 1304). For example, the node having ID 144 can receive sync responses 1204 from the nodes having IDs 135 and 151. Sync response 1204 can include liveness information for one or more nodes on ring 1206 or other rings in a federation infrastructure. Sync response 1204 can also identify any prospective routing partner nodes for the node having ID 144.

Method 1300 includes an act of computing neighbor nodes (act 1305). For example, the node having ID 144 can compute corresponding neighborhood nodes based on the union of the neighborhood nodes for the nodes having IDs 135 and 151. Neighborhood nodes can be computed based on a summarized view of the join response message and any sync response messages.

Method 1300 includes an act of computing routing nodes (act 1306). For example, the node having ID 144 can compute routing nodes from among the nodes of ring 1206. Routing partners can be computed base on a summarized view of the join response message and any sync response messages.

Method 1300 includes an act of exchanging at least neighborhood node information with computed routing partners (act 1307). For example, the node having ID 144 and the node having ID 218 (a computed routing partner) can exchange state information (e.g., instance ID, phase-state, etc) corresponding to their respective neighborhood nodes. These exchanges are accomplished by the newly joining node sourcing (routing) an Update message to at least each unique computed routing partner as described in the Routing Phase-state text above. The nodes processing the Update message will send corresponding Update response message in reaction to the receipt of these update messages from the newly joining node. The Update response includes at least the liveness information for itself and its neighborhood nodes.

Method 1300 can also include an act of initiating an initial propagation of routing tables to at least one neighborhood node. For example, the node having ID 144 can include computed neighborhood and routing partner nodes in a ping message and send the ping message to the node having ID 174 (e.g., one of the computed neighborhood nodes). The node having ID 174 can receive the ping message and update a corresponding routing table with the liveness information originated at the node having ID 144. The node having ID 174 can also include its corresponding routing table in a second ping message and send the second ping message at some future point to the node having ID 144. The node having ID 144 can receive the second ping message and can update its corresponding routing table with nodes in the liveness information included in second ping message (i.e., nodes in the routing table of the node having ID 174). The node having ID 144 can repeat the sending of ping messages with other neighborhood nodes in ring 1206.

It should be understood that when a newly joining node joins a federation, the newly joining node may not find an existing federation member and thus becomes the sole member. Thus, there may be no predecessor, successor, or neighbor nodes assigned for the newly joining node. Accordingly, the newly joining node is mapped as the best routing partner in all cases.

Further, although the method 1300 has been described with respect to a single ring (ring 1206), it should be understood that in some embodiments a node that joins one ring inherently also joins one or more other rings. For example, referring briefly back to FIG. 5, a node at joins ring 551 inherently also joins rings 543, 531, 522, 511, and 501. Thus, method 1300 can be implemented to join a plurality of rings. In other embodiments some or all of the acts in method 1300 may be repeated when joining multiple rings. For example, referring again to FIG. 5, one or more of the acts of 1300 can be repeated when a node joins both ring 551 and ring 514 (e.g., aliasing). In any event, a joining node ID can be accessed and used to identify a joining node in a sorted linked list as well as corresponding hierarchically partitioned sub-lists the joining node is to participates in. A receiving node is identified from the sorted linked list and each partitioned sub-list. The join message is routed to a processing node (e.g., based on ID) in the sorted linked list and each portioned sub-list. A join response is received from the processing node in the sorted linked list and each partitioned sub-list.

Figure 14:
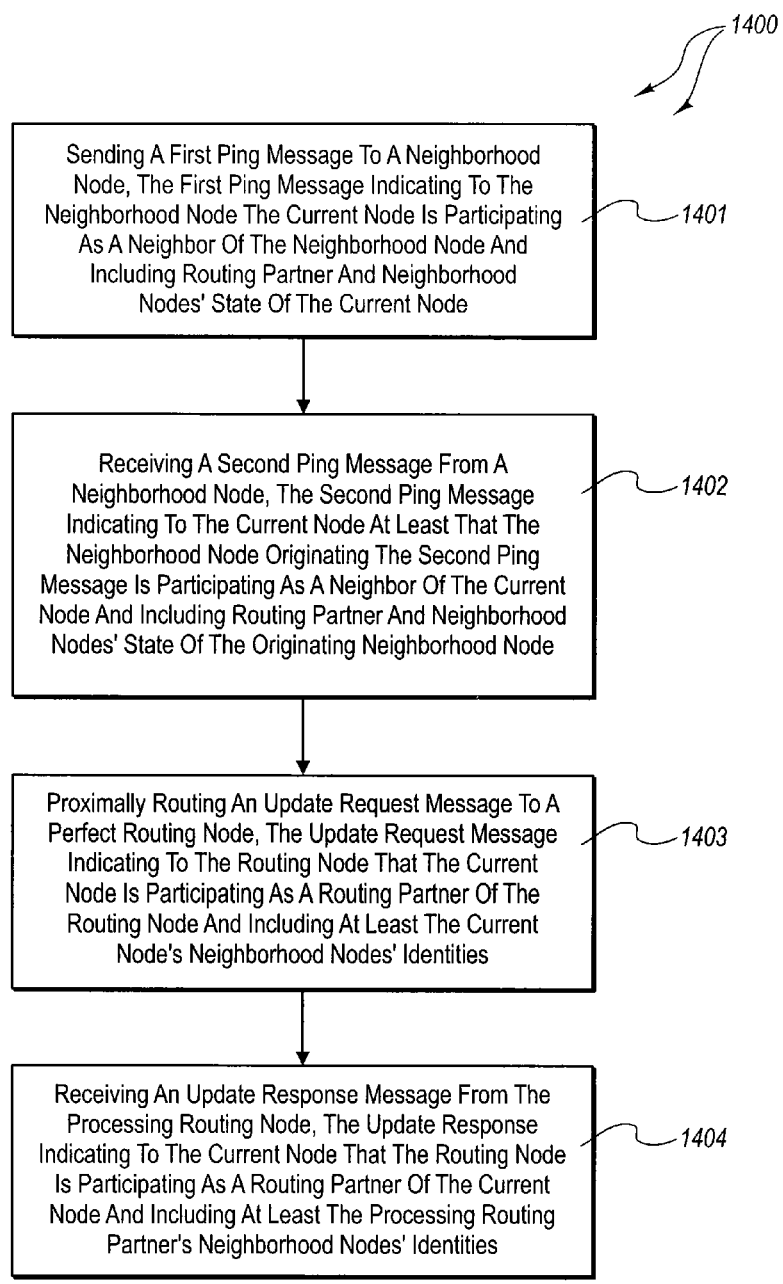
FIG. 14 illustrates an example flow chart of a method for maintaining membership within a federation infrastructure.

FIG. 14 illustrates an example flow chart of a method 1400 for a node to maintain membership in a federation infrastructure. The method 1400 will be described with respect to ring 1206. Method 1400 includes an act of sending a first ping message to a neighborhood node (act 1401). The first ping message indicates that a current node sending the first ping message is neighbor of the neighborhood node. The first ping message can also include routing partner and neighborhood nodes' state of the current node. For example, the node having ID 144 can send a ping message to the node having ID 151. Upon receiving the first ping message, the node having ID 151 is made aware that the node having ID 144 is a neighbor of the node having ID 151. Node 151 may also discover newer liveness information (for other nodes on ring 1206) from node 144 as a side effect of this act.

Ping messages can be periodically repeated at a specified frequency based on, for example, configuration state associated with a proximal ring into which the ping message is to be sent. The frequency can be varied depending on the configuration state. For example a specified ping frequency for a WAN can be different than the specified frequency for a LAN. Ping messages can also be sent in accordance with a ping distribution pattern. The ping distribution pattern for an originating node can indicate that ping messages are to be sent to be neighborhood nodes in both directions on a ring. For example, the node having ID 144 can send pings both in the direction of the node having ID 135 and in the direction of the node having ID 151. Ping distribution patterns and frequencies can be varied. For example, per proximity ring.

Method 1400 includes an act of receiving a second ping message from the neighborhood node (act 1402). The second ping message indicates to the current node at least that the neighborhood node originating the second ping message is a neighbor of the current node. The second ping message can also include routing partner and neighborhood nodes' state of the originating neighborhood node. For example, the node having ID 151 can send a second ping message to the node having ID 144. Upon receiving the second ping message, the node having ID 144 is made aware that the node having ID 151 is a neighbor of the node having ID 144. The second ping message can also include liveness information for other nodes on ring 1206. Thus generally, ping messages can be exchanged within a neighborhood and can be used to maintain neighborhood membership (for each proximal membership) and an approximated common neighborhood view of node presence within the federation.

A received ping message can be periodically repeated/forwarded to other nodes within the proximal neighborhood into which the ping was originated (sent by the originating node). Forwarded ping messages can also be sent in accordance with a ping distribution pattern. The ping distribution pattern for a forwarding node can indicate that ping messages are to be sent to be neighborhood nodes in a direction away from an originating node. For example, the node having ID 1151 can forward pings originating at the node having ID 144 in the direction of the node having ID 174. Ping forwarding distribution patterns can be varied, for example, per proximity ring.

Nodes can be configured to receive ping messages at corresponding intervals. When expected ping messages are not received, a node may interpret a communications failure and set the phase.unknown indication for another node to true for the node that should have originated the expected, but at least late, ping message.

Method 1400 includes an act of proximally routing an update request message to a perfect routing node (act 1403). The update request message indicates to the routing node receiving such a routed update request that the current node is participating as a routing partner of the receiving routing node. The update request message can also include at least the current node's neighborhood nodes' identities (e.g. in the form of liveness information). For example, the node having ID 144 can route update message 1216 to the node having ID 208 (the perfect routing partner offset by 64 from 144). Because node 210 (a previously computed routing node) is closest to 208, it will receive and process the routed update request. Upon receiving update message 1216, the node having ID 210 is made aware (or is reinforced) that the node having ID 144 is a routing partner of the node having ID 210.

Method 1400 includes an act of receiving an update response message from the processing (receiving) routing node (act 1404). The update response indicates to the current node that the processing routing node is participating as a routing partner of the current node. The update response message can also include at least the processing routing partner's neighborhood nodes' identifies. For example, the node having ID 210 can send update response 1207 to the node having ID 144. Upon receiving update response 1207, the node having ID 144 is made aware that the node having ID 210 is a routing partner of the node having ID 144.

Method 1400 can also include an act of appropriately updating node information to indicate that the current node and the neighborhood node are participating as neighbors and that the current node and the neighborhood node are participating as routing partners For example, the node having ID 144 can update node information corresponding to the node having ID 151 to indicate that the nodes having IDs 144 and 141 are participating in a (proximal) neighborhood. Similarly, the node having ID 144 can update node information corresponding to the node having ID 210 to indicate that the nodes having IDs 144 and 210 are participating as routing partners.

In some embodiments, application state saved at a specified node X is replicated among its Neighborhood(X) nodes using reliable-flooding protocol. Each item in the application state has an assigned owner, which could be the endpoint that created the item. Each item in the application state also has an associated timestamp (a.k.a. sequence number) given by its owner. The timestamp has at least three components:

Instance ID (e.g., an unsigned-integer) of the owning entity. Must be at least monotonically (>1) increasing.

Sequence ID (e.g., a URI) identifying the particular sequence generated by an owner. This component allows the same owner to generate multiple independent sequences Ordinal number (e.g., an unsigned-integer) identifying the offset within the identified application sequence ID.

Item timestamps are used to detect latest information associated with the corresponding item during replication because item timestamps generate at least a partial-order with <Instance ID, Sequence ID, and Offset> triples. The timestamp associated with an item being replicated is compared against the local one, if any, to detect the latest one. Item timestamps are also used to support idempotent semantics of create/update/delete operations. For example, when a node receives a request to update an existing item in the application state, the update is accepted only if the timestamp associated with the update request is higher than the one associated with the local item. Conflict resolution techniques based on vector timestamps can be utilized where items cannot be assigned a single owner. Application state replication provides fault-tolerance and facilitates load-balancing requests across neighborhood nodes.

As an optional behavior, Nodes not detecting (after a period of time) an expected Update or Ping from (origin) other partner (routing and/or partner) nodes can consider the phase-state unknown, set a phase.unknown indication to true, and report it as such to other $3^{rd}$ party nodes. In other words periodic generation of updates and pings can be required. This requirement and actual timeout values can be an attribute of various proximal rings. For example, a ring can have more restrictive timing requirements for some sub-rings (e.g., in a LAN segment) and node failure detection/reporting is relatively quick. On the other hand, a ring can have less restrictive timing requirements (or even no timing requirements) for other sub-rings (e.g., on the Internet) and proactive node failure detection/reporting is relative long (or doesn't exist).

Figure 15:
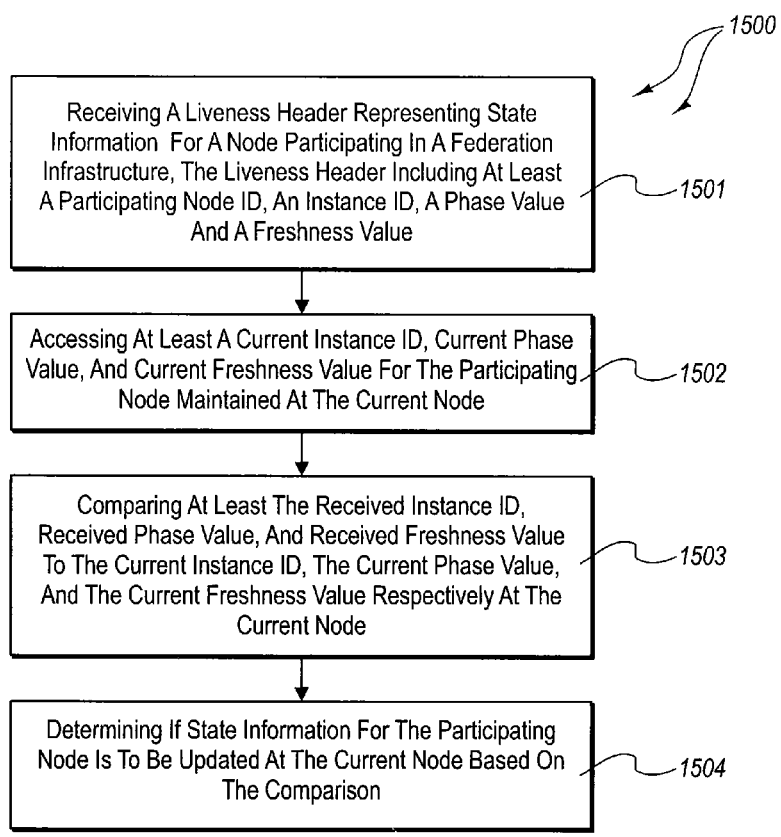
FIG. 15 illustrates an example flow chart of a method for discovering liveness information for another node.

FIG. 15 illustrates an example flow chart of a method 1500 for discovering liveness information for another node. The method 1500 will be described with respect to ring 1206 in FIGS. 12A and 12B. Generally, any message, such as, for example, sync 1203, sync response, 1204, update 1216, update response 1207, etc., can include at least one liveness header. In some embodiments, a liveness header includes a <node ID, instance ID, phase [phase-state value].[phase.unknown indication], freshness value, a color (proximity) value, and a weight value> for a node. In other embodiments, a liveness header includes <a phase [phase-state value].[phase.unknown indication], freshness value, a color (proximity) value, and a weight value>. In these other embodiments, liveness headers can be used to augment addressing headers that already include node ID and instance ID for sender and origin nodes. Since the addressing headers already include node ID and instance ID, this information can be omitted from the liveness header.

Method 1500 includes an act of receiving a liveness header representing state information for a node participating in a federation infrastructure (act 1501). The liveness header includes at a least a received participating node ID, a received node's instance ID, a received phase value, and a received freshness value. For example, the node having ID 144 can receive a first liveness header in sync response 1204 from the node having ID 151. The first liveness header can include a <participating node ID, an instance ID, phase value [phase-state value].[phase.unknown indication], a freshness value, a color (proximity) value, and a weight value> for the node having ID 174. The phase-state value (e.g., Inserting, Syncing, Routing, Operating) identifies the expressed phase of the node having ID 174 at the time of the first freshness value. The phase value (e.g., phase-state: [Inserting, Syncing, Routing, Operating], and phase.unknown) identifies the expressed and/or detected phase information of the node having ID 174 at the time indicated by the first freshness value.

However, a freshness value can be discounted due to communication delay. A freshness value can also decay with the passage of time. The decay curves for a freshness value can differ (and may not be linear or symmetric) for the different phase states (including unknown). Thus, across different node phases, the decay of a freshness value can be non-linear and/or asymmetric.

Method 1500 includes an act of accessing at least a current instance ID, current phase value, and current freshness value for the participating node maintained at the current node (act 1502). For example, the node having ID 144 can access a previous received and stored instance ID, phase value [phase-state value.][phase.unknown indication], and freshness value for the node having ID 174.

Method 1500 includes an act of comparing at least the received instance ID, received phase value, and received freshness value to the current instance ID, the current phase value, and the current freshness value respectively at a current node (act 1503). For example, the node having ID 144 can compare the previously received and stored instance ID, phase value [phase-state value.][phase.unknown indication], and freshness value for the node having ID 174 to the instance ID, phase value [phase-state value.][phase.unknown indication], and freshness value received in the liveness header.

The node having ID 144 can determine that current state information for the node having ID 174 (e.g., received from the node having ID 151) is stale based on (in order) the first instance ID being greater than the currently stored instance ID for the node having ID 174, based on first phase-state value being more advanced than the currently stored phase-state value for the node having ID 174, or based on the first freshness value being a value greater than the freshness value currently stored for the node having ID 174. The node having ID 144 can also determine that at least one phase-.unknown indication (either currently stored or received in the liveness header) indicates that a phase-state was known at the time the phase-state was detected/transmitted.

Method 1500 includes an act of determining if state information for the participating node is to be updated at the current node based on the comparison (act 1504). For example, based on the comparison of values for the node having ID 174, the node having ID 144 can determine that state information for the node having ID 174 is to be updated. Updating outdated state information for the node having ID 174 can include replacing current stored values (e.g., for instance ID, phase-state value, phase.unknown indication, or freshness value) with values included in the liveness header. For example, the node having ID 144 can update state information for the node having ID 174 to indicate that the node having ID 174 has transitioned to a more advanced phase-state.

In some embodiments, it can be detected that communication with the participating node may have been lost. For example, the node having ID 144 can detect that communication with the node having ID 151 has been lost. Referring briefly to FIG. 17, in response to a prior subscription for liveness events 1701 (with an endpoint of the node having ID 151), application layer 1752 can send endpoint down event 1703 (with an endpoint of the node having ID 151) to function layer 1751. In these embodiments such detected liveness conditions can be indicated in liveness information with the Phase.Unknown indicator being set to true along with the last known Phase state value.

Method 1500 can further include an act of receiving a message that includes a second liveness header from a second different node in the federation infrastructure For example, the node having ID 144 can receive a status message (from the node having ID 103 or some other node of ring 1206) that includes a second liveness header. The second liveness header can include <the participating node ID, a second instance ID, a second phase value [phase-state value].[phase.unknown indication], a second freshness value, a second color (proximity) value, and a second weight value> for the node having ID 174. The second phase value (e.g., phase-state: [Inserting, Syncing, Routing, Operating], and phase.unknown indication) identifies the expressed/detected phase of the node having ID 174 at the time of the second freshness value.

Alternately, subsequent to receiving the first liveness header, the node having ID 144 can attempt to communicate directly with the node having ID 174. If communication is successful, the node having ID 174 can return a message (e.g., sync response) having the node ID and second instance ID in an addressing header and having a liveness header including <the second phase value, the second freshness value, the second color (proximity) value, and the second weight value>. If a failure is detected, the node having ID 144 generates an internal liveness state change (e.g. freshness=max, and phase.unknown indication=true) and processes the state change as if the state change were received from another node. Such a state change has highest freshness value.

Method 1500 can also include an act of comparing the second instance ID, the second phase value, and the second freshness value to the current instance ID, the current phase value, and the current freshness value respectively (act 1506). For example, after receiving a status message from the node having ID 103, the node having ID 144 can determine that current state information for the node having ID 151 is stale based on (in order) the second instance ID being greater than the first instance ID, the second phase being more advanced than the first phase value, or the second freshness value being greater than the first phase value.

Method 1500 can also includes an act of determining if state information for the participating node is to be updated based on the comparison. For example, based on the comparison of values for the node having ID 174, the node having ID 144 can determine that state information for the node having ID 174 is to be updated. Updating outdated state information for the node having ID 174 can include replacing current stored values (e.g., for instance ID, phase-state value, phase.unknown indication, or freshness value) with values included in the second liveness header. For example, the node having ID 144 can update state information for the node having ID 174 to indicate that the node having ID 174 has transitioned to a more advanced phase-state.

In some embodiments, phase values are compared within the context of equal color values. As previously described, a node can participate in multiple proximity rings. Participation in multiple proximity rings can occur as a result of participation in a more specific ring implying participation in a more general ring (along a common spine). For example, referring back to FIG. 5, a node's participation in ring 532 also implies that the node is participating in rings 522, 511, and 501. Thus, a color for a more specific ring also represents all parent proximal rings. Also as previously described, participation in multiple proximity rings can occur when a node in one ring is aliased into one or more other rings (potentially along different spines). For example, still referring to FIG. 5, a node participating in ring 532 can be aliased into ring 531 (or even ring 541 that would imply participation in rings 531, 522, 511, and 501). Thus, a color for one ring (e.g., ring 531) can be viewed as a peer color (or proximity) of another ring (e.g., ring 532).

When a node participates in a plurality of proximity rings in an aliased fashion, there is some potential that phase values (e.g., phase-state values and/or phase.unknown indications) for the node will differ between different proximity rings. Thus, a node that receives state information for another node, identifies the corresponding proximity ring for the state information (color) before determining if current state information is to be updated for that node and color. For example, the node having ID 144 can identify the corresponding proximity ring for received state information corresponding to the node having ID 174 before comparing the received state information to current state information.

Identifying an appropriate proximity ring can include comparing a received color value to one or more current color values. When the received color value and a current color value are equal, other state information, such as, for example, a current instance ID, a current phase value, and a current freshness value, can be compared to corresponding received state information, such as, for example, a received instance ID, a received phase value, and a received freshness value. On the other hand, when the received color value and a current color value differ, further comparisons do not occur.

Equality between color values can result in a variety of ways. For example, equality between color values can result when a current color value and a received color value indicate the same proximity ring (e.g., ring 532). Further, equality between color values can result when a more specific color value is compared to a corresponding parent color value (e.g., another ring along the same spine). For example, comparing the color value for ring 532 to the color value for ring 511 (or ring 522 or 501) can result in equality. Thus, the child proximity is the parent proximity but is more specific.

Thus generally, currently operational nodes in a federation infrastructure can exchange expressed and detected liveness state information for other nodes even when communication with those other nodes appears to be lost.

Bootstrapping Mechanisms

Generally, in order for a node to become an active member of a federation (e.g., join), the node has to communicate with at least one other node that is already an active member of the leaf ring it intends to join. To help insure this initial form of communication is available, federations can utilize a bootstrapping mechanism. A bootstrapping mechanism can be used as a last resort when other types of communication fail to identify an active member of a leaf ring or security constraints require a newly joining node to initially communicate with at least one of a set of special nodes such as seed nodes. That is when other types of communication fail or because of security requirements, a bootstrapping mechanism can be used to identify an active member node of a leaf ring.

In some embodiments, seed nodes are used to bootstrap communication with a federation. Seed nodes provide well known points of entry for some types of cross (inter) proximity communication. Seed nodes help heal ring partitions due to infrastructure failure/recovery and general dynamism. Each ring can have at least one operational seed node in order to provide basic bootstrapping properties for a federation.

Peer seed nodes can communicate amongst themselves to maintain a ring structure (e.g., a doubly linked list) for a proximity that consists of at least all active seed nodes for that proximity. A dedicated seed node synchronization protocol can be used to provide each seed node with at least total knowledge of all other seed nodes' presence (active) state. An active seed node is a member node of the proximity leaf ring in which it is homed as well as all other ancestral rings of the leaf ring. Thus, a seed node can represent an entire spine of proximity rings, for example, from the seed node's leaf ring to the root ring. Accordingly, seed nodes can function as highly available and well known entry nodes in each of those proximity rings. As a result, presence state about seed nodes can be useful for various forms of communication (e.g., inter-proximal communication) within a federation. Accordingly, seed nodes can provide a number of special properties, such as, for example, acting as well known "join points" for joining nodes, acting as a secure ring authority, aiding in healing infrastructure partitions, and acting as a stable "entry node" for each of their proximities.

To provide presence data, a seed node's arrivals and orderly departures can be registered as a stable entry node at a rendezvous point in each of their proximities. For example, registration messages can be routed to a fixed URI whose destination ID is the SHA-1 hash of the string "Proximity:/". While in one embodiment seed nodes acting as stable entry nodes register themselves in this manner there are other embodiments where selected non-seed nodes may also register themselves in the same manner and with the same or similar protocols described here for seed node. When a stable entry node (such as a seed node) registers, the stable entry node can indicate each ring it is a member of. Thus, information maintained at the rendezvous point identified by this fixed URI is essentially a list of stable entry nodes and their corresponding ring memberships. Accordingly, any node can refer to the rendezvous point identified by this fixed URI to obtain a list of available stable entry nodes and their ring memberships.

In one embodiment the stable entry node directly registers these arrival and departure events. In another embodiment, the stable entry node registers these events directly at a rendezvous point within it's immediate proximity ring and that rendezvous point transparently facilitates (directly or indirectly) updating of all other appropriate rendezvous points in each of the remaining proximities rings to which the registering/unregistering stable entry node belongs. The application state sequencing and propagation properties of a federation can be used to maintain and propagate this stable entry node registration information. For example, a reliable-flooding protocol can be used to replicate saved application state among a node's Neighborhood nodes.

The promotion of a stable entry node's presence data towards the root ring allows other nodes in a federation to look up at least one entry node in every proximity. Entry Node Lookup can be facilitated by routing a node lookup message towards the above determined rendezvous point in the Lowest Common Ancestor Ring ("LCAR") of the leaf ring of the node performing the lookup and the desired proximity ring. For example, referring to FIG. 5, a node in ring 541 may desire to communication with a node in ring 533. However, the node in ring 541 may have no direct knowledge of any node in ring 533. Thus, the node in ring 541 can send a Node Lookup Message to ring 522 (the LCAR of ring of ring 541 and ring 533). A rendezvous point node in ring 522 that processes entry node presence information (e.g. caused to exist in the system because of a registration message originated by that entry node) can return a Lookup Response Message with contact information for at least a registered stable entry node in ring 533.

In some embodiments, stable entry nodes are seed nodes configured specifically as stable entry nodes for maintaining presence data for various proximities. In other embodiments, other types of nodes can also function as stable entry nodes maintaining presence data for various proximities and may also be configured to perform other operations. For example, certain other types of nodes may be configured (e.g., by an administrator) as being highly available and thus suitable as a stable entry node (i.e. to be registered as described above). However, the other types of nodes may not include additional seed node functionality (e.g., may not be trusted as a security ring authority). In some embodiments, rendezvous points that maintain entry node presence state for their immediate proximity may register themselves as a stable entry node in the ancestral ring or rings.

Node Monitoring

Figure 19A:
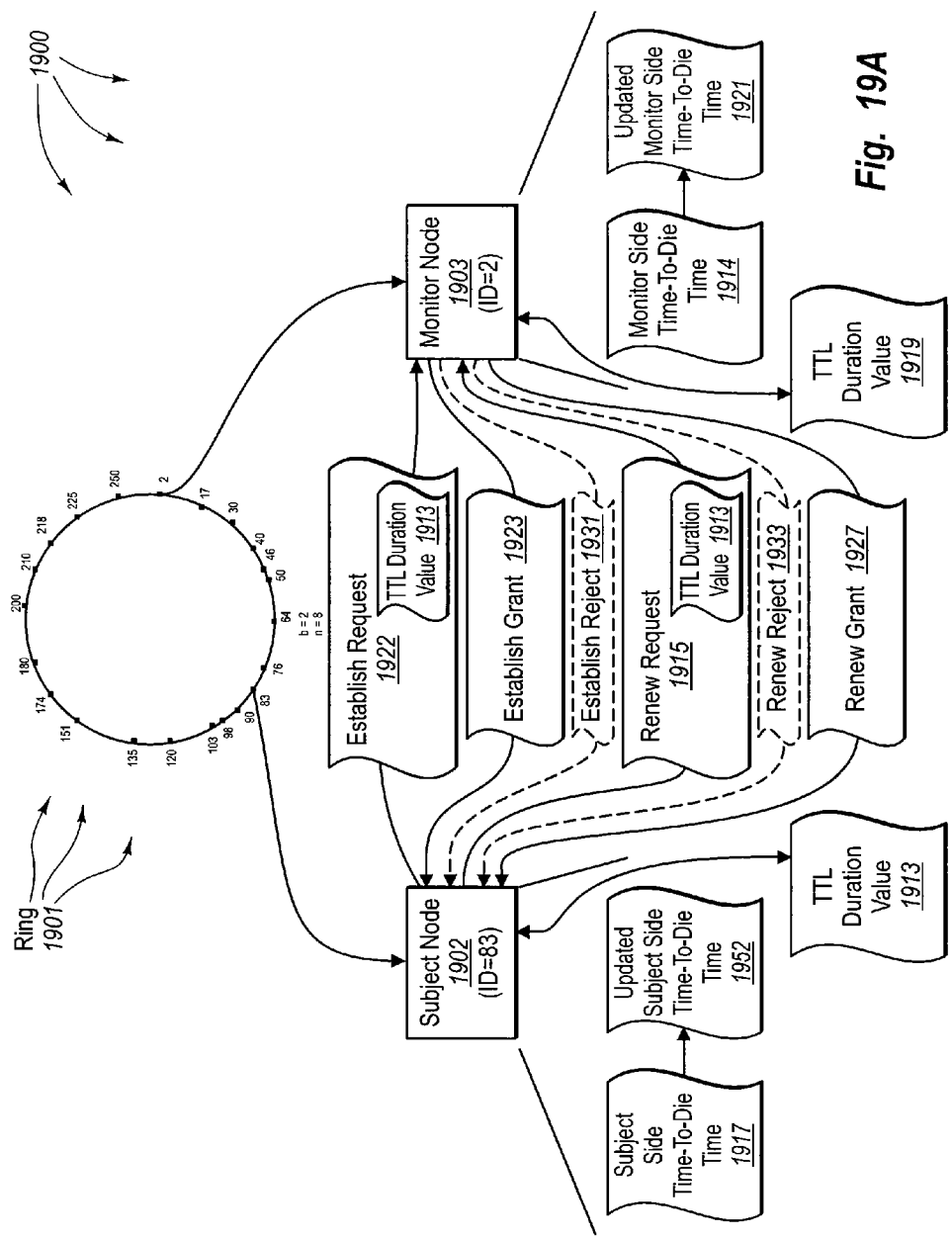
FIG. 19A illustrates an example ring architecture that facilitates one node monitoring another (e.g., subject) node.

FIG. 19A illustrates an example ring architecture 1900 that facilitates one node monitoring another node. As depicted, ring architecture includes at least ring 1901 (and any number of other higher and/or lower level rings (not shown)). Ring 1901 can be configured similar to ring 306 of FIG. 3. However, monitoring can occur on any ring of nodes, including any of the rings in FIGS. 4, 5, 12A, and 12B. FIG. 19A depicts an expanded view of subject node 1902 (having ID=83) and monitor node 1903 (having ID=2). In the depicted embodiment, monitor node 1903 is to monitor subject node 1902. However, any node on ring 1901 can be configured to monitor any other node on ring 1901.

Figure 20:
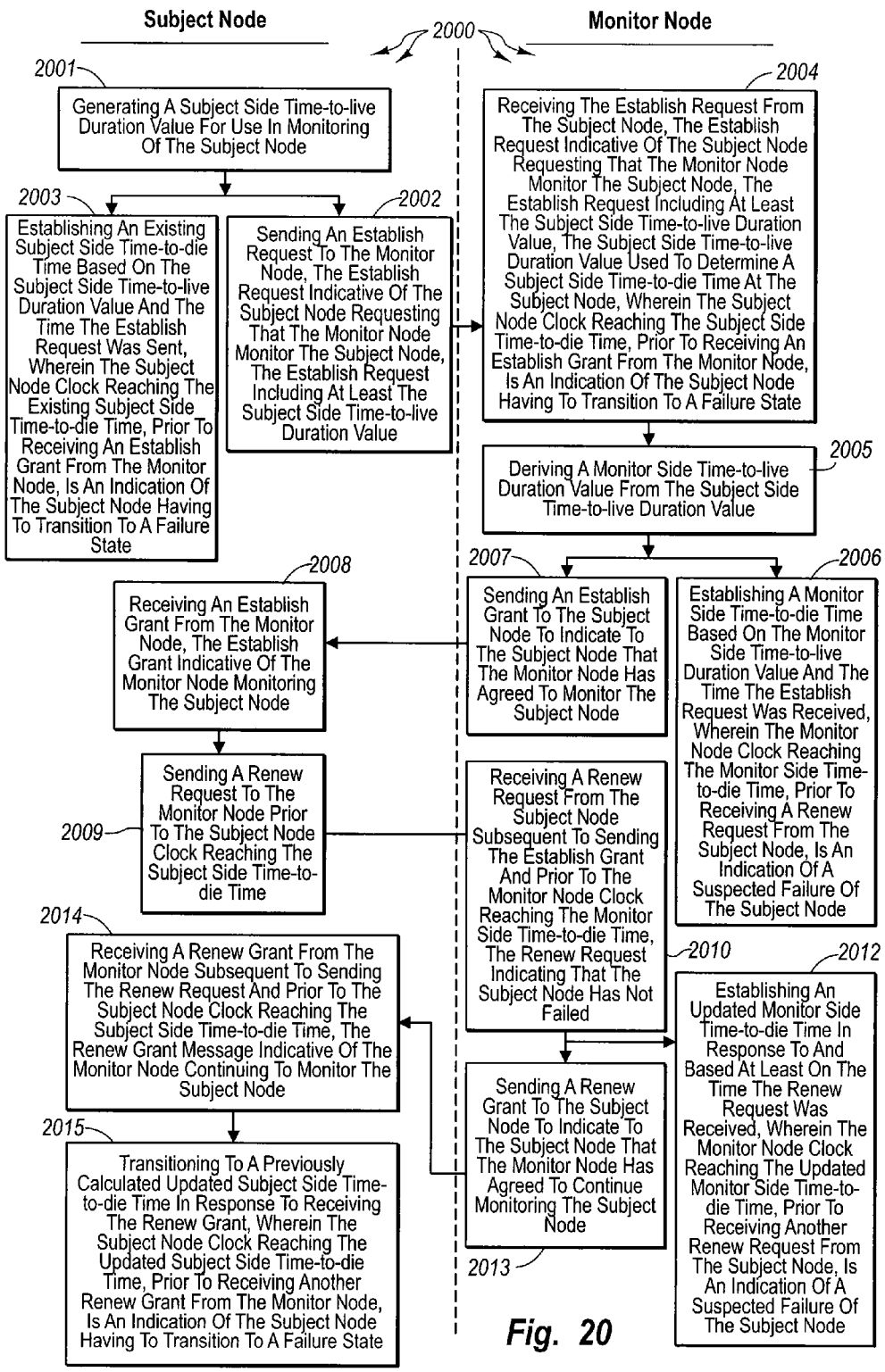
FIG. 20 illustrates an example flow chart of a method for one node to monitor another node.

FIG. 20 illustrates an example flow chart of a method 2000 for one node to monitor another node. The method 2000 will be described with respect to the data and components depicted in FIG. 19A.

Method 2000 includes an act of the subject node generating a subject side time-to-live duration value for use in monitoring of the subject node (act 2001). For example, subject node 1902 can establish time-to-live (TTL) duration value 1913. TTL duration value 1913 indicates a duration for which subject node 1902 can assume a monitoring relationship with monitor node 1903 is active.

Method 2000 includes an act of the subject node sending an establish request to the monitor node, the establish request indicative of the subject node requesting that the monitor node monitor the subject node, the establish request including the subject side time-to-live duration value (act 2002). For example, subject node 1902 can send establish request 1922, including TTL value duration 1913, to monitor node 1903.

Method 2000 includes an act the subject node establishing an existing subject side time-to-die time based on the subject side time-to-live duration value and the time the establish request was sent, wherein the subject node clock reaching the existing subject side time-to-die time, prior to receiving an establish grant from the monitor node, is an indication of the subject node having to transition to a failure state (act 2003). For example, subject node 1902 can establish subject side time-to-die time 1917 based on TTL duration value 1913 and the time the establish request 1922 was sent to monitor node 1903. Subject side time-to-die time 1917 can be a time relative to subject node 1902. If a clock of subject node 1902 reaches subject side time-to-die time 1917, prior to receiving an establish grant form monitor node 1903, subject node 1902 is to transition to a failure state. In some embodiments, when a clock of subject node 1902 reaches subject side time-to-die time 1917, prior to receiving an establish grant from monitor node 1903, a failure state is caused. In other embodiments, other activities occur to transition subject node 1902 into a failure state.

Method 2000 includes an act of the monitor node receiving the establish request from the subject node, the establish request indicative of the subject node requesting that the monitor node monitor the subject node, the establish request including at least the subject side time-to-live duration value, the subject side time-to-live duration value used to determine a subject side time-to-die time at the subject node, wherein the subject node clock reaching the subject side time-to-die time, prior to receiving an establish grant from the monitor node, is an indication of the subject node having to transition to a failure state (act 2004). For example, monitor node 1903 can receive establish request 1922, including TTL duration value 1913, from subject node 1902. TTL duration value 1913 having been used at subject node 1902 to establish subject side time-to-die time 1917.

Method 2000 includes an act of the monitor node deriving a monitor side time-to-live duration value from the subject side time-to-live duration value (act 2005). For example, monitor node 1902 can use TTL value duration 1913 to derive TTL duration value 1919. In some embodiments, monitor node 1903 copies TTL duration value 1913 to derive TTL duration value 1919. In these embodiments, TTL value duration 1913 and TTL value duration 1919 are equal. In other embodiments, monitor node 1903 modifies TTL duration value 1913 to derive TTL duration value 1919. In these other embodiments TTL duration value 1913 and TTL duration value 1919 differ. For example, monitor node 1903 can increase the value of TTL duration value 1913 to derive TTL duration value 1919 such that TTL duration value 1919 is larger than TTL duration value 1913.

Method 2000 includes an act of the monitor node establishing a monitor side time-to-die time based on the monitor side time-to-live duration value and the time the establish request was received, the monitor node clock reaching the monitor side time-to-die time, prior to receiving a renew request from the subject node, being indicative of a suspected failure of the subject node (act 2006). For example, monitor node 1903 monitor side time-to-die time 1914 based on TTL duration value 1919 and the time establish request 1922 was received. Monitor side time-to-die time 1914 can be a time relative to monitor node 1903. If a clock of monitor node 1903 reaches monitor side time-to-die time 1914, prior to receiving a renew request from subject node 1902, monitor node 1903 suspects subject node 1902 of failure.

Method 2000 includes an act of the monitor node sending an establish grant to the subject node to indicate to the subject node that the monitor node has agreed to monitor the subject node (act 2007). For example, monitor node 1903 can send establish grant 1923 to subject node 1902. Method 2000 includes an act of the subject node receiving an establish grant from the monitor node, the establish grant indicative of the monitor node monitoring the subject node (act 2008). For example, subject node 1902 can receive establish grant 1923 from monitor node 1903. Generally, establish grant 1923 indicates that monitor node 1903 has agreed to monitor subject node 1902. In some embodiments, the establish grant message can include the monitor side TTL duration value. For example, it may be establish grant 1923 includes TTL duration value 1919.

Alternately, a monitor node can send an establish reject to a subject node to indicate to the subject node that the monitor node has not agreed to monitor the subject node. For example, in response to receiving establish request 1922, monitor node 1903 can alternately (as indicated by the dashed line) send establish reject 1931 to subject node 1902. A subject node can receive an establish reject sent from a monitor node. For example, subject node 1902 can receive establish reject 1931 from monitor mode 1903. Establish reject 1931 generally indicates to subject node 1902 that monitor node 1903 has not agreed to monitor subject node 1902.

From time to time (and intermingled between the performance of other operations within ring architecture 1990), a subject node can renew an established monitoring agreement with a monitor node. Generally, the subject node leaves the existing agreement in force (the current subject-side-time to die time) until a new grant is received. However, the subject node can generate a new TTL duration value and derive what an updated time-to-die time would be. The subject node then sends the new TTL duration value to the monitor node. The monitor node receives the new TTL duration value. When appropriate the monitor node grants the renew request and sends a renew grant back to the subject. The subject node receives the renew grant. In response to receiving the renew grant the subject implements the renewed agreement using the updated time-to-die time as the new current time-to-die time. An example of renewing an established monitoring agreement is described in the remaining acts of method 2000.

Method 2000 includes an act the subject node sending a renew request to the monitor node prior to the subject node clock reaching the subject side time-to-die time (act 2009). For example, subject node 1902 can send renew request 1915, including TTL duration value 1913, to monitor node 1903 prior to a clock of subject node 1902 reaching subject side time-to-die time 1917. In some embodiments, renew request 1915 does not include a subject side TTL duration value. In these embodiments, continued use of TTL duration value 1913 can be inferred. In other embodiments, TTL duration value 1913 is expressly included in renew request 1915. In yet other embodiments, a different subject side TTL duration value is included in renew request 1915. A new subject side TTL duration value can be generated and used by subject node 1902 in response to configuration changes of subject node 1902 and/or to configuration changes elsewhere in ring 1901 (e.g., changed network conditions).

Node 1902 can also calculate what an updated subject side time-to-die time is to be if a corresponding renew grant responsive to renew request 1915 is received. The calculation can be based at least on the time renew request 1915 was sent and on the subject side TTL duration value related to or associated with renew request 1915.

Method 2000 includes an act of the monitor node receiving a renew request from the subject node subsequent to sending the establish grant message and prior to the monitor node clock reaching the monitor side time-to-die time, the renew request indicating that the subject node has not failed (act 2010). For example, monitor node 1903 can receive renew request 1915 subsequent to sending establish grant 1923 and prior to a clock of monitor node 1903 reaching monitor side time-to-die time 1914. Reception of renew request 1915 can indicate to monitor node 1903 that subject node 1902 has not failed.

Method 2000 can also include an act of the monitor node granting the renew request to the subject node. For example, monitor node 1903 can grant renew request 1915.

Method 2000 includes an act of the monitor node establishing an updated monitor side time-to-die time in response to and based at least on the time the renew request was received, the monitor node clock reaching the updated monitor side time-to-die time, prior to receiving another renew request from the subject node, being indicative of a suspected failure of the subject node (act 2012). For example, monitor node 1903 can establish updated monitor side time-to-die time 1921 in response to and based on the time renew request 1915 was received and the implied or indicated monitor TTL duration value related to or potentially contained in a renew request 1915. Updated monitor side time-to-die time 1921 can be a time relative to monitor node 1903. Updated monitor side time-to-die time 1921 can be subsequent to monitor side time-to-die time 1914. However, there is no requirement that monitor side time-to-die time 1914 have occurred before establishing updated monitor side time-to-die time 1921. Thus, it is also possible that updated monitor side time-to-die time 1921 is in fact prior to (or the same as) monitor side time-to-die time 1914. If a clock of monitor node 1903 reaches updated monitor side time-to-die time 1921, prior to receiving another renew request from subject node 1902, monitor node 1903 suspects subject node 1902 of failure.

If no subject side TTL duration value is included in renew request 1915 (and thus TTL duration value 1913 is inferred) or if renew request expressly includes TTL duration value 1913, monitor node 1903 can also use TTL duration value 1919 to establish updated monitor side time-to-die time 1921. On the other hand, if a subject side TTL duration value other than TTL duration value 1913 is expressly included in renew request 1915, monitor node 1903 can use the other expressly included subject side TTL duration value to derive a new monitor side TTL duration value. From the new monitor side TTL duration value, monitor node 1903 can then establish updated monitor side time-to-die time 1921.

Method 2000 includes an act of the monitor node sending a renew grant to the subject node to indicate to the subject node that the monitor node has agreed to continue monitoring the subject node (act 2013). For example, monitor node 1903 can send renew grant 1927 to subject node 1902. Method 2000 includes an act of the subject node receiving a renew grant from the monitor node subsequent to sending the corresponding renew request and prior to the subject node clock reaching the subject side time-to-die time, the renew grant message indicative of the monitor node continuing to monitor the subject node (act 2014). For example, subject node 1902 can receive renew grant 1927 from monitor node 1903 subsequent to sending renew request 1915 and prior to a clock at subject node 1902 reaching subject side time-to-die time 1917. Generally, renew grant 1927 is indicative of monitor node 1903 agreeing to continue to monitor subject node 1902.

Alternately, a monitor node can send a renew reject to a subject node to indicate to the subject node that the monitor node is no longer agreeing to monitor the subject node. For example, in response to receiving renew request 1915, monitor node 1903 can alternately (as indicated by the dashed line) send renew reject 1933 to subject node 1902. A subject node can receive a renew reject sent from a monitor node. For example, subject node 1902 can receive renew reject 1933 from monitor mode 1903. Renew reject 1931 generally indicates to subject node 1902 that monitor node 1903 is no longer agreeing to monitor subject node 1902.

Method 2000 includes the subject node transitioning to a previously calculated updated subject side time-to-die time in response to receiving the renew grant, wherein the subject node clock reaching the updated subject side time-to-die time, prior to receiving another renew grant from the monitor node, is an indication of the subject node having to transition to a failure state (act 2015). For example, subject node 1902 can transition to updated subject side time-to-die time 1952 when the corresponding renew grant message is received. Updated subject side time-to-die time 1952 can have been calculated at around the time renew request 1915 was sent to monitor node 1903. Updated subject side time-to-die time 1952 can have been calculated based on the time corresponding renew request 1915 was sent and on the TTL duration related to or associated with renew request 1915. Updated subject side time-to-die time 1952 can be a time (e.g., subsequent, prior, or equal to subject side time-to-die time 1917) relative to subject node 1902.

If TTL value 1913 is still the appropriate TTL value, subject node 9102 can also used TTL duration value 1913 to establish updated subject side time-to-die time 1952. If another TTL duration value has been generated, subject node 1902 can also use the other generated TTL duration value to establish updated subject side time-to-die time 1952.

Subsequent, to establishment of a current subject side time-to-die time (either 1917 or 1952), it may be a clock at subject node 1902 reaches the current subject side time-to-die time prior to receiving another renew grant from monitor node 1903. This may result from communication errors between subject node 1902 and monitor node 1903. For example, subject node 1902 may send another renew request subsequent receiving renew grant 1927 and prior to a clock of subject node 1902 reaching updated subject side time-to-die time 1952. However, due to communication failures the other renew request does not reach monitor node 1903. Alternately, the other renew request may be received at monitor node 1903, but the corresponding renew grant from monitor node 1903 does not reach subject node 1902 due to communication errors. In either event, a clock at subject node 1902 may reach a current subject side time-to-die time prior to receiving the corresponding renew grant responsive to the other renew request.

Alternately, subject node 1902 can malfunctioning such that subject node 1902 is prevented from sending another renew request to monitor node 1903 prior to a clock at subject node 1902 reaching t updated subject side time-to-die time 1952.

However, whether or not a renew request is sent, if a renew grant is not received prior to a clock at subject node 1902 reaching a current subject side time-to-die time 1952, subject node 1902 transitions into a failure state.

Referring back to monitor node 1903, it may be that a clock at monitor node 1903 reaches a monitor side time-to-die time (either 1914 or 1921) prior to receiving another renew request from subject node 1902 (either due to a malfunction at subject node 1902 or to communication errors in ring 1901). As a result, monitor node 1903 suspects subject node 1902 of failure. Monitoring node 1903 can transition to a timeout state indicative of detecting a suspected failure at another node.

In other embodiments a pair of nodes can monitor each other. Thus, a first node can monitor a second node and the second node can also monitor the first node. For example, each node can implement both the subject node side and the monitor node side method 2000 through communication with the other node.

Figure 19B:
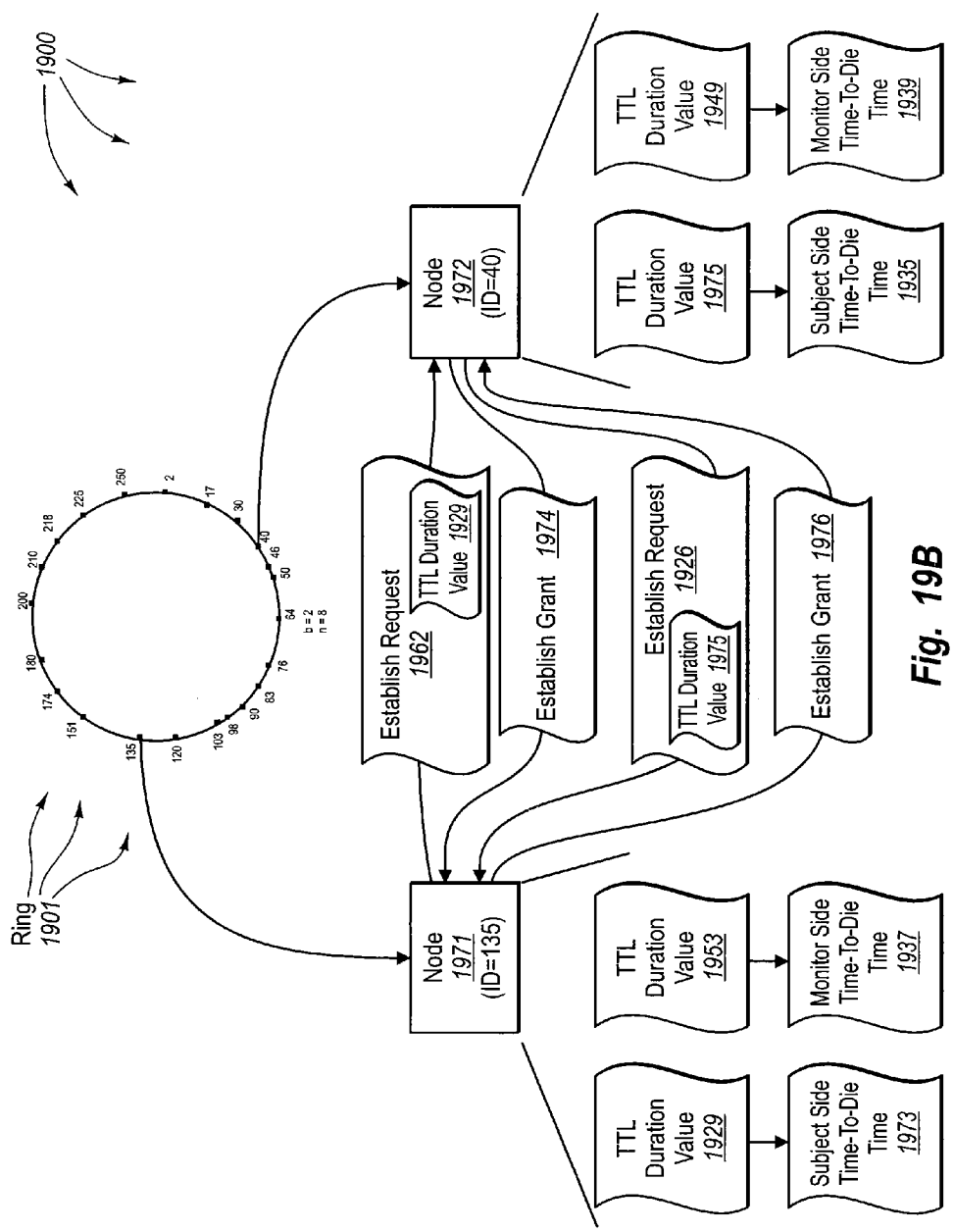
FIG. 19B illustrates an example ring architecture that facilitates two nodes monitoring each other.

FIG. 19B illustrates an example ring architecture 1900 that facilitates two nodes monitoring each other.

Node 1971 can generate TTL duration value 1929 for use in monitoring node 1971. Node 1971 can send establish request 1962, including TTL duration value 1929, to node 1972. Node 1971 can also establish subject side time-to-die time 1973 based on TTL duration value 1929. Node 1972 can receive establish request 1962, including TTL duration value 1929, from node 1971. Node 1972 can derive TTL duration value 1949 from TTL duration value 1929. Node 1972 can establish monitor side time-to-die time 1939 based on TTL duration value 1949. Node 1972 can send establish grant 1974 to node 1971. Node 1971 can receive establish grant 1974 from node 1972.

In parallel, node 1972 can generate TTL duration value 1975 for use in monitoring node 1972. Node 1972 can send establish request 1926, including TTL duration value 1975, to node 1971. Node 1972 can also establish subject side time-to-die time 1935 based on TTL duration value 1975. Node 1971 can receive establish request 1926, including TTL duration value 1975, from node 1972. Node 1971 can derive TTL duration value 1953 from TTL duration value 1933. Node 1971 can establish monitor side time-to-die time 1937 based on TTL duration value 1953. Node 1971 can send grant message 1976 to node 1972. Node 1972 can receive grant message 1976 from node 1971.

Alternately, either of nodes 1971 and 1972 reject an establish request from the other node. For example, node 1971 can reject establish request 1962. Likewise, node 1972 can reject establish request 1926. When either node rejects an establish request, it can send an establish reject (e.g., similar to establish reject 1931) to the other node. This indicates to the other node that no monitoring agreement has been established.

Node 1971 and node 1972 can then exchange renew requests and renew grants (as well as renew rejects similar to renew reject 1933) as previously described. Accordingly, each of node 1971 and node 1972 are both a subject node and a monitor node. Based on the depicted TTL duration values and time-to-die times in FIG. 19B, various events may occur during and/or after the monitor relationships are established If a clock at node 1971 reaches subject side time-to-die time 1973 prior to receiving a renew grant from node 1972, node 1971 transitions to a failure state. If a clock at node 1972 reaches monitor side time-to-die time 1939 prior to receiving a renew request from node 1971, node 1972 suspects node 1971 of failure.

If a clock at node 1972 reaches subject side time-to-die time 1935 prior to receiving a renew grant from node 1971, node 1972 transitions to a failure state. If a clock at node 1971 reaches monitor side time-to-die time 1937 prior to receiving a renew request from node 1972, node 1971 suspects node 1972 of failure.

Arbitration of Node Failures

Due to various different types of communication errors and node malfunctions, there exists some possibility that each node in a pair of nodes will suspect failure of the other node. Further, each node may suspect that it is functioning properly.

In some ring architectures, portions of resources are configured such that a single node controls a resource at a given moment in time. Further, the needed availability of some resources may also be high such that essentially constant control by a node is required. Thus, when a node fails, control of various resources may need to be transferred to another node. Accordingly, when a node in a pair of nodes suspects the other node of failure, arbitration mechanisms can be used to determine at least which node has or should fail.

For example, when each node in a pair nodes suspects the other node of failing, each node can transition to a timeout state and report their suspicion to an arbitration facility. When in a timeout state, certain other processing at each node can be suspended until the results of the arbitration are received. The arbitration facility can report back to a node indicating if it is to remain active. For example, an arbitration facility can send an accept message to a reporting node that is to remain active. The arbitration facility can send a deny message to a reporting node that is to transition to a failure state. A node that receives an accept message can remain active. A node that doesn't not receive an accept message (e.g., due to network conditions) or that receives a deny message transitions to a failure state.

Figure 19C:
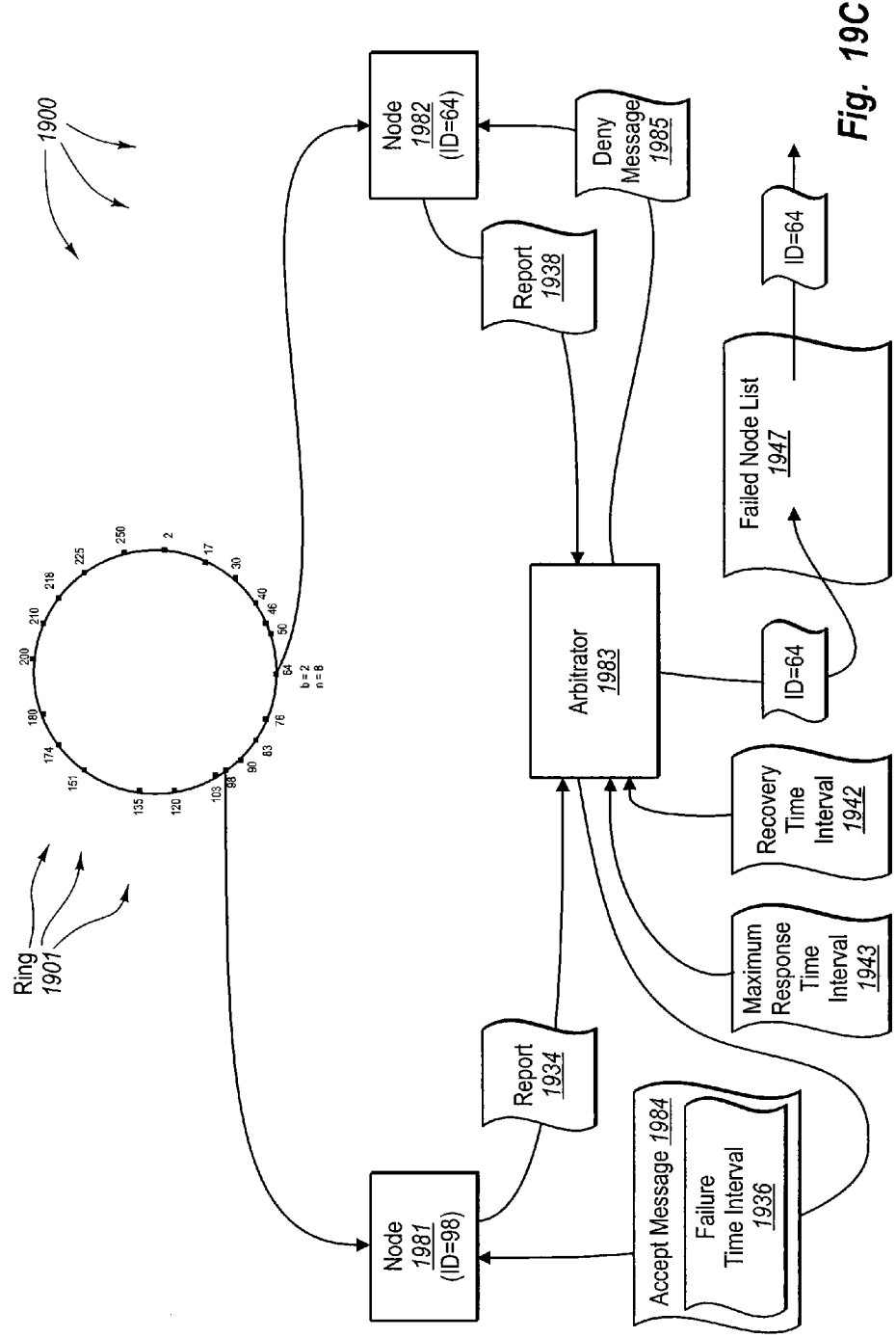
FIG. 19C illustrates an example ring architecture that facilitates arbitration when mutually monitoring nodes can each report that the other node is suspected of failing.

FIG. 19C illustrates example ring architecture 1900 that facilitates arbitration when mutually monitoring nodes each can report that the other node is suspected of failing. FIG. 19C depicts an expanded view of node 1981 (having ID=98), monitor node 1982 (having ID=64), and arbitrator 1983.

In some embodiments, arbitrator 1983 is also a member of ring 1901. In other embodiments, arbitrator 1983 is a member of an ancestor ring of ring 1901 but is not member of ring 1901. In further embodiments, arbitrator 1983 is external to the ring hierarchy that includes ring 1901. For example, arbitrator 1983 can be included in a separate arbitration federation ring of nodes. Nodes in the arbitration federation can be configured as arbitrators for the nodes of ring 1901 and its ancestors.

In some embodiments, arbitrator 1983 is mutually agreed to by node 1971 and node 1982 to arbitrate for nodes 1981 and 1982. In other embodiments, arbitrator 1983 is assigned to arbitrate for nodes 1981 and 1982 by another entity. The other entity can be a node internal to the ring hierarchy including ring 1901 (e.g., a seed node) or, for example, a human administrator. For example, the other node can be a member of ring 1901 or a member of an ancestor ring of ring 1901 but not member of ring 1901. Alternately, the other entity can be external the ring hierarchy including ring 1901. For example, the other entity can be a node that is a member of separate arbitration federation ring.

Arbitrator 1983 can have varying knowledge of the ring hierarchy including ring 1901. For example, arbitrator 1983 can have global knowledge of the ring hierarchy including ring 1901. Alternately, arbitrator 1983 can have knowledge of some subset of rings included the ring hierarchy including ring 1901. In other embodiments, arbitrator 1983 has knowledge of a subset of nodes in ring 1901 including (and potentially only) nodes 1981 and 1982.

Arbitrator 1983 can be configured to arbitrate for any number of node pairs including, but not limited to, nodes 1981 and 1982. In some embodiments, an arbitration mechanism has no knowledge of nodes it is to arbitrate for prior to receiving a report of a suspected node failure. Thus, although a pair of nodes have agreed to use arbitrator 1983 or arbitrator 1983 has been assigned to arbitrate for a pair of nodes, arbitrator 1983 may be unaware of any agreement or assignment prior to receiving a repot of a suspected node failure for a node in the pair of nodes.

Arbitration can include arbitrating between nodes that present conflicting failure reports. For example, when a first node is monitoring a second node and the second node is also monitoring the first node, it may be that each node reports that the other node is suspected of failure. The suspected failure can be detected using virtually any failure detection mechanisms including those previously described in this document.

Failed node list 1947 can include a list of nodes that have been reported as suspected failed nodes. Nodes can be report other nodes as suspected failed nodes to arbitrator 1983 and, when appropriate, arbitrator 1983 can include the reported nodes in failed node list 1947. Arbitrator 1983 can remove failed nodes from failed node list 1947 after appropriate periods of time (e.g., at a future time when the likelihood of continued conflict is not possible). For example, entries in failed node list 1947 can be removed at recovery time interval 1942 after they were inserted into failed node list 1947. Recovery time interval 1942 can be long enough to insure that nodes that have been told to fail do fail.

Figure 21:
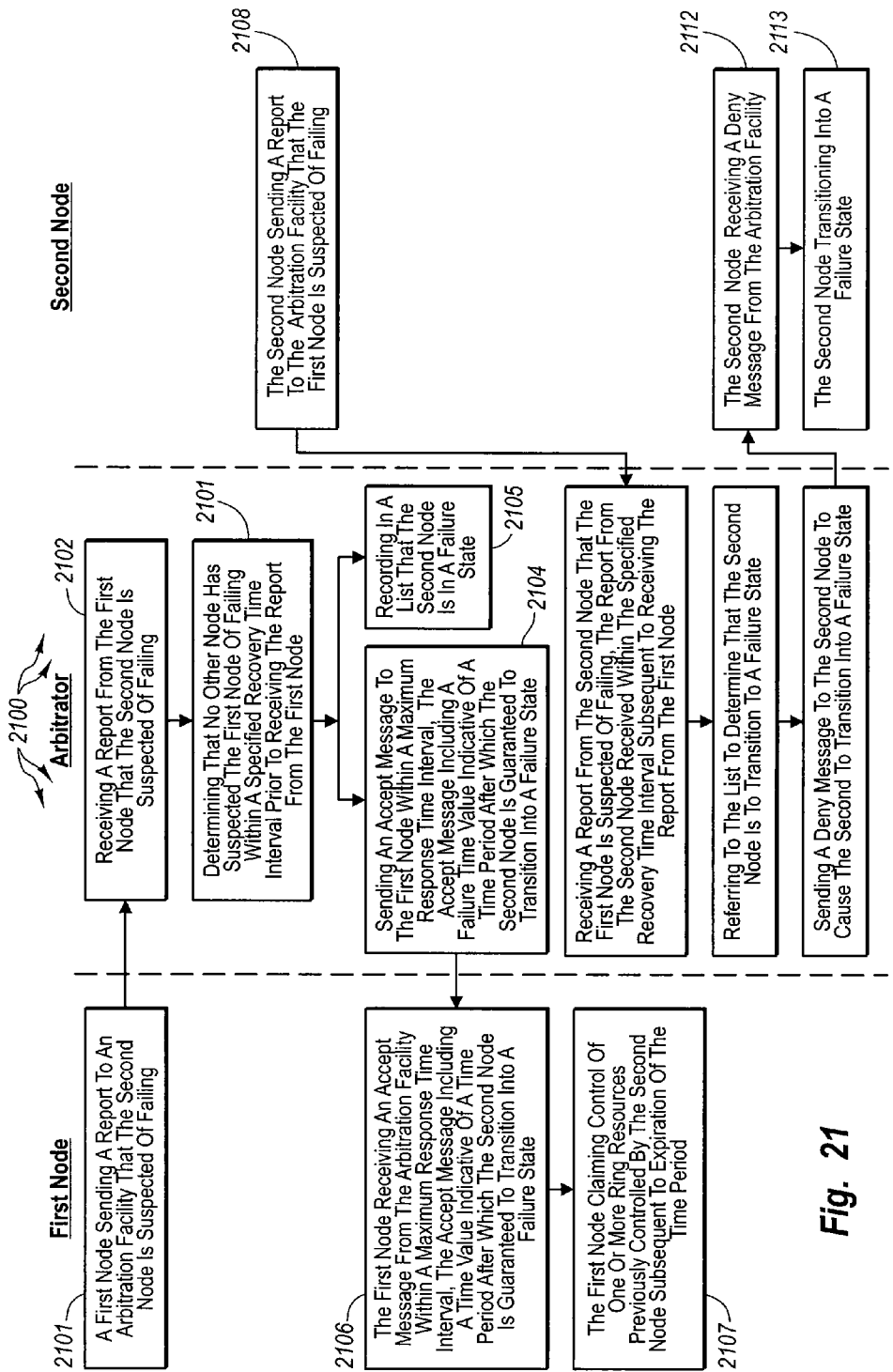
FIG. 21 illustrates an example flow chart of a method for arbitrating between conflicting reports of suspected node failures.

FIG. 21 illustrates an example flow chart of a method 2100 for arbitrating between conflicting reports of suspected node failures. The method 2100 will be described with respect to the components and data depicted in FIG. 19C.

Method 2100 includes an act of a first node sending a report to an arbitration facility that a second node is suspected of failing (act 2101). For example, node 1981 can send report 1934 to arbitrator 1983. Method 2100 includes an act of an arbitrator receiving a report from the first node that the second node is suspected of failing (act 2102). For example, arbitrator 1983 can receive report 1934 from node 1981.

Method 2100 includes an act of the arbitrator determining that no other node has suspected the first node of failing within a specified recovery time interval prior to receiving the report from the first node (act 2103). For example, arbitrator 1983 can determine that no other node has suspected node 1981 of failing within recovery time interval 1942 (after which arbitrator 1983 would have removed node 1981 from failed node list 1947 anyway).

Method 2100 includes an act of the arbitrator recording in a list that the second node is in a failure state (act 2105). For example, arbitrator 1983 can record in failed node list 1947 that node 1982 (ID=64) is in a failure state.

Method 2100 includes an act of the arbitrator sending an accept message to the first node within a maximum response time interval, the accept message including a failure time value indicative of a time period after which the second node is guaranteed to transition into a failure state (act 2104). For example, arbitrator 1983 can send accept message 1984 to node 1981 within maximum response time interval 1943 of receiving report 1934. Accept message 1984 includes failure time interval 1936 indicative of a time when node 1982 is guaranteed to have transitioned into a failure state. Generally, a maximum response time interval represents a point in time after which a requestor (e.g., node 1981 or 1982) assumes the an arbitration facility (arbitrator 1983) will not answer a request for arbitration (e.g., report 1934 or 1938). When a maximum response time interval expires at a requestor subsequent to sending a request for arbitration, the requestor performs similar (and potentially identical) operations to those that would be performed if an express deny message was received.

Method 2100 includes an act of the first node receiving an accept message from the arbitration facility within a maximum response time interval, the accept message including a time value indicative of a time period after which the second node is guaranteed to transition into a failure state (act 2106). For example, node 1981 can receive accept message 1984, including failure time interval 1936, from arbitrator 1983. Failure time interval 1936 is indicative of a time when node 1982 is guaranteed to have transitioned into a failure state. Thus, after the expiration of failure time interval 1936, node 1981 can attempt to claim control of one or more ring resources previously controlled by node 1982.

Method 2100 includes an act of the first node claiming control of one or more ring resources previously controlled by the second node subsequent to expiration of the time period (act 2107). For example, node 1981 can claim control of one or more ring resources within ring 1901 previously controlled by the node 1982 subsequent to expiration of failure time interval 1936.

Claimed ring resources can vary depending on the ring resources controlled by node 1982 prior to transition to a failure state. For example, node 1981 can assume message routing responsibilities of node 1982 (e.g., the responsibility to receive messages directed to a range of identifies on ring 1901), any seed node responsibilities of node 1982, any arbitration responsibilities of node 1982, etc.

At some time at or after the first node reports the second node, the second node may also suspect the first node of failure. For example, it may be that node 1982 also suspects node 1981 of failure.

Method 2100 includes an act of the second node sending a report to the arbitration facility that the first node is suspected of failing (act 2108). For example, node 1982 can send report 1938 to arbitrator 1983 that node 1981 is suspected of failure. Method 2100 includes an act the arbitrator receiving a report from the second node that the first node is suspected of failing, the report from the second node received within the specified recovery time interval subsequent to receiving the report from the first node (act 2109). For example, arbitrator 1983 can receive report 1938 from node 1982 that node 1981 is suspected of failure within recovery time interval 1942 of receiving report 1934.

Method 2100 includes an act of the arbitrator referring to the list to determine that the second node is to transition to a failure state (act 2110). For example, arbitrator 1983 can refer to failed node list 1947 to determine that node 1982 (ID=64) is to transition to a failure state.

Method 2100 includes an act of sending a deny message to the second node to cause the second node to transition into a failure state (act 2111). For example, arbitrator 1983 can send deny message 1985 to node 1982 to cause node 1982 to transition to a failure state. Method 2100 includes an act of the second node receiving a deny message from the arbitration facility (act 2112). For example, node 1982 can receive deny message 1985 from arbitrator 1983.

Method 2100 includes an act of the second node transitioning into a failure state (act 2113). For example, node 1982 can transition into a failure state in response to receiving deny message 1985. After failing, node 1982 can subsequently attempt to rejoin ring 1901.

Routing in Accordance with Cached Agreements

In some embodiments, messages are routed in accordance with cached routing agreements. For example, adjacent nodes of a ring can agree to a division of responsibility for a range of unoccupied identifiers between the adjacent nodes. An identifier can be unoccupied for any number of reasons. For example, an identifier may be unoccupied because the identifier is unassigned (i.e., the identifier that has not been assigned to a node). For assigned identifiers (i.e., identifiers that have been assigned to a node), an identifier may be unoccupied because the corresponding node has been deliberately shutdown or the node is for some reason, such as, for example, due to communication or node failures, otherwise unreachable.

Routing agreements between nodes can be established and cached prior to nodes being permitted to accept messages for and deliver messages for any of the unoccupied identifiers that are to be the responsibility of the adjacent nodes. Reference to a cached routing agreement significantly reduces any communication between (potentially) adjacent nodes that may otherwise occur to determine which node is responsible for a specific unoccupied identifier.

A cached routing agreement can divide a range of unoccupied identifiers in an arbitrary fashion, in accordance with configurable rules, or in accordance with a fixed methodology. In some embodiments, a range of identifiers between adjacent nodes on a ring is divided essentially in half. This reduces the likelihood of an unoccupied identifier being further from a node that is responsible for the unoccupied identifier.

When there is an even number of unoccupied identifiers between adjacent nodes, the midway point between the adjacent nodes is between unoccupied identifiers. Thus, responsibility for the unoccupied identifiers can be divided at the midway point between the adjacent nodes. Accordingly, each adjacent node can be assigned responsibility for an equal number of unoccupied identifiers.

On the other hand, when there is an odd number of unoccupied identifiers between adjacent nodes, the midway point between the adjacent nodes is at an unoccupied identifier. Thus, responsibility for the unoccupied identifiers can be divided at one side or the other of the unoccupied identifier that is the midway point. Accordingly, one adjacent node can be assigned responsibility for one more unoccupied identifier than the other adjacent node.

Figure 22A:
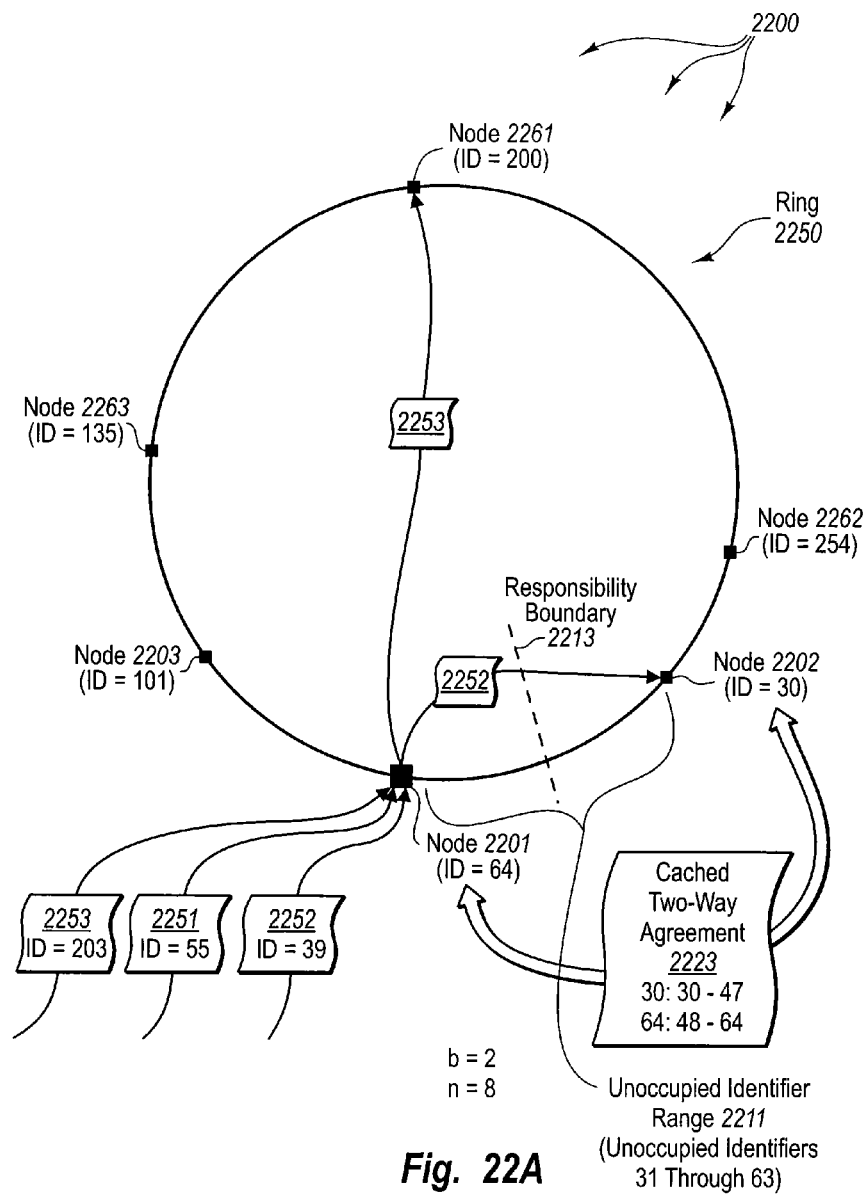
FIG. 22A illustrates an example ring architecture that facilitates routing a message in accordance with a cached two-way agreement.

For example, referring now to FIG. 22A, FIG. 22A illustrates an example ring architecture 2200 that facilitates routing a message in accordance with a cached two-way agreement between nodes. As depicted, various nodes (shown as squares on ring 2250) including (but not limited to) nodes 2201, 2202, 2203, 2261, 2262, and 2263 are included on ring 2250. Each node has a corresponding ID (shown in parenthesis) indicating its position on ring 2250. For example, node 2201 has ID=64 and node 2202 has ID=30.

There are ranges of unoccupied identifiers between the depicted nodes. For example, unoccupied identifier range 2211 represents unoccupied identifiers 31 through 63 between nodes 2202 and 2201.

As depicted, node 2201 and 2202 have established and cached two-way agreement 2223. For example, through prior communication, nodes 2201 and 2202 can determine that there are no other nodes currently interspersed between ID=64 and ID=30. Thus, nodes 2201 and 2202 can further determine that they are adjacent to one another on ring 2250. Accordingly, node 2201 and 2202 can divide responsibility for unoccupied identifier range 2211 (i.e., unoccupied identifiers 31 through 63) such that node 2202 is responsible for a portion of unoccupied identifier range 2211 and node 2201 is responsible for the remaining portion unoccupied identifier range 2211. Each node is also responsible for its assigned ID. That is, node 2202 is responsible for ID=30 and node 2201 is responsible for ID=64.

Accordingly, as depicted by responsibility boundary 2213 (between unoccupied identifier 47 and unoccupied identifier 48), node 2202 (ID=30) is responsible for itself as well as unoccupied identifiers 31 through 47 and node 2201 (ID=64) is responsible for itself as well as unoccupied identifiers 48 through 63. Although the midway point between nodes 2201 and 2202 is at unoccupied identifier 47, node 2202 is assigned responsibility for unoccupied identifier 47 such that each unoccupied identifier is the responsibility of a single node. Thus, as previously described, when a responsibility boundary falls on an unoccupied identifier, one of the adjacent nodes can be assign the sole responsibility for the unoccupied identifier.

Figure 24:
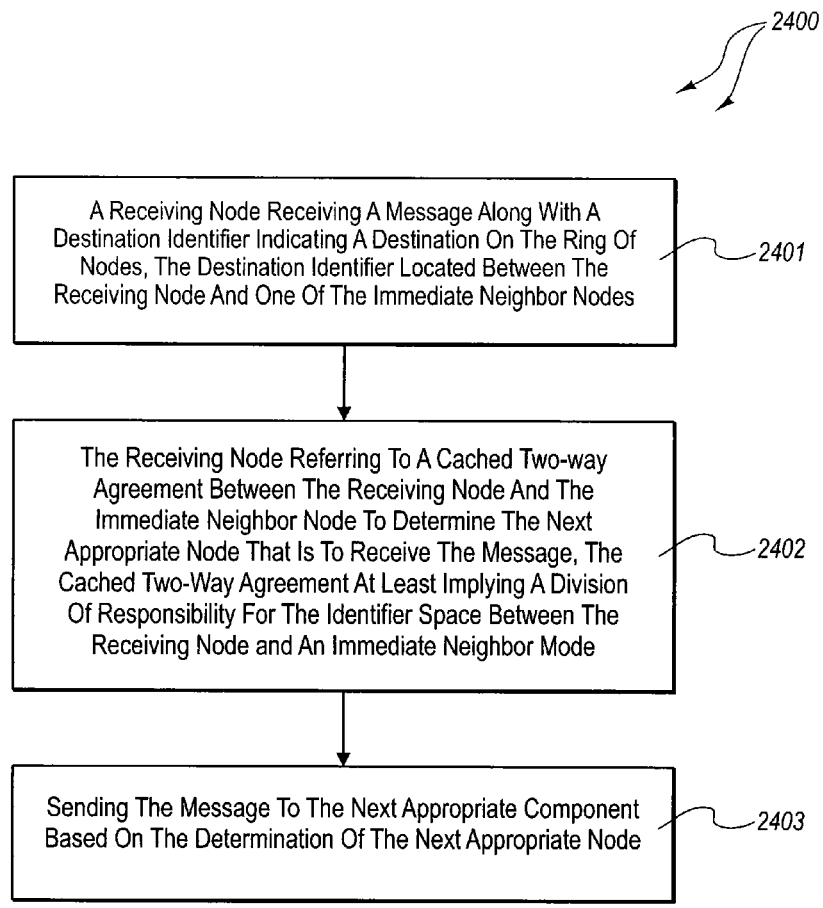
FIG. 24 illustrates an example flow chart of a method for routing a message in accordance with a cached two-way agreement.

FIG. 24 illustrates an example flow chart of a method 2400 for routing a message in accordance with a cached two-way agreement. Method 2400 will be described with respect to the nodes and messages depicted in ring architecture 2200 of FIG. 22A.

Method 2400 includes an act of a receiving node receiving a message along with a destination identifier indicating a destination on the ring of nodes, the destination identifier located between the receiving node and one of the immediate neighbor nodes (act 2401). For example, node 2201 can receive message 2251, indicated for delivery to ID=55. Alternately, node 2201 can receive message 2252, indicated for delivery to ID=39. Message 2251 and 2252 can be received from another node in ring 2250 (intra-ring communication), from a node in another ring of ring architecture 2200 (inter-ring communication), or through non-ring communication.

Method 2400 includes an act of the receiving node referring to a cached two-way agreement between the receiving node and the immediate neighbor node to determine the next appropriate node that is to receive the message (act 2402). The two-way agreement at least implies a division of responsibility for the identifier space between the receiving node and an immediate neighbor node. For example, node 2201 can refer to cached two-way agreement 2223 to determine the next appropriate node that is to process message 2251. Since cached two-way agreement 2223 indicates that node 2201 (ID=64) is responsible for unoccupied identifier 55, node 2201 determines that it is the appropriate node to process message 2251. Likewise, node 2201 can refer to cached two-way agreement 2223 to determine the next appropriate node that is to process message 2252. Since cached two-way agreement 2223 indicates that node 2202 (ID=30) is responsible for unoccupied identifier 39, node 2201 determines that node 2202 is the next appropriate node that is to process message 2252.

Method 2400 includes an act of sending the message to the next appropriate component based on the determination of the next appropriate node (act 2403). For example, node 2201 can provide message 2251 to its resource handler instance corresponding to unoccupied identifier 55, since cached two-way agreement 2223 indicates that node 2201 is responsible for unoccupied identifier 55. Alternately, node 2201 can provide message 2252 to node 2202, since cached two-way agreement 2223 indicates that node 2202 is responsible for unoccupied identifier 39. Subsequently, node 2202 can provide message 2252 to its resource handler instance corresponding to unoccupied identifier 39.

When an identifier is not included in a cached two-way agreement, a node can refer to a routing table (e.g., as depicted in FIG. 3) to make progress towards a destination. For example, node 2201 can send message 2253, indicated for delivery to ID=203, to node 2261 (ID=200). Node 2261 can then refer to any cached two-way agreements with its adjacent nodes to determine the node that is responsible for identifier 203.

Figure 22B:
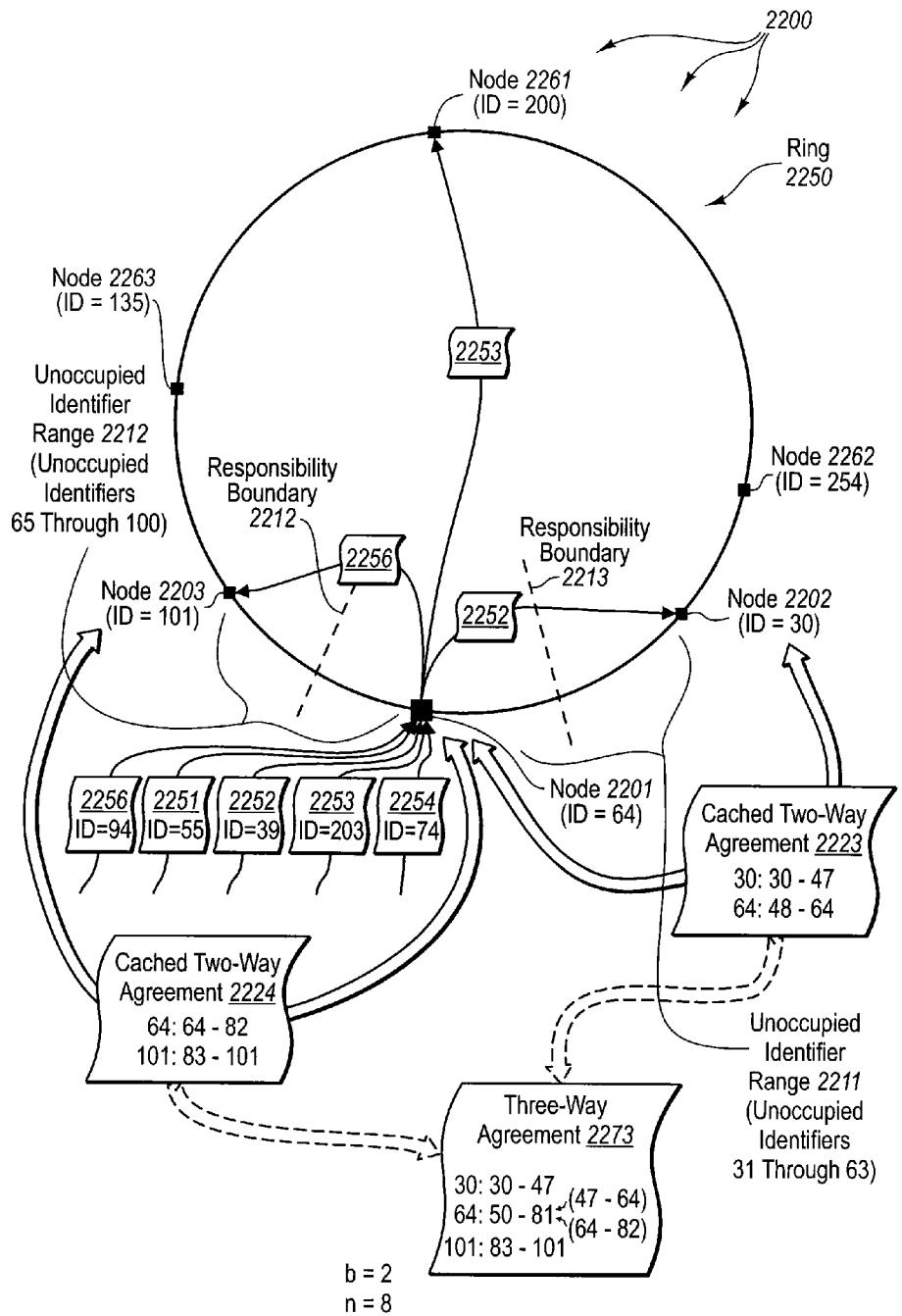
FIG. 22B illustrates an example ring architecture that facilitates routing a message in accordance with multiple cached two-way agreements.

In some embodiments, multiple two-way agreements can, from the perspective of a given node, essentially represent a three-way agreement between the given node, the given node's immediate predecessor node, and the given node's immediate successor node. FIG. 22B illustrates the example ring architecture 2200 that facilitates routing a message in accordance with multiple cached two-way agreements.

As previously described, nodes 2201 and 2202 can establish cached two-way agreement 2223. Similarly, nodes 2201 and 2203 can establish cached-two way agreement 2224 to divide responsibility for unoccupied identifier range 2212 (i.e., unoccupied identifiers 65 through 101). Thus, through prior communication, nodes 2201 and 2203 can determine that there are no other nodes currently interspersed between ID=65 and ID=101. Thus, nodes 2201 and 2203 can further determine that they are adjacent to one another on ring 2250. Accordingly, nodes 2201 and 2203 can divide unoccupied identifier range 2212 such that node 2202 is responsible for a portion of unoccupied identifier range 2212 and node 2201 is responsible for the remaining portion of unoccupied identifier range 2212. Accordingly, as depicted within two-way agreement 2224, node 2201 (ID=64) is responsible for itself as well as unoccupied identifiers 65 through 82 and node 2202 (ID=101) is responsible for itself as well as unoccupied identifiers range 83 through 100.

From the perspective of node 2201, the combination of cached two-way agreement 2223 and cached two-way agreement 2224 essentially represents three-way agreement 2273. That is, node 2201 is responsible for a portion of identifier space between node 2201 and node 2202 and is responsible for a portion of identifier space between node 2201 and node 2203. The parenthetical ranges of identifiers indicate the ranges of responsibility (i.e., 47 through 64 and 64 through 82) form the cached-two way agreements 2223 and 2224 on either side of node 2201.

Figure 25:
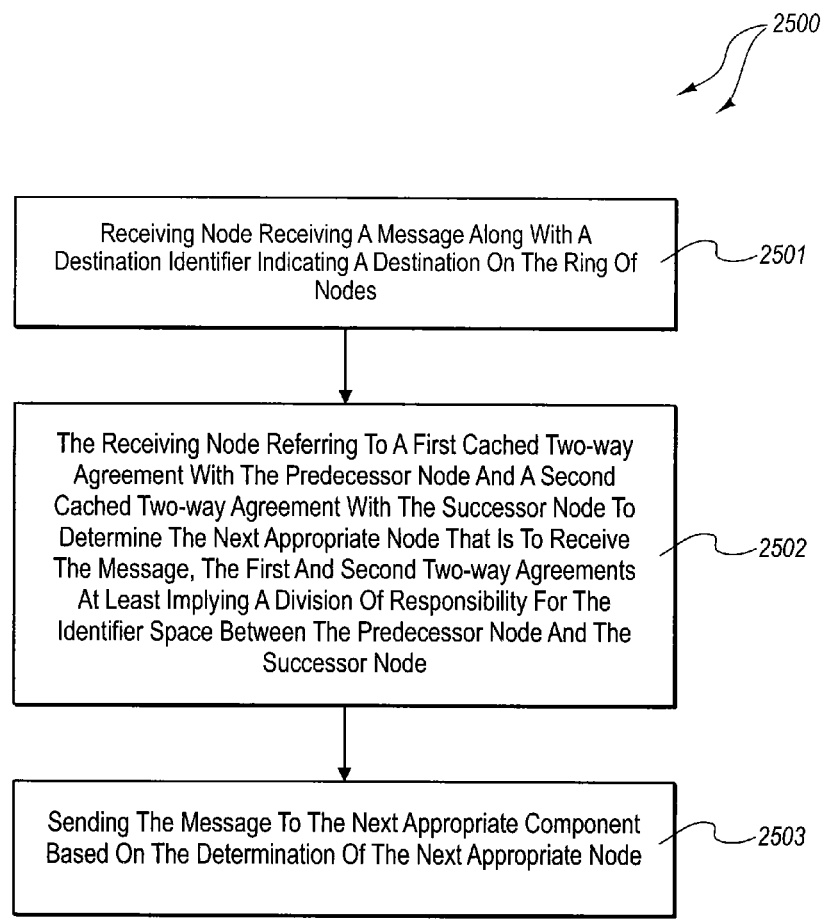
FIG. 25 illustrates an example flow chart of a method for routing a message in accordance with multiple cached two-way agreements.

FIG. 25 illustrates an example flow chart of a method 2500 for routing a message in accordance with a multiple cached two-way agreements. Method 2500 will be described with respect to the nodes and messages depicted in ring architecture 2200 of FIG. 22B.

Method 2500 includes an act of a receiving node receiving a message along with a destination identifier indicating a destination on the ring of nodes (act 2501). For example, node 2201 can receive any of messages 2251, 2252, 2253, 2254, and 2256 indicated for delivery to ID=55, ID=39, ID=203, ID=74, and ID=94 respectively. Messages 2251, 2252, 2253, 2254, and 2256 can be received from another node in ring 2250 (intra-ring communication) or from a node in another ring of ring architecture 2200 (inter-ring communication), or through non-ring communication.

Method 2500 includes an act of the receiving node referring to a first cached two-way agreement with the predecessor node and a second cached two-way agreement with the successor node to determine the next appropriate node that is to receive the message (act 2502). The first and second cached two-way agreements at least imply a division of responsibility for the identifier space between the predecessor node and the successor node. For example, node 2201 can refer to cached three-way agreements 2223 and 2224 to determine the next appropriate node that is to receive any of messages 2251, 2252, 2253, 2254, and 2256.

Since cached two-way agreement 2223 indicates that node 2202 (ID=30) is responsible for unoccupied identifier 39, node 2201 determines that node 2202 is the next appropriate node that is to process message 2252. Since cached two-way agreement 2223 indicates that node 2201 (ID=64) is responsible for unoccupied identifier 55, node 2201 determines that it is the appropriate node to process message 2252. Since cached two-way agreement 2224 indicates that node 2201 (ID=64) is responsible for unoccupied identifier 74, node 2201 determines that it is the appropriate node to process message 2254. Since cached two-way agreement 2224 indicates that node 2203 (ID=101) is responsible for unoccupied identifier 94, node 2201 determines that node 2203 is the next appropriate node that is to process message 2254.

Method 2500 includes an act of sending the message to the next appropriate component based on the determination of the next appropriate node (act 2503). For example, node 2201 can send messages 2251, 2252, 2253, 2254, and 2256 to the next appropriate component on ring 2250 based on the determination of the next appropriate node that is to process messages 2251, 2252, 2253, 2254, and 2256.

For example, node 2201 can provide message 2252 to node 2202, since cached two-way agreement 2223 indicates that node 2202 is responsible for unoccupied identifier 39. Subsequently, node 2202 can provide message 2252 to its resource handler instance corresponding to unoccupied identifier 39. Node 2201 can provide message 2251 to its resource handler instance corresponding to unoccupied identifier 55, since cached two-way agreement 2223 indicates that node 2201 is responsible for unoccupied identifier 55. Node 2201 can provide message 2254 to its resource handler instance corresponding to unoccupied identifier 74, since cached two-way agreement 2224 indicates that node 2201 is responsible for unoccupied identifier 74. Node 2201 can provide message 2256 to node 2203, since cached two-way agreement 2224 indicates that node 2203 is responsible for unoccupied identifier 94. Subsequently, node 2203 can provide message 2256 to its resource handler instance corresponding to unoccupied identifier 94.

When an identifier is not included in a cached either of multiple cached two-way agreements, a node can refer to a routing table (e.g., as depicted in FIG. 3) to make progress towards a destination. For example, node 2201 can send message 2256, indicated for delivery to ID=203, to node 2261 (ID=200). Node 2261 can then refer to a any cached two-way agreements with its predecessor node and/or its successor node to determine the next appropriate component that is to receive message 2253.

Formulating Cached Agreements

Rings can be reconfigured from time to time, such as, for example, when a new node joins a ring or when an existing node departs a ring (e.g., through graceful removal, as a result of node monitoring, through reference to an arbitrator, etc.). When a node detects that the configuration of a ring has changed, the node can reformulate cached routing agreements with any adjacent nodes. During agreement reformulation, the node can queue any received messages, expect those for formulating the agreement. After formulation of the agreement is complete, the node can then process the messages in accordance with the agreement.

Reconfiguration of a ring can cause multiple routing agreements to be reformulated. For example, when a node departs a ring, immediately adjacent nodes on either side of the departing node can formulate an agreement for the range of unoccupied identifiers that were previously the responsibility of the departing node (thus potentially gaining responsibility for additional unoccupied identifiers). This reformulation joins responsibility for a portion of the range of unoccupied identifiers from the departing node with the range of unoccupied identifiers for each immediately adjacent node. That is, each immediately adjacent node gains responsibility for a portion of the departing node's range of unoccupied identifiers and the departing node's identifier.

Figure 23A:
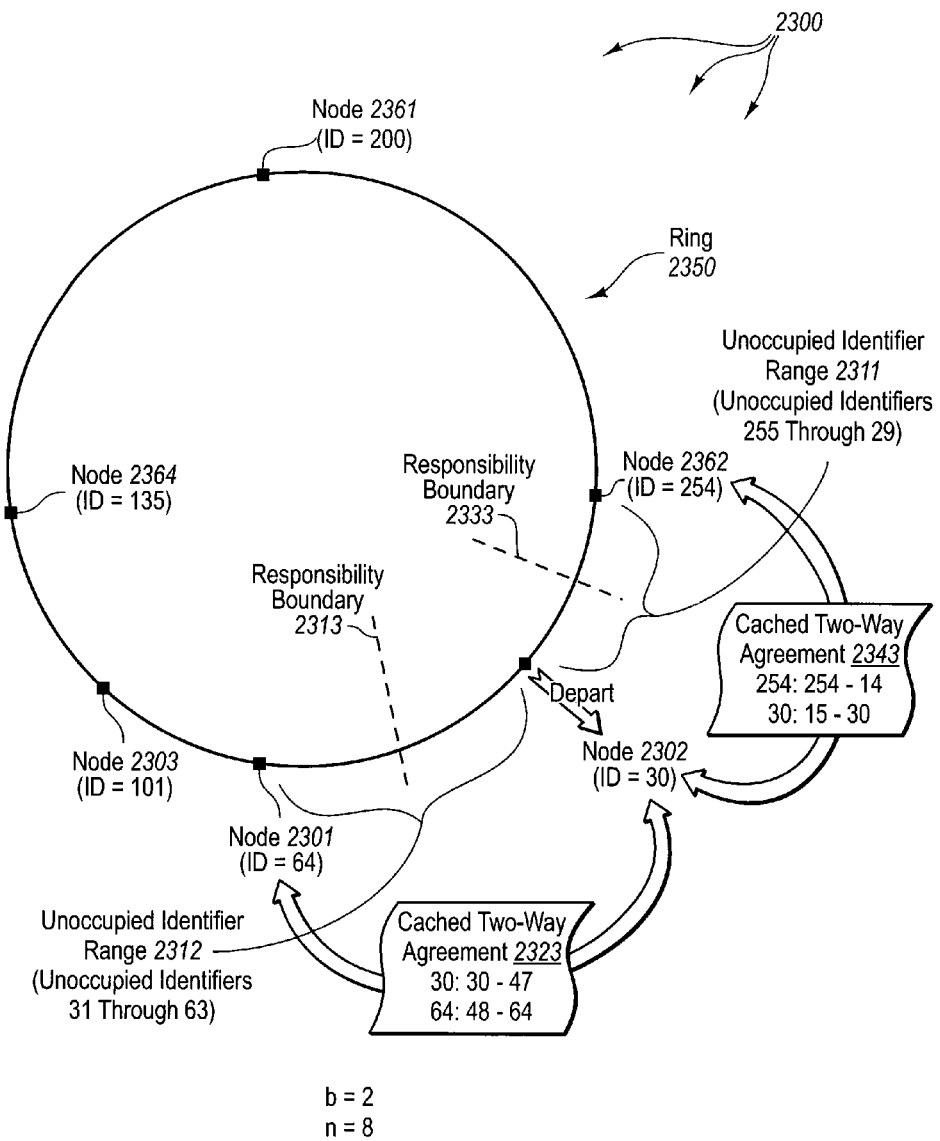
FIGS. 23A through 23D illustrate an example ring architecture that facilitates formulating a cached two-way agreement.

FIGS. 23A through 23D illustrate an example ring architecture 2300 that facilitates formulating a cached two-way agreement. As depicted in FIG. 23A, nodes 2301 and 2302 have formulated cached two-way agreement 2323 dividing responsibility for unoccupied identifier range 2312 (i.e., unoccupied identifiers 31 through 63) at responsibility boundary 2313 (between unoccupied identifier 47 and unoccupied identifier 48). Similarly, nodes 2302 and 2362 have formulated cached two-way agreement 2343 dividing responsibility for unoccupied identifier range 2311 (i.e., unoccupied identifiers 255 through 29) at responsibility boundary 2333 (between unoccupied identifiers 14 and 15).

Figure 23B:
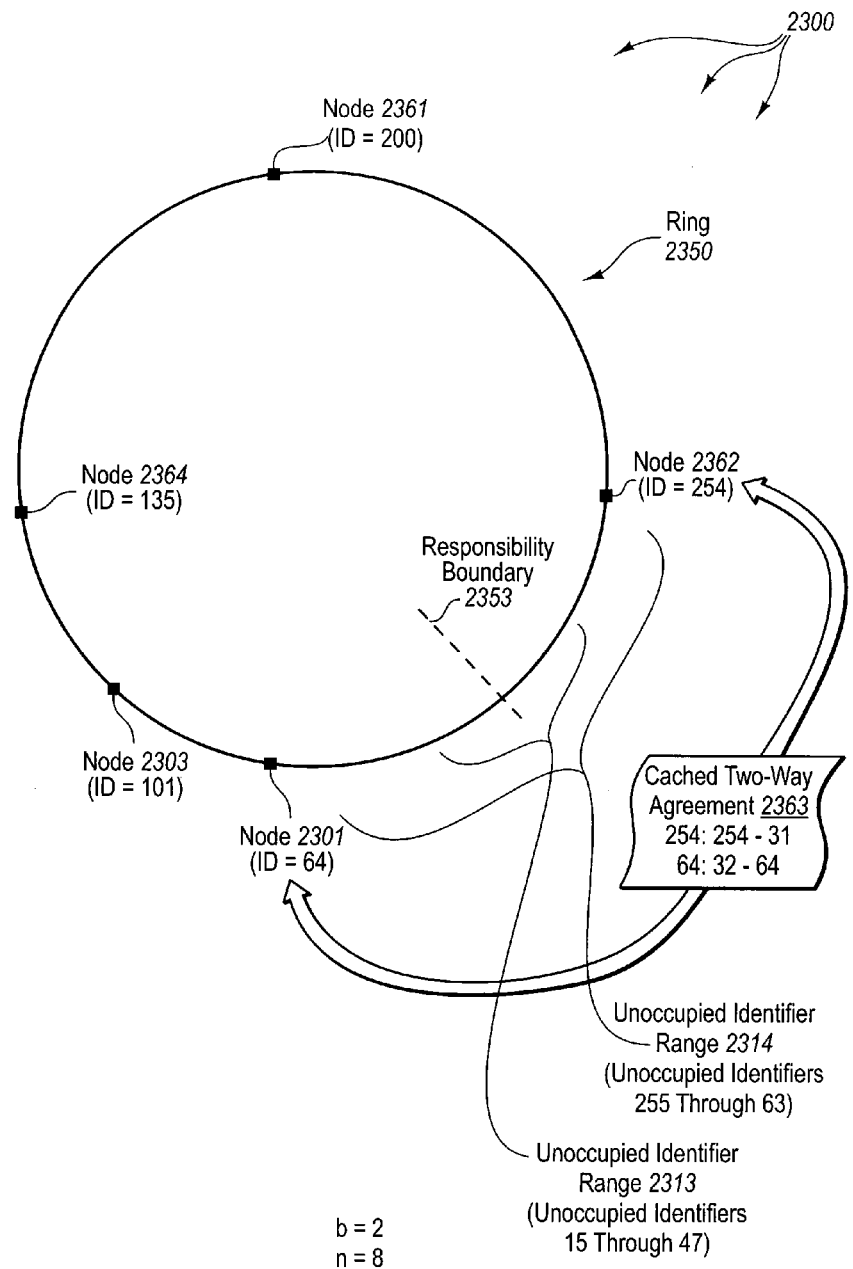

At some time subsequent to the formulation of cached two-way agreements 2323 and 2343, node 2302 can leave ring 2350 (e.g., through graceful removal, as a result of node monitoring, based on instructions from an arbitrator, etc.). Referring now to FIG. 23B, subsequent to node 2302 leaving ring 2350 there is no node responsible for the unoccupied identifiers that were previously the responsibility of node 2302. Unoccupied identifier range 2313 (unoccupied identifiers 15 through 47, including now unoccupied identifier 30) represents the range of unoccupied identifiers that node 2302 was responsible for prior to departing ring 2350.

In response to node 2302 leaving ring 2350, nodes 2301 and 2362 attempt to identify new immediate neighbor nodes. Node 2362 attempts to identify a new immediate successor node (i.e., an immediate neighbor node in the same direction as node 2302 relative to node 2362). Node 2301 attempts to identify a new immediate predecessor node (i.e., an immediate neighbor in the same direction as node 2302 relative to node 2301). In FIG. 23B, node 2362 identifies node 2301 as its new immediate successor and node 2301 identifies node 2362 as its new immediate predecessor.

Upon identifying new immediate neighbor nodes, nodes 2362 and 2301 formulate cached two-way agreement 2363 to that divides responsibility for unoccupied identifier range 2314 (unoccupied identifiers 255 through 63, including Snow unoccupied identifier 30). Unoccupied identified range 2314 includes unoccupied identifier range 2313, which was previously the responsibility of node 2302. Thus, portions of unoccupied identifier range 2313 can become the responsibility of either node 2362 or node 2301, after node 2302 departs ring 2350.

Accordingly, as depicted by responsibility boundary 2353 (between unoccupied identifier 31 and unoccupied identifier 32), node 2362 (ID=254) and node 2301 (ID=30) formulate cached two-way agreement 2363. In accordance with cached two-way agreement 2363, node 2362 (ID=254) is responsible for itself as well as unoccupied identifiers 255 through 31 and node 2301 (ID=64) is responsible for itself as well as identifier range 32 through 63. Although the midway point between nodes 2201 and 2202 is at unoccupied identifier 31, node 2362 is assigned responsibility for unoccupied identifier 31 such that each unoccupied identifier is the responsibility of a single node.

During time between the departure of node 2302 and formulation of cached two-way agreement 2363, nodes 2301 and 2362 do not process messages indicated for delivery to identifiers in the range between 255 and 63. Instead, nodes 2301 and 2362 queue any messages, expect those for for- mulating cached two-way agreement 2363. After formulation of the cached two-way agreement 2363 is complete, nodes 2301 and 2362 can then process the messages in accordance with cached two-way agreement 2363.

When a new node joins a ring between two existing nodes, each existing node can formulate a routing agreement with the new node (and thus potentially giving up responsibility for a portion of unoccupied identifiers). This formulation can essentially split a range of unoccupied identifiers an existing node is responsible for between the joining node and the existing node. That is, each existing node potentially gives up responsibility for a portion of the existing node's unoccupied identifiers to the joining node.

Figure 23C:
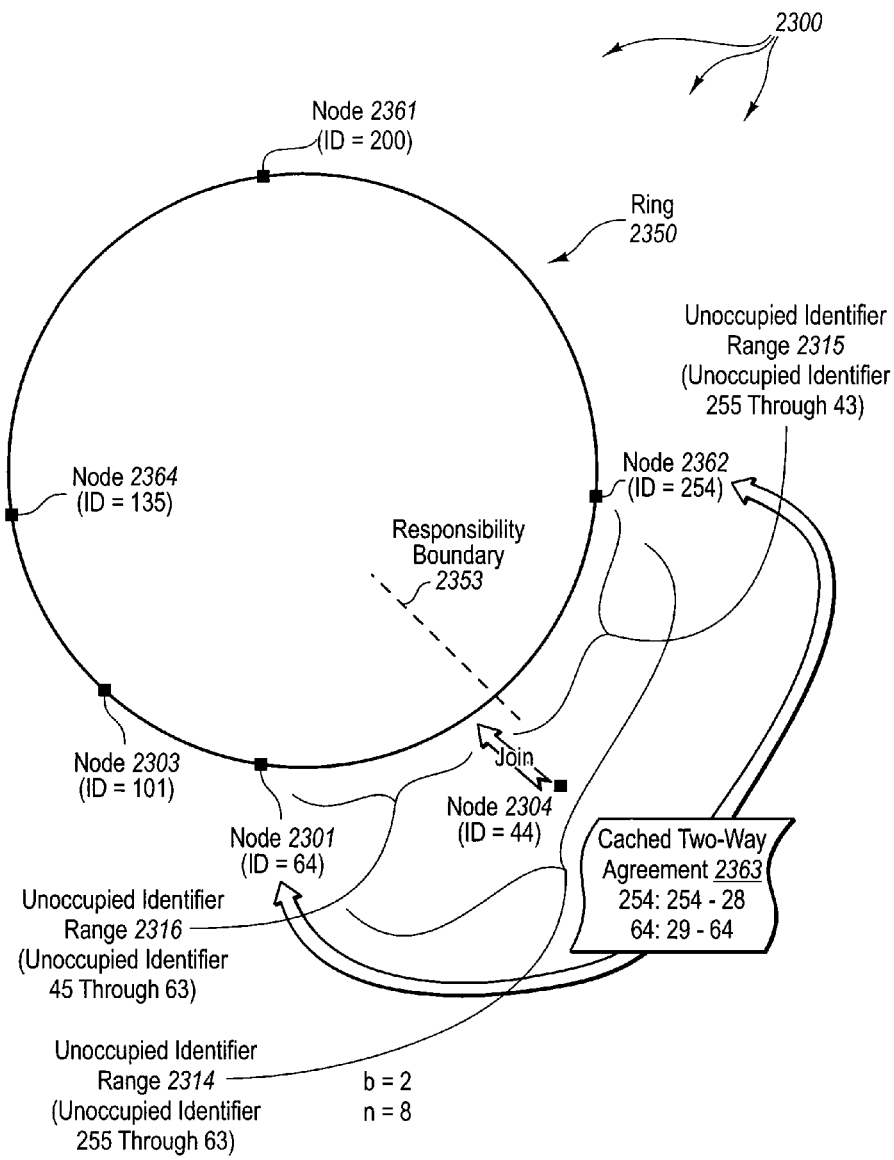

Referring now to FIG. 23C, at some time subsequent to the formulation of cached two-way agreement 2363, node 2304 (ID=44) can join ring 2350. Subsequent to node 2304 joining ring 2350, node 2362 can detect node 2304 as its immediate successor. Likewise, node 2301 can detect node 2304 as its immediate predecessor. In response to each of the detections, unoccupied identifier range 2314 is essentially split into unoccupied identifier range 2315 (unoccupied identifiers 255 through 43) and unoccupied identifier range 2316 (unoccupied identifiers 45 through 63). New cached-two way agreements can then be formulated to divide responsibility for unoccupied identifier ranges 2315 and 2316.

Figure 23D:
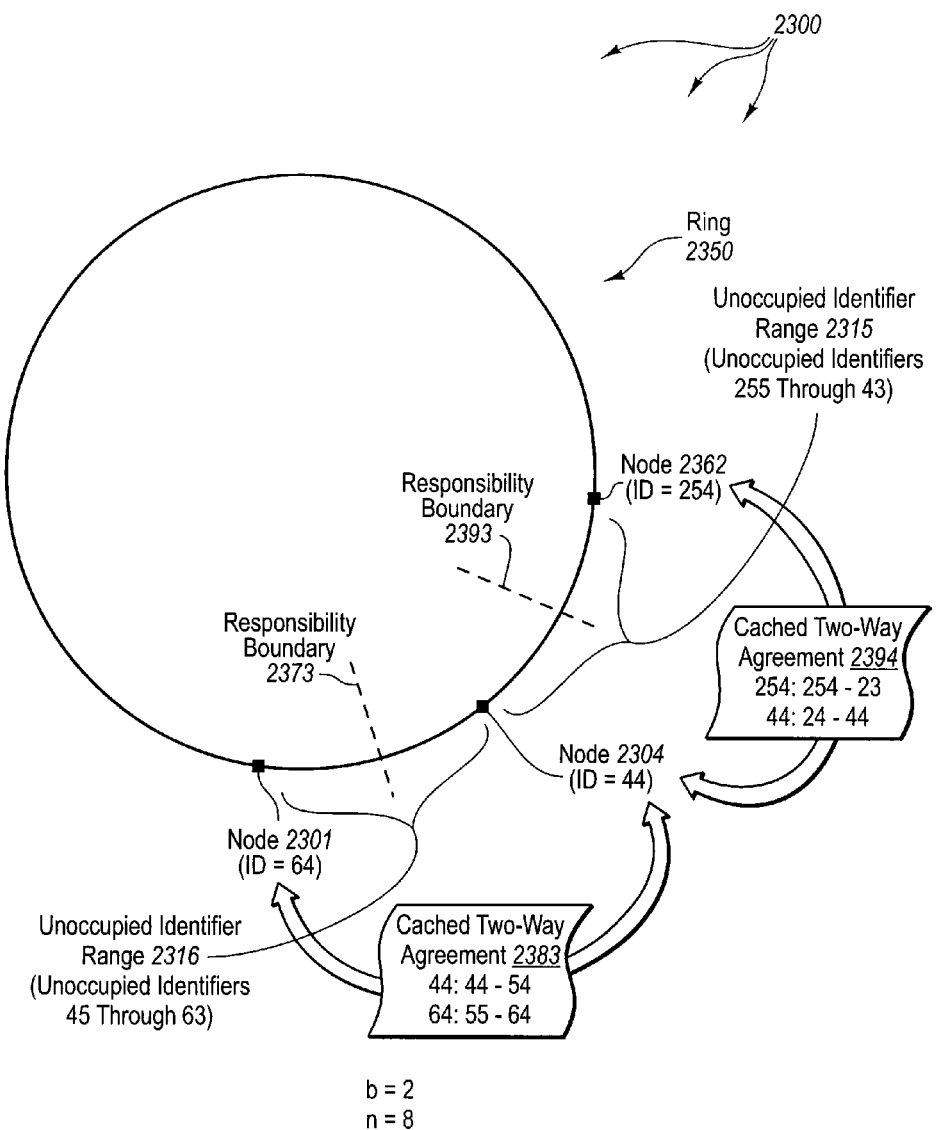

Referring now to FIG. 23D, upon identifying node 2304 as a new immediate successor node, nodes 2362 and 2304 formulate cached two-way agreement 2394 to that divides responsibility for unoccupied identifier range 2315 (unoccupied identifiers 255 through 43). Unoccupied identified range 2315 includes portions of unoccupied identifier range 2314, which were previously the responsibility of node 2362 and in this case some of which were previously the responsibility of node 2301. Thus, portions of unoccupied identifier range 2314 that were the responsibility of either node 2362 or node 2301, can become the responsibility of node 2304 when node 2304 joins ring 2350.

Accordingly, as depicted by responsibility boundary 2393 (between unoccupied identifier 23 and unoccupied identifier 24), node 2362 (ID=254) and node 2304 (ID=44) formulate cached two-way agreement 2394. In accordance with cached two-way agreement 2394, node 2362 (ID=254) is responsible for itself as well as unoccupied identifiers 255 through 23 and node 2304 (ID=44) is responsible for itself as well as identifier range 24 through 43. Although the midway point between nodes 2201 and 2202 is at unoccupied identifier 23, node 2362 is assigned responsibility for unoccupied identifier 23 such that each unoccupied identifier is the responsibility of a single node.

Similarly, upon identifying node 2304 as a new immediate predecessor node, nodes 2301 and 2304 formulate cached two-way agreement 2383 that divides responsibility for unoccupied identifier range 2316 (unoccupied identifiers 45 through 64). Unoccupied identified range 2316 includes portions of unoccupied identifier range 2314, which were previously the responsibility of node 2301. Thus, portions of unoccupied identifier range 2314, which were the responsibility of node 2301, can become the responsibility of node 2304 when node 2304 joins ring 2350.

Accordingly, as depicted by responsibility boundary 2373 (between unoccupied identifier 54 and unoccupied identifier 55), node 2304 (ID=44) and node 2301 (ID=64) formulate cached two-way agreement 2383. In accordance with cached two-way agreement 2383, node 2304 (ID=44) is responsible for itself as well as unoccupied identifiers 45 through 54 and node 2301 (ID=64) is responsible for itself as well as identifier range 55 through 63. Although the midway point between nodes 2201 and 2202 is at unoccupied identifier 54, node 2304 is assigned responsibility for unoccupied identifier 54 such that each unoccupied identifier is the responsibility of a single node.

During time between the joining of node 2304 and formulation of cached two-way agreement 2394, nodes 2362 and 2304 do not process messages indicated for delivery to identifiers in the range between 255 and 43. Instead, nodes 2362 and 2304 queue any messages, expect those for formulating cached two-way agreement 2394. After formulation of the cached two-way agreement 2394 is complete, nodes 2362 and 2304 can then process the messages in accordance with cached two-way agreement 2394.

Similarly, during time between the joining of node 2304 and formulation of cached two-way agreement 2383, nodes 2304 and 2301 do not process messages indicated for delivery to identifiers in the range between 45 and 63. Instead, nodes 2304 and 2301 queue any messages, expect those for formulating cached two-way agreement 2383. After formulation of the cached two-way agreement 2383 is complete, nodes 2304 and 2301 can then process the messages in accordance with cached two-way agreement 2383.

From the perspective of node 2304, the combination of cached two-way agreement 2394 and cached two-way agreement 2383 can essentially represent a corresponding three-way agreement (not shown) between node 2304, node 2362, and 2301. From the perspective of node 2304, the corresponding represented three-way agreement defines responsibility for (assigned and unoccupied) identifiers from and including ID=254 to and including ID=64.

Figure 26:
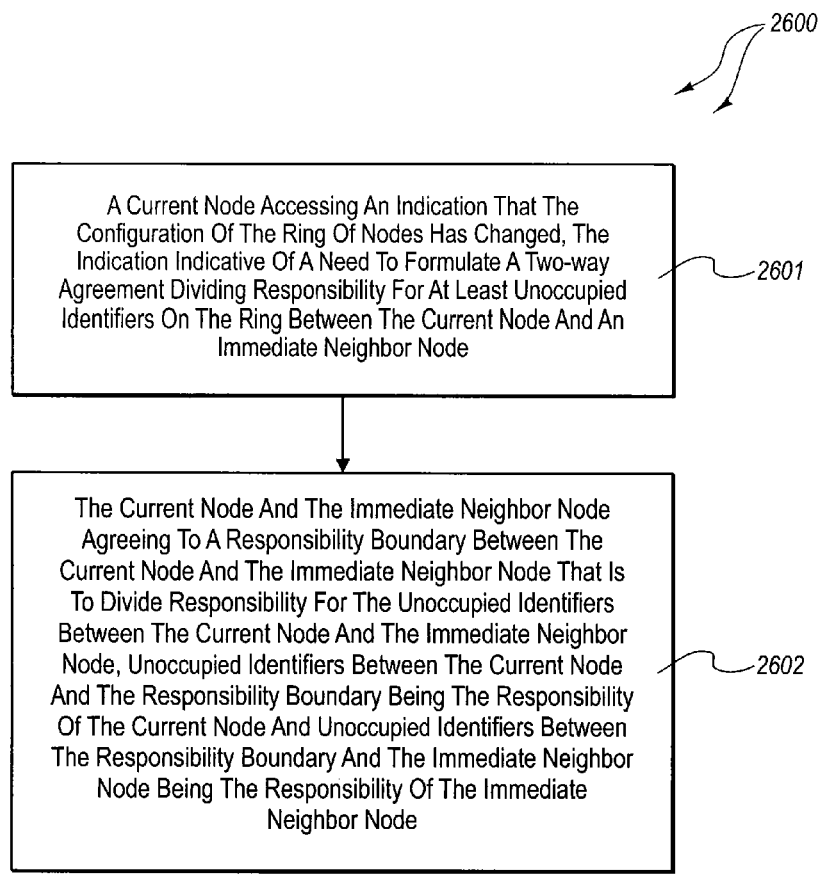
FIG. 26 illustrates an example flow chart of a method for joining a two-way agreement.

FIG. 26 illustrates an example flow chart of a method 2600 for joining a two-way agreement. Method 2600 will be discussed with respect to the nodes and agreements in FIGS. 23A through 23D.

Method 2600 includes an act of a current node accessing an indication that the configuration of the ring of nodes has changed, the indication indicative of a need to formulate a two-way agreement dividing responsibility for at least unoccupied identifiers on the ring between the current node and the immediate neighbor node (act 2601). For example, referring to FIGS. 23A and 23B, node 2301 and/or node 2362 can access an indication, for example, from node 2302, through monitoring of node 2302, or from an arbitrator, that node 2302 departed ring 2350. The indication of node 2302 departing ring 2350 indicates to node 2301 and/or node 2362 a need to formulate a two-way agreement dividing responsibility for unoccupied identifier range 2314 (unoccupied identifiers 255 through 63).

Alternately, referring to FIGS. 23C and 23D, node 2301 can access an indication (e.g., sent as part of the join process of node 2304) that node 2304 has joined ring 2350. The indication of node 2304 joining ring 2350 indicates to node 2301 a need to formulate a two-way agreement dividing responsibility for unoccupied identifier range 2316 (unoccupied identifiers 45 through 63). Similarly, node 2362 can access an indication (e.g., sent as part of the join process of node 2304) that node 2304 has joined ring 2350. The indication of node 2304 joining ring 2350 indicates to node 2362 a need to formulate a two-way agreement dividing responsibility for unoccupied identifier range 2315 (unoccupied identifiers 255 through 43).

Method 2600 includes an act of the current node and the immediate neighbor node agreeing to a responsibility boundary between the current node and the immediate neighbor node that is to divide responsibility for the unoccupied identifiers between the current node and the immediate neighbor node (act 2602). Unoccupied identifiers between the current node and the responsibility boundary are the responsibility of the current node and unoccupied identifiers between the responsibility boundary and the immediate neighbor node are the responsibility of the immediate neighbor node.

For example, referring to FIG. 23B node 2301 and node 2362 can agree to responsibility boundary 2353, which is essentially between unoccupied identifiers 31 and 32. Thus, unoccupied identifiers between node 2301 and responsibility boundary 2353 (i.e., unoccupied identifiers 32 through 63) are the responsibility of node 2301. Likewise, unoccupied identifiers between responsibility boundary 2353 and node 2362 (i.e., unoccupied identifiers 255 through 31) are the responsibility of node 2362.

Referring to FIG. 23D, node 2301 and node 2304 can agree to responsibility boundary 2373, which is essentially between unoccupied identifiers 54 and 55. Thus, unoccupied identifiers between node 2301 and responsibility boundary 2373 (i.e., identifiers 55 through 63) are the responsibility of node 2301. Likewise, unoccupied identifiers between responsibility boundary 2373 and node 2304 (i.e., unoccupied identifiers 45 through 54) are the responsibility of node 2304.

Still referring to FIG. 23D, node 2304 and node 2362 can agree to responsibility boundary 2393, which is essentially between unoccupied identifiers 23 and 24. Thus, identifiers between node 2304 and responsibility boundary 2393 (i.e., unoccupied identifiers 24 through 43) are the responsibility of node 2304. Likewise, unoccupied identifiers between responsibility boundary 2393 and node 2362 (i.e., unoccupied identifiers 255 through 23) are the responsibility of node 2362.

Figure 6:
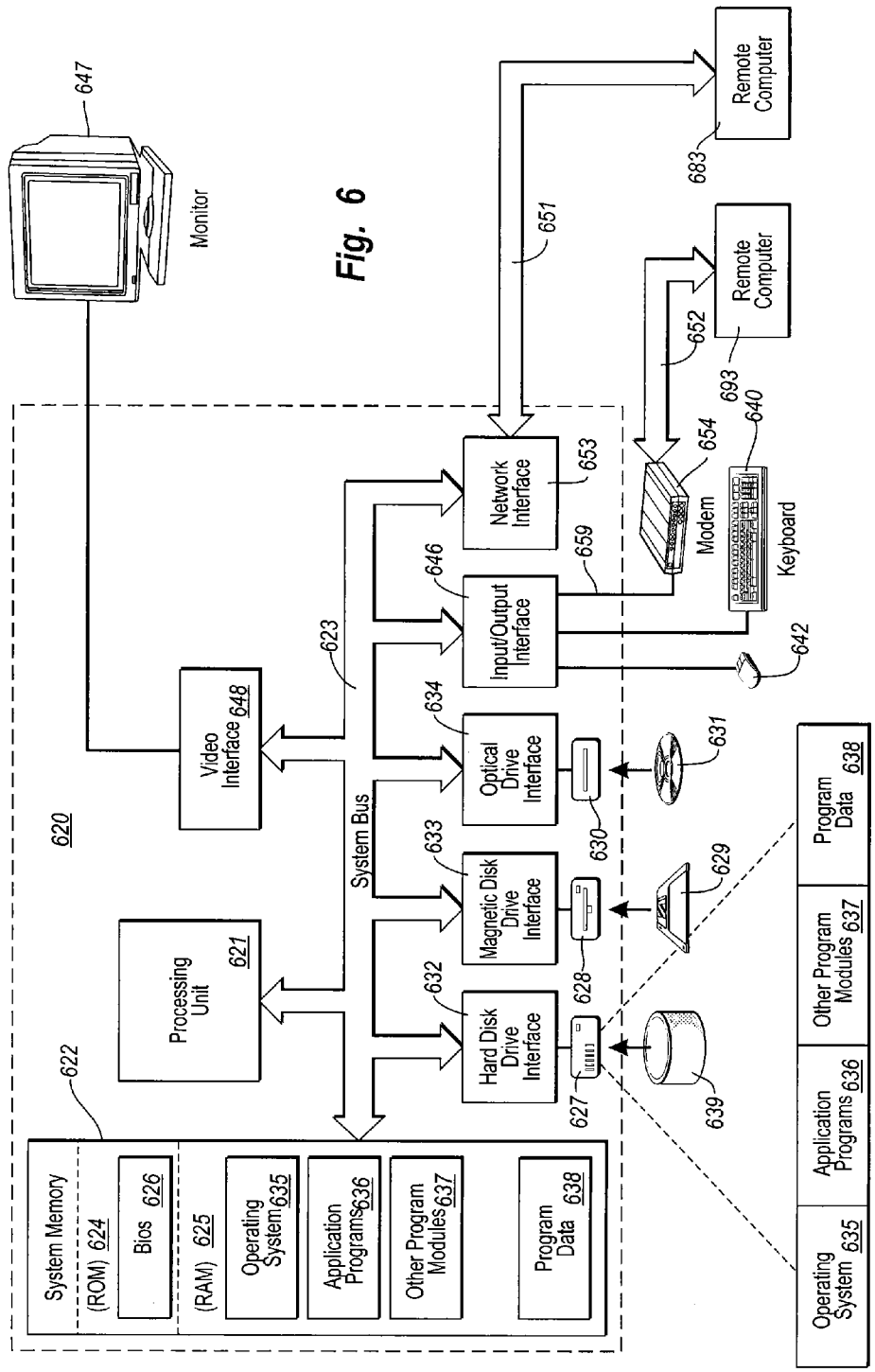
FIG. 6 illustrates a suitable operating environment for the principles of the present invention.

FIG. 6 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 6, an example system for implementing the invention includes a general-purpose computing device in the form of computer system 620, including a processing unit 621, a system memory 622, and a system bus 623 that couples various system components including the system memory 622 to the processing unit 621. Processing unit 621 can execute computer-executable instructions designed to implement features of computer system 620, including features of the present invention. The system bus 623 may be any of several types of bus structures including a memory bus or memory controller, a peripheral bus, and a local bus using any of a variety of bus architectures. The system memory includes read only memory ("ROM") 624 and random access memory ("RAM") 625. A basic input/output system ("BIOS") 626, containing the basic routines that help transfer information between elements within computer system 620, such as during start-up, may be stored in ROM 624.

The computer system 620 may also include magnetic hard disk drive 627 for reading from and writing to magnetic hard disk 639, magnetic disk drive 628 for reading from or writing to removable magnetic disk 629, and optical disk drive 630 for reading from or writing to removable optical disk 631, such as, or example, a CD-ROM or other optical media. The magnetic hard disk drive 627, magnetic disk drive 628, and optical disk drive 630 are connected to the system bus 623 by hard disk drive interface 632, magnetic disk drive-interface 633, and optical drive interface 634, respectively. The drives and their associated computer-readable media provide nonvolatile storage of computer-executable instructions, data structures, program modules, and other data for the computer system 620. Although the example environment described herein employs magnetic hard disk 639, removable magnetic disk 629 and removable optical disk 631, other types of computer readable media for storing data can be used, including magnetic cassettes, flash memory cards, digital versatile disks, Bernoulli cartridges, RAMs, ROMs, and the like.

Program code means comprising one or more program modules may be stored on hard disk 639, magnetic disk 629, optical disk 631, ROM 624 or RAM 625, including an operating system 635, one or more application programs 636, other program modules 637, and program data 638. A user may enter commands and information into computer system 620 through keyboard 640, pointing device 642, or other input devices (not shown), such as, for example, a microphone, joy stick, game pad, scanner, or the like. These and other input devices can be connected to the processing unit 621 through input/output interface 646 coupled to system bus 623. Input/output interface 646 logically represents any of a wide variety of different interfaces, such as, for example, a serial port interface, a PS/2 interface, a parallel port interface, a Universal Serial Bus ("USB") interface, or an Institute of Electrical and Electronics Engineers ("IEEE") 1394 interface (i.e., a FireWire interface), or may even logically represent a combination of different interfaces.

A monitor 647 or other display device is also connected to system bus 623 via video interface 648. Speakers 669 or other audio output device is also connected to system bus 623 via audio interface 649. Other peripheral output devices (not shown), such as, for example, printers, can also be connected to computer system 620.

Computer system 620 is connectable to networks, such as, for example, an office-wide or enterprise-wide computer network, a home network, an intranet, and/or the Internet. Computer system 620 can exchange data with external sources, such as, for example, remote computer systems, remote applications, and/or remote databases over such networks.

Computer system 620 includes network interface 653, through which computer system 620 receives data from external sources and/or transmits data to external sources. As depicted in FIG. 6, network interface 653 facilitates the exchange of data with remote computer system 683 via link 651. Network interface 653 can logically represent one or more software and/or hardware modules, such as, for example, a network interface card and corresponding Network Driver Interface Specification ("NDIS") stack. Link 651 represents a portion of a network (e.g., an Ethernet segment), and remote computer system 683 represents a node of the network.

Likewise, computer system 620 includes input/output interface 646, through which computer system 620 receives data from external sources and/or transmits data to external sources. Input/output interface 646 is coupled to modem 654 (e.g., a standard modem, a cable modem, or digital subscriber line ("DSL") modem) via link 659, through which computer system 620 receives data from and/or transmits data to external sources. As depicted in FIG. 6, input/output interface 646 and modem 654 facilitate the exchange of data with remote computer system 693 via link 652. Link 652 represents a portion of a network and remote computer system 693 represents a node of the network.

While FIG. 6 represents a suitable operating environment for the present invention, the principles of the present invention may be employed in any system that is capable of, with suitable modification if necessary, implementing the principles of the present invention. The environment illustrated in FIG. 6 is illustrative only and by no means represents even a small portion of the wide variety of environments in which the principles of the present invention may be implemented.

In accordance with the present invention, nodes, application layers, and other lower layers, as well as associated data, including routing tables and node IDs may be stored and accessed from any of the computer-readable media associated with computer system 620. For example, portions of such modules and portions of associated program data may be included in operating system 635, application programs 636, program modules 637 and/or program data 638, for storage in system memory 622.

When a mass storage device, such as, for example, magnetic hard disk 639, is coupled to computer system 620, such modules and associated program data may also be stored in the mass storage device. In a networked environment, program modules depicted relative to computer system 620, or portions thereof, can be stored in remote memory storage devices, such as, system memory and/or mass storage devices associated with remote computer system 683 and/or remote computer system 693. Execution of such modules may be performed in a distributed environment as previously described.

Figure 27:
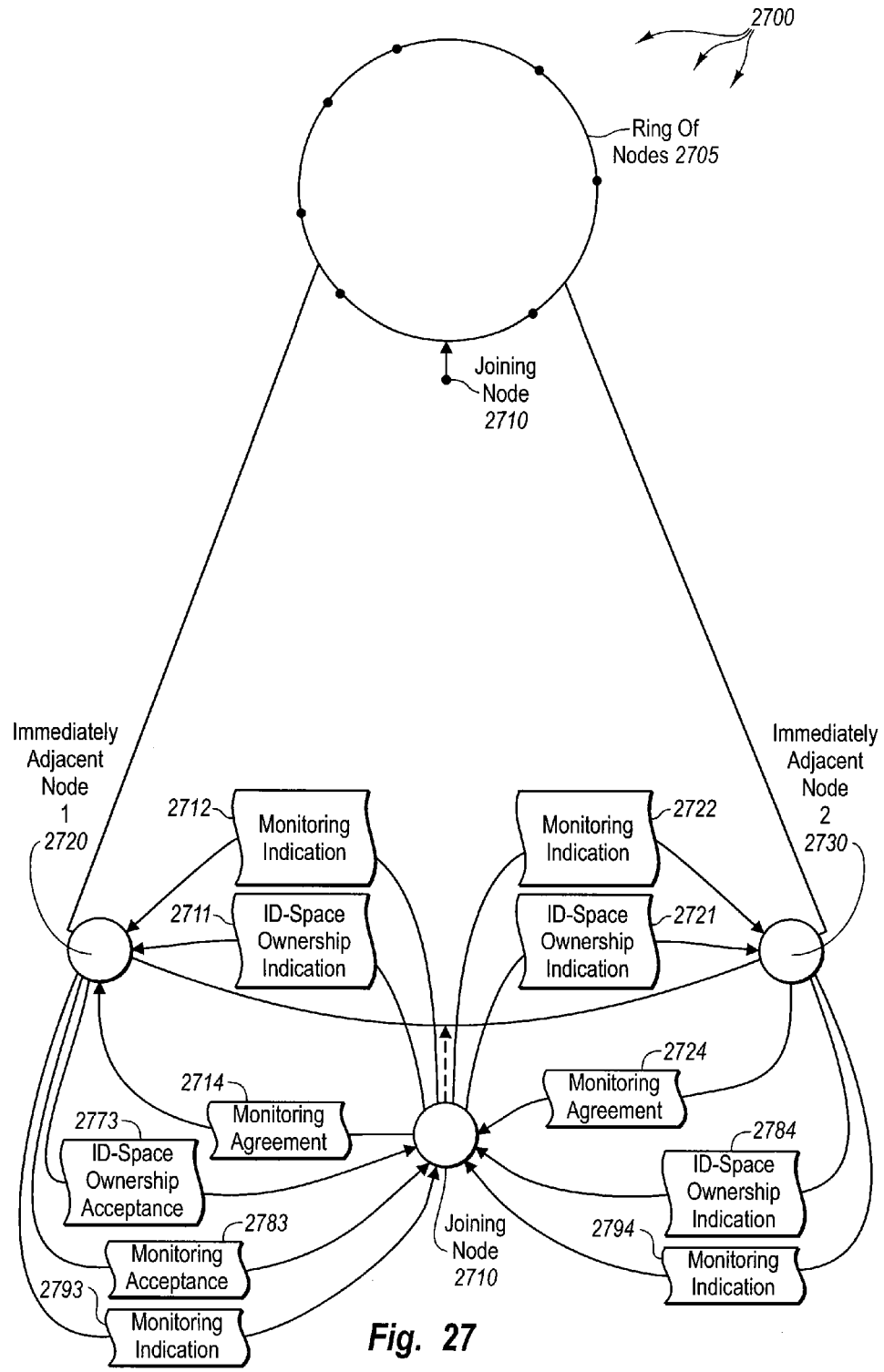
FIG. 27 illustrates an example ring architecture that facilitates joining of a node to a ring of nodes within a federation.

FIG. 27 illustrates a ring architecture 2700 in which the principles of the present invention may be employed. Ring architecture 2700 includes ring of nodes 2705. In some embodiments, ring of nodes 2705 may be similar to or the same as ring 2350 in FIG. 23C, as described above. Ring of nodes 2705 may include joining node 2710 which may be attempting to join the ring between immediately adjacent node 1 (2720) and immediately adjacent node 2 (2730). In some embodiments, joining node 2710 may join ring of nodes 2710 in a manner similar to that described in FIG. 23C, where the joining node determines an identifier range based on a cached agreement between nodes 2301 and 1362. A method for maintaining ring consistency during the joining of a node is described in further detail below with reference to the nodes and data items of FIG. 27.

Figure 28:
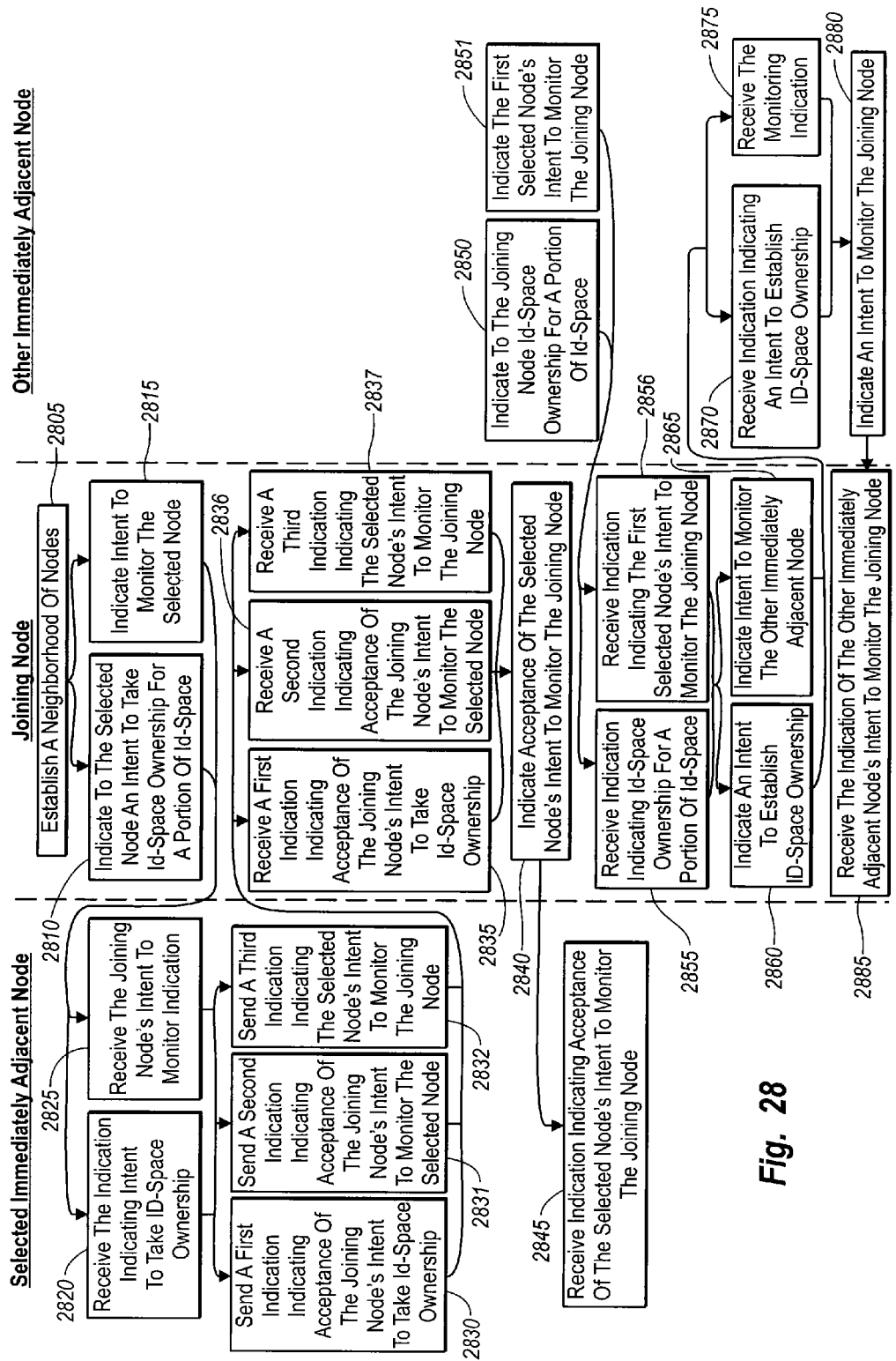
FIG. 28 illustrates an example flow chart of methods for maintaining ring consistency when a joining node joins the ring of nodes from the perspectives of the joining node, a selected immediately adjacent node and another immediately adjacent node.
Figure 30:
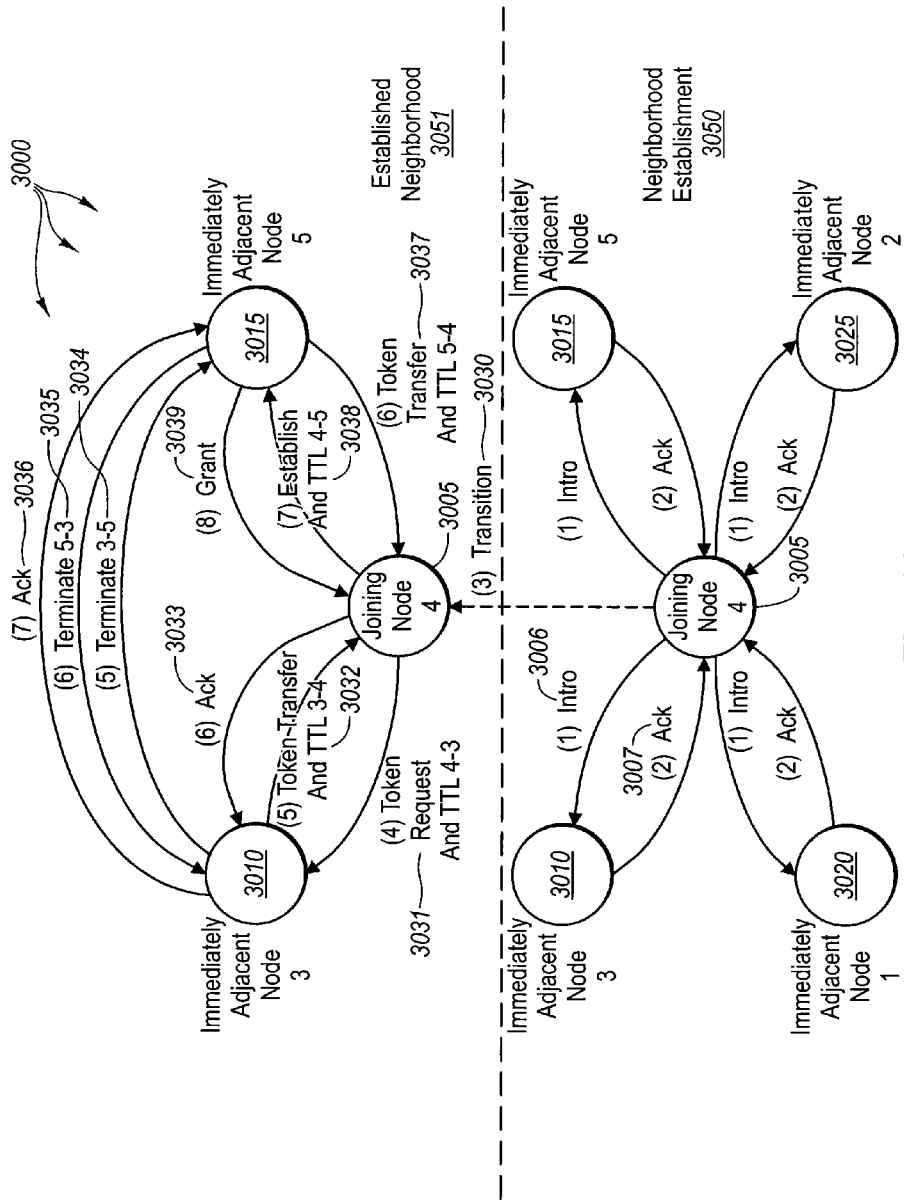
FIG. 30 illustrates an exemplary state diagram for a joining node joining the ring of nodes.

FIG. 28 illustrates a flowchart of a method 2800 for maintaining ring consistency when a joining node joins the ring of nodes. In some embodiments, method 2800 incorporates multiple sub methods, each stemming from a different node's point of view. The method 2800 will now be described with frequent reference to the components and data of environment 2700 as well as state diagram 3000 of FIG. 30.

Method 2800 includes an act of a joining node establishing a neighborhood of a plurality of other nodes on the ring, the neighborhood including at least an immediately adjacent predecessor node and an immediately adjacent successor node (act 2805). For example, joining node 2710 may establish a neighborhood of a plurality of other nodes on ring 2705, where the neighborhood includes immediately adjacent node 2720 and other immediately adjacent node 2730. In some embodiments, such as in state diagram 3000, joining node 3005 may establish a neighborhood by sending introduction messages (e.g. Intro 3006) in step 1. Each node that receives such an introduction message may respond with an acknowledgement (ACK) message (e.g. ACK 3007) in step 2 of the state diagram. The intro 3006 may include one or more portions of information used to identify the joining node and indicate that joining node 3005 intends to join ring 2705.

From the ACK messages received back by joining node 3005, the joining node may be configured to determine which node is the closest to it on the ring. For example, each ACK message may include identifier ranges and/or position identifiers indicating the nodes position on the ring and the ranges for which the node has responsibility. Thus, in state diagram 3000, joining node 3005 may determine that immediately adjacent node 3 (3010) is the joining node's immediately adjacent predecessor node and that immediately adjacent node 5 (3015) is the joining node's immediately adjacent successor node. Furthermore, joining node 3005 may determine that adjacent node 1 (3020) and adjacent node 2 (3025) are on the same ring as the joining node, but are not necessarily the joining node's immediately closest nodes. Thus, neighborhood establishment 3050 may be accomplished according to exemplary state diagram 3000.

Method 2800 includes an act of the joining node indicating to one of the immediately adjacent nodes selected from among the immediately adjacent predecessor node and an immediately adjacent successor node, the intent of the joining node to take id-space ownership for a portion of the id-space between the joining node and the selected immediately adjacent node (act 2810). For example, joining node 2710 may indicate to immediately adjacent node 1 (2720) selected from among immediately adjacent node 1 (2720) and immediately adjacent node 2 (2730), the intent of joining node 2710 to take id-space ownership for a portion of the id-space between joining node 2710 and selected immediately adjacent node 2720. As explained above, id-space may include an identifier range (unoccupied or otherwise) for which a given node is responsible. For example, id-space may include a numerical range of node identifiers for which a given node is responsible.

In some embodiments, such as in state diagram 3000, the act of the joining node 3005 indicating to one of the immediately adjacent nodes selected from among the immediately adjacent predecessor node and an immediately adjacent successor node, the intent of the joining node to take id-space ownership for a portion of the id-space between the joining node 3005 and the selected immediately adjacent node 3010 comprises an act of sending a token request 3031 to a selected immediately adjacent node 3010 from among the immediately adjacent predecessor node 3010 and an immediately adjacent successor node 3015, the token request including a node identifier such that only the node with the node identifier is capable of replying and a first time-to-live duration value 3031, the first time-to-live duration value indicative of a duration for which the joining node 3005 can assume a monitoring relationship with the selected immediately adjacent node is active.

In some cases, the token request message 3031 includes a marker indicating an updated status of the joining node's 3005 expected ownership range. Time-to-live values (TTL's) and relationship monitoring may be substantially the same as described in method 2000 of FIG. 20.

Method 2800 includes an act of the joining node initiating a one-way monitoring relationship with the selected immediately adjacent node (act 2815). For example, joining node 2710 may initiate a one-way monitoring relationship with immediately adjacent node 1 (2720) as indicated in monitoring relationship indication 2712. In such a monitoring relationship, joining node 2710 may agree to monitor a certain range of node identifiers. In some cases, a range may include identifiers between those of immediately adjacent node 2720 and immediately adjacent node 2730.

Method 2800 includes an act of a first selected immediately adjacent node receiving an indication from the joining node indicating the intent of the joining node to take id-space ownership for a portion of the id-space between the joining node and the first selected immediately adjacent node (act 2820). For example, immediately adjacent node 1 (2720) may receive an indication (e.g. id-space ownership indication 2711) from joining node 2710 indicating the intent of joining node 2710 to take id-space ownership for a portion of the id-space between the joining node and node 2720.

Method 2800 includes an act of the first selected immediately adjacent node receiving an indication from the joining node of the joining node's intent to initiate a one-way monitoring relationship with the selected immediately adjacent node (act 2825). For example, immediately adjacent node 1 (2720) may receive an indication (e.g. monitoring relationship indication 2712) from joining node 2710 of the joining node's intent to initiate a one-way monitoring relationship with immediately adjacent node 2720.

Method 2800 includes an act of the first selected immediately adjacent node sending an indication to the joining node that indicates acceptance of the joining node's intent to take id-space ownership for a portion of the id-space between the joining node and the first selected immediately adjacent node and indicates establishment of a one-way monitoring relationship between the first selected immediately adjacent node and the joining node (act 2830). For example, immediately adjacent node 1 (2720) may send indication 2713 to joining node 2710 indicating acceptance of the joining node's intent to take id-space ownership for a portion of the id-space between joining node 2710 and immediately adjacent node 2720 (e.g. id-space ownership acceptance 2713A) and indicates establishment of a one-way monitoring relationship between immediately adjacent node 2720 and joining node 2710 (e.g. monitoring relationship establishment 2713B).

Method 2800 includes an act of the joining node receiving an indication the selected immediately adjacent node that indicates acceptance of the joining node's intent to take id-space ownership for a portion of the id-space between the joining node and the selected immediately adjacent node and indicates establishment of a one-way monitoring relationship between the selected immediately adjacent node and the joining node (act 2835). For example, joining node 2710 may receive indication 2713 from immediately adjacent node 1 (2720) that indicates acceptance of the joining node's intent to take id-space ownership for a portion of the id-space between joining node 2710 and immediately adjacent node 2720 and indicates establishment of a one-way monitoring relationship between immediately adjacent node 2720 and joining node 2710.

In some embodiments, such as in state diagram 3000, the act of the joining node 3005 receiving an indication from the selected immediately adjacent node 3010 that indicates acceptance of the joining node's intent to take id-space ownership for a portion of the id-space between the joining node and the selected immediately adjacent node and indicates establishment of a one-way monitoring relationship between the selected immediately adjacent node 3010 and the joining node 3005 comprises an act of receiving a first token transfer 3032 from the selected immediately adjacent node 3010, the first token transfer including the joining node's ownership range of unoccupied node identifiers in the ring of nodes between the joining node 3005 and the selected immediately adjacent node 3010, a second time-to-live duration value 3032, the second time-to-live duration value indicative of a duration for which the selected immediately adjacent node can assume a monitoring relationship with the joining node 3005 is active and a first establish grant indicative of the selected immediately adjacent node 3010 monitoring the joining node.

Method 2800 includes an act of the joining node agreeing to participate in a one-way monitoring relationship with the selected immediately adjacent node (act 2840). For example, joining node 2710 may agree to participate (e.g. monitoring relationship agreement 2714) in a one-way monitoring relationship with immediately adjacent node 1 (2720). In some embodiments, such as in state diagram 3000, the act of the joining node 3005 agreeing to participate in a one-way monitoring relationship with the selected immediately adjacent node 3010 comprises an act of sending an acknowledgement message 3033 to the selected immediately adjacent node 3010, the acknowledgement message 3033 including a first ownership range between the joining node 3005 and a second establish grant indicative of the joining node monitoring the selected immediately adjacent node.

Referring again to FIGS. 27 and 28, method 2800 includes an act of the a first selected immediately adjacent node receiving an agreement from joining node agreeing to participate in a one-way monitoring relationship with the selected immediately adjacent node (act 2845). For example, immediately adjacent node 2720 may receive an agreement (e.g. monitoring relationship agreement 2714) from joining node 2710 agreeing to participate in a one-way monitoring relationship with immediately adjacent node 2720.

In some embodiments, selected immediately adjacent node 2720 may, additionally or alternatively, perform the acts of indicating to a second selected immediately adjacent node the first node's intent to terminate any monitoring relationships with the second selected immediately adjacent node, receiving an indication from the second selected immediately adjacent node indicating the second node's intent to terminate any monitoring relationships with the first selected immediately adjacent node and acknowledging the second node's intent to terminate. For example, immediately adjacent node 1 (2720) may indicate to immediately adjacent node 2 (2730) node 1's intent to terminate any monitoring relationships with node 2 (2730). Immediately adjacent node 1 (2720) may also receive an indication from node 2 (2730) indicating node 2's intent to terminate any monitoring relationships with node 1. Immediately adjacent node 1 (2720) may also acknowledge node 2's intent to terminate.

In some cases, such as in state diagram 3000, immediately adjacent node 3 (3010) may be configured to indicate to immediately adjacent node 5 (3015) node 3's intent to terminate any monitoring relationships with node 5 (3015) in step 5 (3034) of the state diagram. Immediately adjacent node 3 (3010) may also receive an indication from node 5 (3015) indicating node 5's intent to terminate any monitoring relationships with node 3 in step 6 (3035) of the state diagram. Immediately adjacent node 3 (3010) may also acknowledge node 5's intent to terminate in step 7 (3036) of the state diagram. It should be noted that the steps (1-8) of state diagram 3000 may occur in series or in parallel. Thus, in some embodiments, all steps labeled (5), for example, may occur simultaneously and others may occur in series. Any combination of steps performed in series or parallel is possible.

Method 2800 includes an act of a first selected immediately adjacent node, selected from among the immediately adjacent predecessor node and an immediately adjacent successor node, indicating to the joining node id-space ownership for the portion of id-space between the joining node and the first selected immediately adjacent node and establishment of a one-way monitoring relationship between the first selected immediately adjacent node and the joining node (act 2850). For example, immediately adjacent node 2 (2730), selected from among immediately adjacent node 1 (2720) and an immediately adjacent node 2 (2730), may indicate (e.g. in indication 2723) to joining node 2710 id-space ownership for the portion of id-space between joining node 2710 and immediately adjacent node 2730 (e.g. in id-space ownership 2723A) and establishment of a one-way monitoring relationship between immediately adjacent node 2730 and joining node 2710 (e.g. in monitoring relationship establishment 2723B).

Method 2800 includes an act of the joining node receiving an indication from the other immediately adjacent node that indicates id-space ownership for the portion of id-space between the joining node and the other immediately adjacent node and indicates establishment of a one-way monitoring relationship between the other immediately adjacent node and the joining node (act 2855). For example, joining node 2710 may receive indication 2723 from immediately adjacent node 2 (2730) that indicates id-space ownership for the portion of id-space between joining node 2710 and immediately adjacent node 2730 and indicates establishment of a one-way monitoring relationship between immediately adjacent node 2730 and joining node 2710.

In some embodiments, such as in state diagram 3000, the act of the joining node 3005 receiving an indication from the other immediately adjacent node 3015 that indicates id-space ownership for the portion of id-space between the joining node 3005 and the other immediately adjacent node 3015 indicates establishment of a one-way monitoring relationship between the other immediately adjacent node and the joining node comprises an act of receiving a second token transfer 3037 from the other immediately adjacent node 3015 in step 6, the second token transfer including the joining node's ownership range of unoccupied node identifiers between the joining node 3005 and the other immediately adjacent node 3015 and a third time-to-live duration value 3037, the third time-to-live duration value indicative of a duration for which the other immediately adjacent node 3015 can assume a monitoring relationship with the joining node 3005 is active.

Referring again to FIGS. 27 and 28, method 2800 includes an act of the joining node indicating to the other immediately adjacent node the intent of the joining node to establish id-space ownership for a portion of the id-space between the joining node and the other immediately adjacent node (act 2860). For example, joining node 2710 may indicate (e.g. in id-space ownership indication 2721) to immediately adjacent node 2 (2730) the intent of joining node 2710 to establish id-space ownership for a portion of the id-space between joining node 2710 and immediately adjacent node 2730.

In some embodiments, such as in state diagram 3000, the act of the joining node 3005 indicating to the other immediately adjacent node 3015 the intent of the joining node to establish id-space ownership for a portion of the id-space between the joining node 3005 and the other immediately adjacent node 3015 comprises an act of sending an establishment request (3038 in step 7) to establish a second ownership range between the joining node 3005 and the other immediately adjacent node 3015, the establishment request 3038 including a second ownership range between the joining node 3005 and the other immediately adjacent node 3015, a fourth time-to-live duration 3038, the fourth time-to-live duration indicative of a duration for which the joining node 3005 can assume a monitoring relationship with the other immediately adjacent node 3015 is active, and a third establish grant indicative of the joining node monitoring the other immediately adjacent node 3015.

Method 2800 includes an act of the joining node initiating a one-way monitoring relationship with the other immediately adjacent node (act 2865). For example, joining node 2710 may initiate (e.g. via monitoring relationship indication 2722) a one-way monitoring relationship with immediately adjacent node 2 (2730. In some embodiments, such as in state diagram 3000, the act of the joining node 3005 indicating to the other immediately adjacent node 3015 the intent of the joining node to establish id-space ownership for a portion of the id-space between the joining node 3005 and the other immediately adjacent node 3015 comprises an act of sending an establishment request 3038 to establish a second ownership range between the joining node 3005 and the other immediately adjacent node 3015, the establishment request 3038 including a second ownership range between the joining node and the other immediately adjacent node, a fourth time-to-live duration 3038, the fourth time-to-live duration indicative of a duration for which the joining node can assume a monitoring relationship with the other immediately adjacent node is active, and a third establish grant 3038 indicative of the joining node monitoring the other immediately adjacent node.

Method 2800 includes an act of the first selected immediately adjacent node receiving an indication of the joining node's intent to establish id-space ownership for a portion of the id-space between the joining node and the first selected immediately adjacent node (act 2870). For example, immediately adjacent node 2 (2730) may receive id-space ownership indication 2721 indicating the joining node's intent to establish id-space ownership for a portion of the id-space between joining node 2710 and immediately adjacent node 2730.

Method 2800 includes an act of the first selected immediately adjacent node receiving an indication of the joining node's intent to initiate a one-way monitoring relationship with the first selected immediately adjacent node (act 2875).

For example, immediately adjacent node 2 (2730) may receive monitoring relationship indication 2722 indicating joining node's intent to initiate a one-way monitoring relationship with immediately adjacent node 2730.

Method 2800 includes an act of the first selected immediately adjacent node indicating to the joining node the first selected node's intent to establish a one-way monitoring relationship between the first selected node and the joining node (act 2880). For example, immediately adjacent node 2 (2730) may indicate to joining node 2710 (e.g. via monitoring relationship agreement 2724) the immediately adjacent node's intent to establish a one-way monitoring relationship between immediately adjacent node 2730 and joining node 2710.

In some cases, immediately adjacent node 2 (2730) may, additionally or alternatively, perform the acts of receiving an indication from a second selected immediately adjacent node indicating the second node's intent to terminate any monitoring relationships with the first selected immediately adjacent node, indicating to the second selected immediately adjacent node the first node's intent to terminate any monitoring relationships with the second selected immediately adjacent node and receiving an acknowledgment acknowledging the first node's intent to terminate. The other immediately adjacent node may also acknowledge the indication from the second selected immediately adjacent node. For example, immediately adjacent node 2 (2730) may receive an indication from immediately adjacent node 1 (2720) indicating node 1's intent to terminate any monitoring relationships with node 2. Node 2 (2730) may also receive an acknowledgement (3036 in state diagram 3000) acknowledging node 2's intent to terminate. Node 2 (2730) may also acknowledge the indication from node 1 (2720).

Method 2800 includes an act of the joining node receiving an indication from the other immediately adjacent node indicating establishment of a one-way monitoring relationship between the other immediately adjacent node and the joining node (act 2885). For example, joining node 2710 may receive an indication from immediately adjacent node 2 (2730) (e.g. monitoring relationship agreement 2724) indicating establishment of a one-way monitoring relationship between immediately adjacent node 2730 and joining node 2710. In some embodiments, such as in state diagram 3000, the act of the joining node receiving an indication from the other immediately adjacent node indicating establishment of a one-way monitoring relationship between the other immediately adjacent node and the joining node comprises an act of receiving a fourth establish grant (e.g. 3039 in step 8) for the establishment request, the fourth establish grant indicative of the other adjacent node 3015 monitoring the joining node 3005.

Furthermore, joining node 2710 may receive a negative acknowledge (NAK) message from at least one of the nodes on the ring (e.g. immediately adjacent node 1 (2720), where the NAK message includes an indication of the NAK sender's view of the neighborhood. Using the NAK sender's view of the neighborhood, joining node 2710 may update its view of the neighborhood based on the NAK sender's view of the neighborhood.

Figure 29:
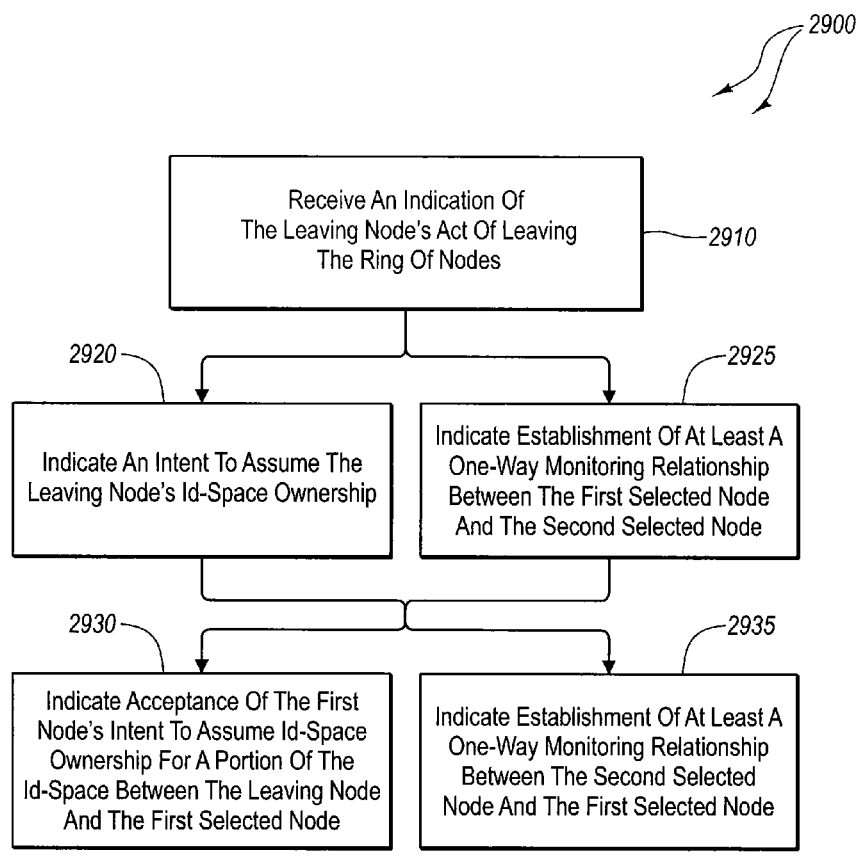
FIG. 29 illustrates an example flow chart of a method for maintaining ring consistency when a leaving node leaves the ring of nodes.
Figure 31:
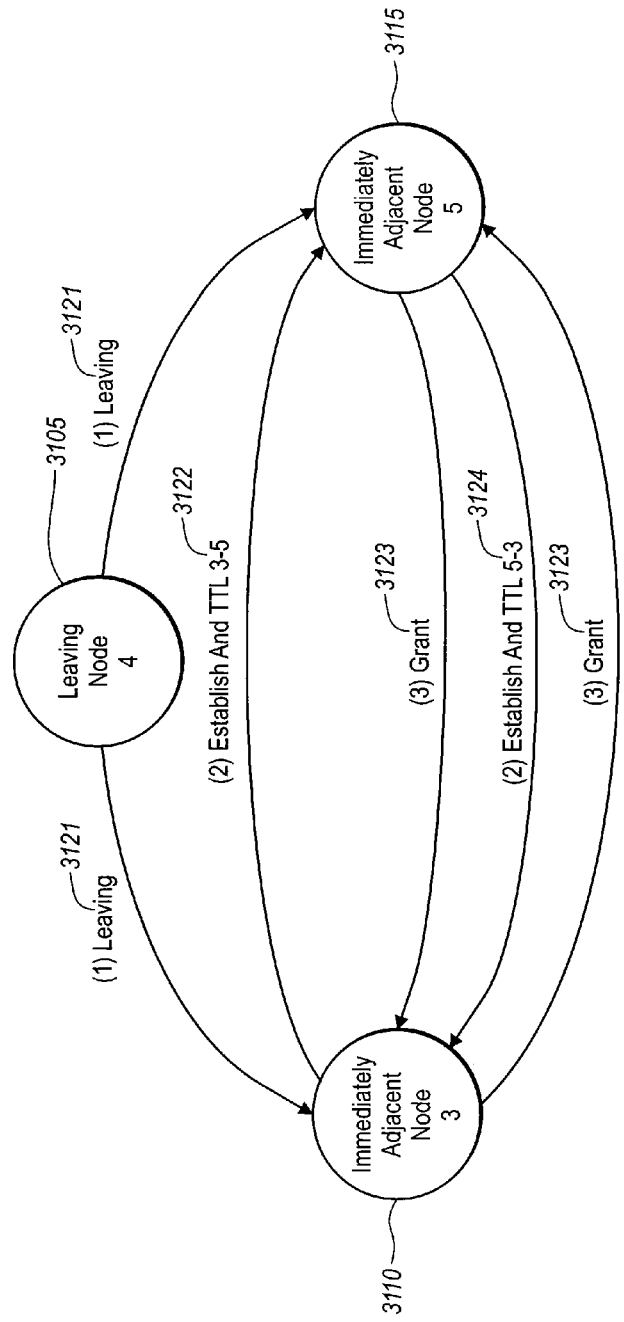
FIG. 31 illustrates an exemplary state diagram for a leaving node leaving the ring of nodes.

FIG. 29 illustrates a flowchart of a method 2900 for maintaining ring consistency when the leaving node leaves the ring of nodes. The method 2900 will now be described with frequent reference to the components and data of environment 2700 and state diagram 3100 of FIG. 31.

Method 2900 includes an act of the first selected immediately adjacent node receiving an indication from the leaving node indicating the leaving node's intent to leave the ring of nodes (act 2910). For example, immediately adjacent node 3 (3110) may receive an indication from leaving node 4 (3105) indicating the leaving node's intent to leave the ring of nodes. In some embodiments, the act of the first selected immediately adjacent node 3110 receiving an indication from the leaving node 3105 indicating the leaving node's intent to leave the ring of nodes comprises the first selected immediately adjacent node 3110 receiving a departure message 3121 (step 1 in state diagram 3100) from leaving node 3105, where the departure message includes an ownership range of node identifiers indicated as being owned by leaving node 3105.

Method 2900 includes an act of the first selected immediately adjacent node sending an indication to the second selected immediately adjacent node that indicates acceptance of the leaving node's intent to leave id-space ownership for a portion of the id-space between the leaving node and the first selected immediately adjacent node and indicates establishment of a one-way monitoring relationship between the first selected immediately adjacent node and the second selected immediately adjacent node (act 2920). For example, immediately adjacent node 3 (3110) may send an indication (e.g. Establish & TTL 3122) to immediately adjacent node 5 (3115) that indicates acceptance of the leaving node's intent to leave id-space ownership for a portion of the id-space between leaving node 3105 and immediately adjacent node 3110 and indicates establishment of a one-way monitoring relationship between immediately adjacent node 3 (3110) and immediately adjacent node 5 (3115).

In some embodiments, such as in state diagram 3100, the act of the first selected immediately adjacent node sending an indication to the second selected immediately adjacent node that indicates acceptance of the leaving node's intent to leave id-space ownership for a portion of the id-space between the leaving node and the first selected immediately adjacent node indicates establishment of a one-way monitoring relationship between the first selected immediately adjacent node and the second selected immediately adjacent node comprises an act of the first selected immediately adjacent node 3110 sending a first establishment request 3122 (e.g. in step 2 of state diagram 3100) to the second selected immediately adjacent node 3115 to establish an ownership range between the first selected immediately adjacent node 3110 and the second selected immediately adjacent node 3115, the first establishment request including a first time-to-live duration 3122, the first time-to-live duration indicative of a duration for which the first selected immediately adjacent node 3110 can assume a monitoring relationship with the second selected immediately adjacent node 3115 is active, and an act of the first adjacent node 3110 receiving a first establish grant 3123 (e.g. in step 3 of state diagram 3100) for the first establishment request 3122, the first establish grant 3123 indicative of the second adjacent node 3115 monitoring the first selected immediately adjacent node 3110.

Method 2900 includes an act of the first selected immediately adjacent node receiving an indication from the second selected immediately adjacent node that indicates acceptance of the first node's intent to assume id-space ownership for a portion of the id-space between the leaving node and the first selected immediately adjacent node and indicates establishment of a one-way monitoring relationship between the second selected immediately adjacent node and the first selected immediately adjacent node (act 2930). For example, immediately adjacent node 3 (3110) may receive an indication (e.g. Establish & TTL 3124) from immediately adjacent node 5 (3115) that indicates acceptance of immediately adjacent node 5's intent to assume id-space ownership for a portion of the id-space between leaving node 3105 and immediately adjacent node 3110, and indicates establishment of a one-way monitoring relationship between immediately adjacent node 3115 and immediately adjacent node 3110.

In some embodiments, such as in state diagram 3100, wherein the act of an act of the first selected immediately adjacent node receiving an indication from the second selected immediately adjacent node that indicates acceptance of the first node's intent to assume id-space ownership for a portion of the id-space between the leaving node and the first selected immediately adjacent node and indicates establishment of a one-way monitoring relationship between the second selected immediately adjacent node and the first selected immediately adjacent node comprises an act of the first adjacent node 3110 receiving a second establishment request (e.g. in step 2 of state diagram 3100) from the second adjacent node 3115 to establish an ownership range between the first adjacent node 3110 and the second adjacent node 3115, the second establishment request including a second time-to-live duration 3124, the second time-to-live duration indicative of a duration for which the second adjacent node 3115 can assume a monitoring relationship with the first adjacent node 3110 is active, and an act of the first adjacent node 3110 sending a second establish grant 3123 (e.g. in step 3 of state diagram 3100) for the second establishment request, the second establish grant indicative of the first adjacent node 3110 monitoring the second adjacent node 3115.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, implemented by a first node in a ring of nodes of a federation infrastructure, for maintaining ring consistency when the first node joins the ring of nodes, the method comprising:
    sending, to a second node in the ring of nodes that is immediately adjacent to the first node in the ring of nodes, an identifier range of a portion of id-space in the ring of nodes between the first node and the second node over which the first node intends to take ownership;
    initiating a monitoring relationship with the second node, including establishing a monitor side time-to-live value and a monitor side time-to-die value with the second node, the monitoring relationship presumed to be active during a duration of the monitor side time-to-live value, the second node suspected to have failed if the monitor side time-to-die value is reached without the first node having received a renew request from the second node;
    receiving, from the second node, an indication of acceptance by the second node of the first node's intent to take id-space ownership for the identifier range of the portion of id-space in the ring between the first node and the second node; and
    receiving, from the second node, an indication of establishment of the monitoring relationship between the second node and the first node.

2. The method as recited in claim 1, wherein sending, to the second node, the identifier range of the portion of id-space in the ring of nodes between the first node and the second node over which the first node intends to take ownership comprises:
    sending, to the second node, a request that includes a node identifier of the second node such that only the second node, having the node identifier, is capable of responding to the request.

3. The method as recited in claim 1, wherein sending, to the second node, the identifier range of the portion of id-space in the ring of nodes between the first node and the second node over which the first node intends to take ownership comprises:
    sending, to the second node, a time-to-live duration value indicative of a duration for which the first node can assume the monitoring relationship with the second node is active.

4. The method as recited in claim 1, further comprising:
    sending, to the second node, an indication of the first nodes' agreement to participate in the monitoring relationship with the second node.

5. The method as recited in claim 1, wherein establishing the monitor side time-to-live value and the monitor side time-to-die value with the second node comprises negotiating the monitor side time-to-live value and the monitor side time-to-die value with the second node.

6. The method as recited in claim 1, further comprising:
    sending, to a third node that is also immediately adjacent to the first node in the ring of nodes, an additional identifier range of a portion of id-space in the ring between the first node and the third node over which the first node intends to take ownership; and
    receiving, from the third node, an indication of acceptance by the third node of the first node's intent to take id-space ownership for the additional identifier range of the portion of id-space in the ring between the first node and the third node.

7. The method as recited in claim 1, further comprising:
    receiving, from a third node that is also immediately adjacent to the first node in the ring of nodes, an indication of establishment of a monitoring relationship between the third node and the first node.

8. The method as recited in claim 1, further comprising:
    receiving, from a third node that is also immediately adjacent to the first node in the ring of nodes, a time-to-live duration value indicative of a duration for which the third node can assume a monitoring relationship with the first node is active.

9. A system, comprising:
    one or more hardware processors; and
    one or more hardware storage devices having stored thereon computer-executable instructions that are configured to be executed by the one or more processors, and to configure the system as a joining node in a federation infrastructure, the joining node being configured for maintaining ring consistency when the joining node joins the ring of nodes, comprising the joining node being configured to:
        send, to a first adjacent node in the ring of nodes, an identifier range of a portion of id-space in the ring of nodes between the joining node and the first adjacent node over which the joining node intends to take ownership;
        initiate a monitoring relationship with first adjacent node, including establishing a monitor side time-to-live value and a monitor side time-to-die value with first adjacent node, the monitoring relationship presumed to be active during a duration of the monitor side time-to-live value, the first adjacent node suspected to have failed if the monitor side time-to-die value is reached without the joining node having received a renew request from the first adjacent node;

receive, from the first adjacent node, an indication of acceptance by the first adjacent node of the joining node's intent to take id-space ownership for the identifier range of the portion of id-space in the ring between the joining node and the first adjacent node; and receive, from the first adjacent node, an indication of establishment of the monitoring relationship between the first adjacent node and the joining node.

10. The system as recited in claim 9, wherein the joining node is also configured to:

send a request to the first adjacent node that includes a node identifier of the first adjacent node such that only the first adjacent node, having the node identifier, is capable of responding to the request.

11. The system as recited in claim 9, wherein the joining node is also configured to:

send, to the first adjacent node, a first time-to-live duration value indicative of a duration for which the joining node can assume the monitoring relationship with the first adjacent node is active.

12. The system as recited in claim 9, wherein the joining node is also configured to:

send, to the first adjacent node, an indication of the joining nodes' agreement to participate in the monitoring relationship with the first adjacent node.

13. The system as recited in claim 9, wherein the joining node is also configured to:

negotiate the monitor side time-to-live value and the monitor side time-to-die value with the first adjacent node.

14. The system as recited in claim 9, wherein the joining node is also configured to:

send, to a second adjacent node, an additional identifier range of a portion of id-space in the ring between the joining node and the second adjacent node over which the joining node intends to take ownership; and receive, from the second adjacent node, an indication of acceptance by the second adjacent node of the joining node's intent to take id-space ownership for the additional identifier range of the portion of id-space in the ring between the joining node and the second adjacent node.

15. The system as recited in claim 9, wherein the joining node is also configured to:

receive, from a second adjacent node, an indication of establishment of a monitoring relationship between the joining node and the second adjacent node.

16. The system as recited in claim 9, wherein the joining node is also configured to:

receive, from a second adjacent node, a time-to-live duration value indicative of a duration for which the second adjacent node can assume a monitoring relationship with the joining node is active.

17. A method, implemented by a first adjacent node in a ring of nodes of a federation infrastructure, for maintaining ring consistency when a joining node joins the ring of nodes, the method comprising:

receiving, from the joining node, which is immediately adjacent to the first adjacent node in the ring of nodes, an identifier range of a portion of id-space in the ring of nodes between the joining node and the first adjacent node over which joining node intends to take ownership;

receiving, from the joining node, an indication of the joining node's intent to initiate a monitoring relationship with the first adjacent node;

sending, to the joining node, an indication of acceptance of the monitoring relationship with the joining node, and establishing a monitor side time-to-live value and a monitor side time-to-die value with the joining node, the monitoring relationship presumed to be active during a duration of the monitor side time-to-live value, the first adjacent node suspected to have failed if the monitor side time-to-die value is reached without the joining node having received a renew request from the first adjacent node;

sending, to the joining node, an indication of acceptance by the first adjacent node of the joining node's intent to take id-space ownership for the identifier range of the portion of id-space in the ring between the joining node and the first adjacent node; and sending, to the joining node, an indication of establishment of the monitoring relationship between the first adjacent node and the joining node.

18. The method as recited in claim 17, further comprising:

indicating, to a second adjacent node that is also immediately adjacent to the joining node in the ring of nodes, the first adjacent node's intent to terminate any monitoring relationship with the second adjacent node.

19. The method as recited in claim 18, further comprising:

receiving, from the second adjacent node, an indication of the second adjacent node's intent to terminate any monitoring relationship with the first adjacent node.

20. The method as recited in claim 17, further comprising:

receiving, from the joining node, a time-to-live duration value indicative of a duration for which the joining node can assume a monitoring relationship with the first adjacent node is active.

* * * * *